(12) United States Patent
Bittner et al.

(10) Patent No.: US 11,845,395 B2
(45) Date of Patent: Dec. 19, 2023

(54) MULTI-POINT RESTRAINT SYSTEM FOR AN OCCUPANT SEAT MOUNTED IN A MOTOR VEHICLE

(71) Applicant: Indiana Mills & Manufacturing, Inc., Westfield, IN (US)

(72) Inventors: Douglas W. Bittner, Indianapolis, IN (US); Jeffrey A. King, Markelville, IN (US); Steven Gale, Colfax, IN (US); Chris P Jessup, Sheridan, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 45 days.

(21) Appl. No.: 17/706,773

(22) Filed: Mar. 29, 2022

(65) Prior Publication Data
US 2022/0219641 A1 Jul. 14, 2022

Related U.S. Application Data

(63) Continuation-in-part of application No. 17/176,236, filed on Feb. 16, 2021, now Pat. No. 11,691,591, (Continued)

(51) Int. Cl.
*B60R 22/26* (2006.01)
*B60R 22/36* (2006.01)
*B60R 22/02* (2006.01)

(52) U.S. Cl.
CPC .............. *B60R 22/26* (2013.01); *B60R 22/36* (2013.01); *B60R 2022/027* (2013.01)

(58) Field of Classification Search
CPC ........ B60R 22/26; B60R 22/24; B60R 22/18; B60R 22/22; B60R 22/02; B60R 22/00; (Continued)

(56) References Cited

U.S. PATENT DOCUMENTS

| 4,720,143 A | 1/1988 | Schwartz et al. |
| 5,178,439 A | 1/1993 | McCracken |

(Continued)

FOREIGN PATENT DOCUMENTS

| WO | 2013/188614 A1 | 12/2013 |
| WO | 2018093852 A2 | 5/2018 |

OTHER PUBLICATIONS

PCT International Search Report and Written Opinion completed by the ISA/US dated Mar. 5, 2020 and issued in connection with PCT/US2020/014217.
(Continued)

*Primary Examiner* — Mark R Wendell
(74) *Attorney, Agent, or Firm* — Barnes & Thornburg LLP

(57) ABSTRACT

A motor vehicle, seat and multi-point restraint system combination may include one or a combination of means for selectively preventing forward pivoting of the seat, one or more web attenuators for dampen forces applied thereby by one or more respective shoulder webs of the multi-point restraint system, at least one sleeve received on at least one shoulder web and a corresponding sleeve adjuster for adjusting a position of the sleeve along the respective shoulder web, web retractors operatively coupled to each of a pair of lap webs and to each of a pair of thigh webs of the multi-point restraint system, and at least one web retractor operatively coupled to the shoulder webs of the multi-point restraint system.

19 Claims, 29 Drawing Sheets

Related U.S. Application Data which is a continuation-in-part of application No. PCT/US2020/014217, filed on Jan. 17, 2020.

(60) Provisional application No. 62/977,641, filed on Feb. 17, 2020, provisional application No. 62/793,879, filed on Jan. 17, 2019, provisional application No. 62/855,048, filed on May 31, 2019.

(58) Field of Classification Search
CPC ... B60R 22/023; B60R 22/024; B60R 22/185; B60R 22/1855; B60R 22/263; B60R 21/00; B60R 21/02; B60R 2/10; B60R 2/12; B60R 2022/027; B60R 2022/1818; B60R 2021/0086; B60N 2/42; B60N 2/4207; B60N 2/4214; B60N 2/4221; B60N 2/4228
USPC .......................................................... 297/468
See application file for complete search history.

(56) References Cited

U.S. PATENT DOCUMENTS

| | | | |
|---|---|---|---|
| 5,224,750 A | 7/1993 | Clark et al. | |
| 6,322,149 B1 | 11/2001 | Conforti et al. | |
| 7,201,399 B2 * | 4/2007 | Frank | B60R 22/02 |
| | | | 297/484 |
| 7,625,048 B2 * | 12/2009 | Rouhana | B60R 22/02 |
| | | | 297/484 |
| 8,002,348 B2 | 8/2011 | Jessup et al. | |
| 9,015,949 B2 | 4/2015 | Bernardo | |
| 9,156,433 B2 * | 10/2015 | Nagasawa, Sr. | B60R 22/12 |
| 9,669,798 B1 | 6/2017 | Maitland | |
| 9,744,933 B1 | 8/2017 | Rao et al. | |
| 9,884,609 B2 * | 2/2018 | Bittner | B60R 22/26 |
| 2004/0026981 A1 | 2/2004 | Maloney et al. | |
| 2006/0125227 A1 | 6/2006 | Beczkowski et al. | |
| 2007/0290535 A1 | 12/2007 | Meredith et al. | |
| 2012/0019042 A1 | 1/2012 | Park | |
| 2012/0205960 A1 | 8/2012 | Finch | |
| 2014/0138942 A1 | 5/2014 | Rouhana | |

OTHER PUBLICATIONS

International Preliminary Report on Patentability completed by the IPEA/US dated Jan. 26, 2021 and issued in connection with PCT/US2020/014217.

International Preliminary Report on Patentability for PCT/US2021/018138 dated Aug. 23, 2022.

Extended European Search Report dated Aug. 29, 2022 in application EP 20741620.7.

International Search Report and Written Opinion for PCT/US21/18138 completed Apr. 6, 2021.

\* cited by examiner

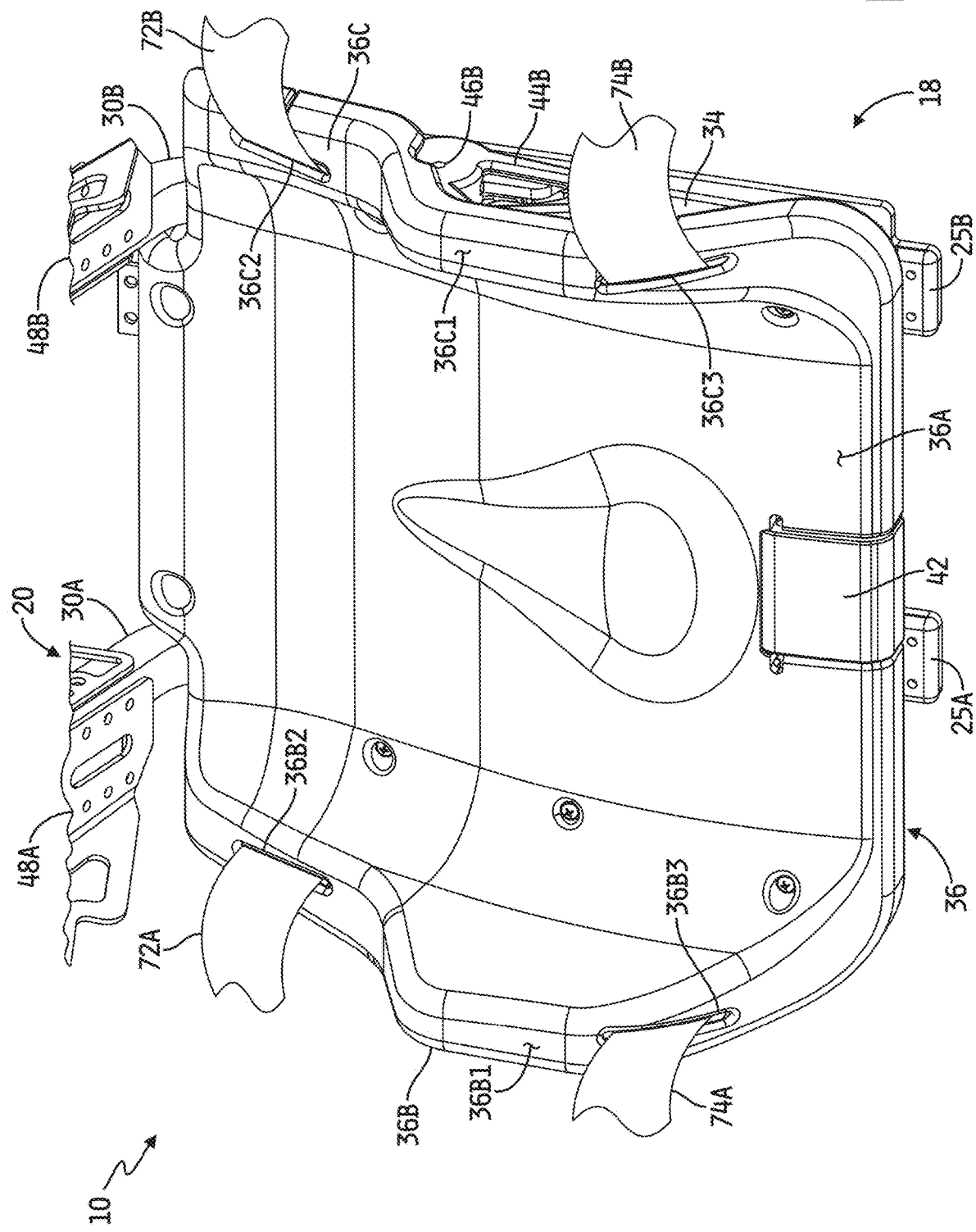

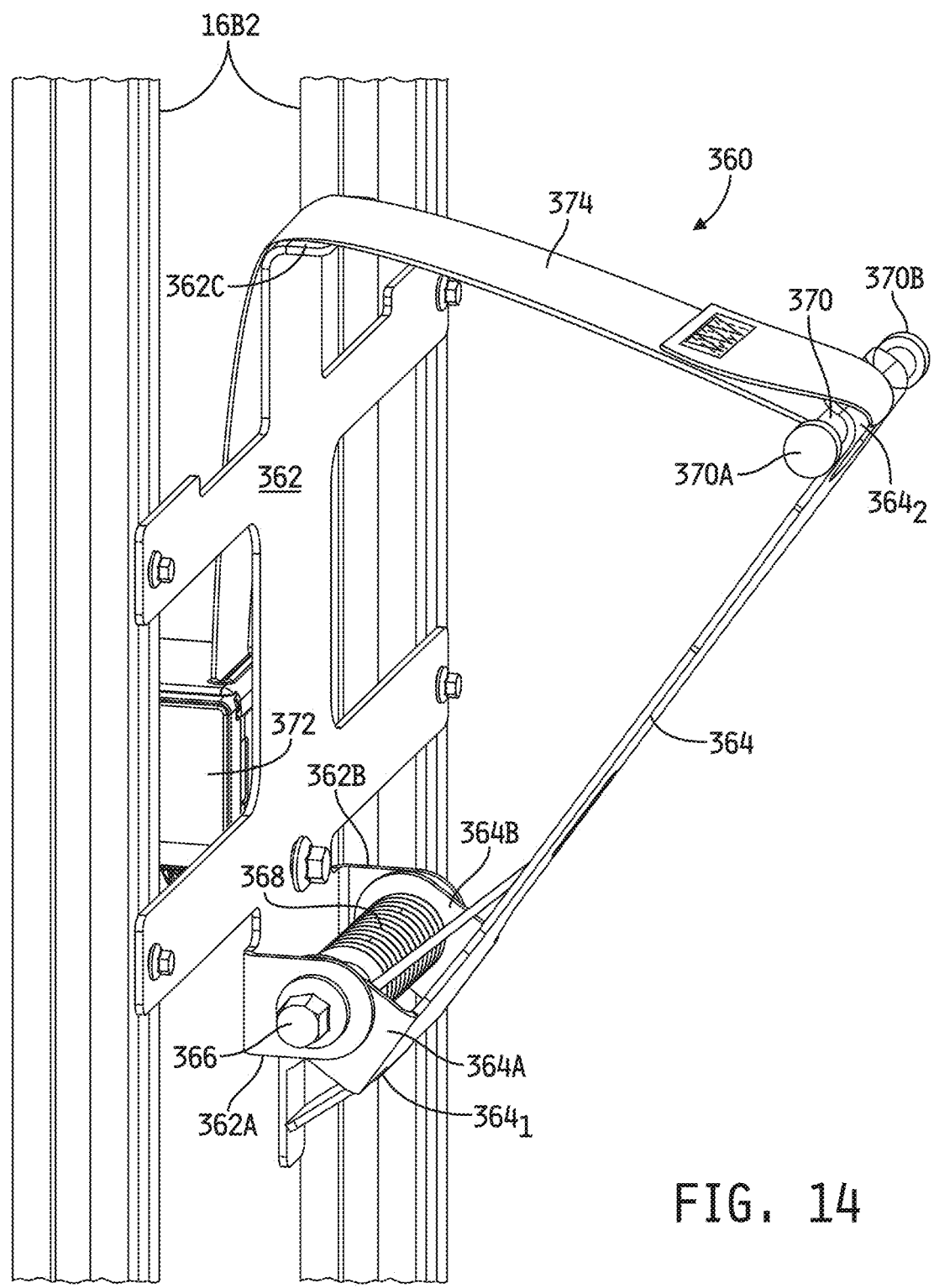

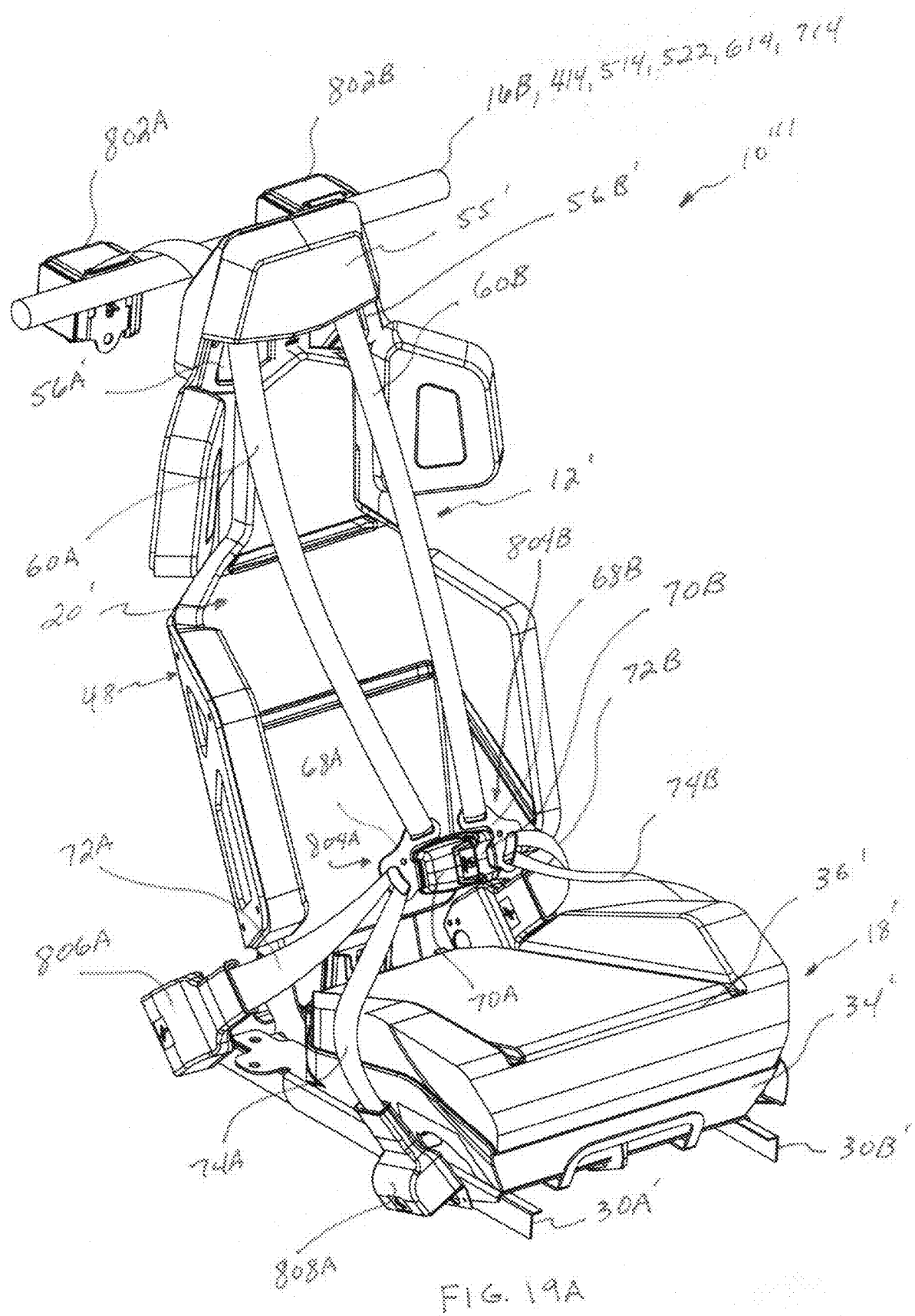

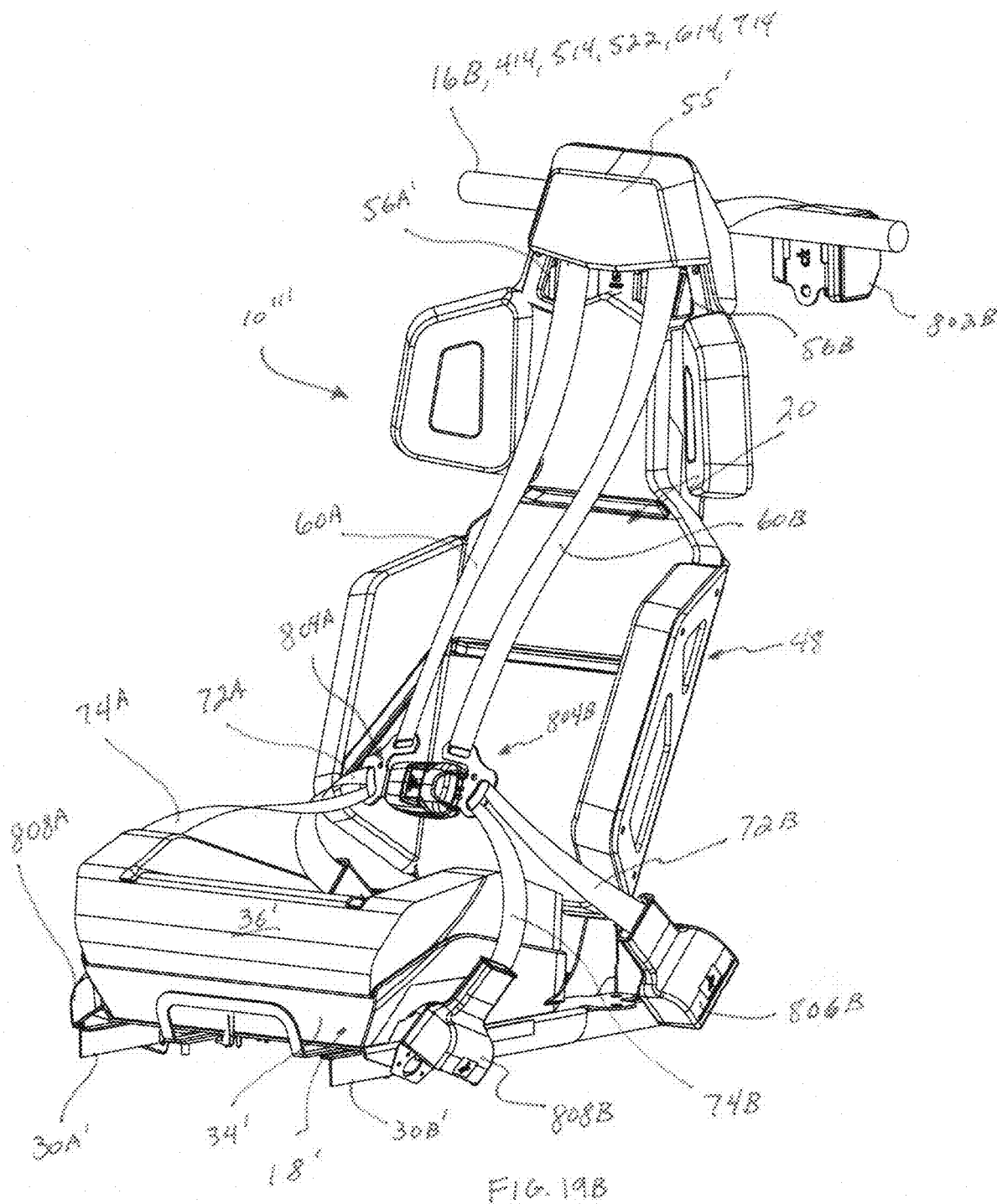

MULTI-POINT RESTRAINT SYSTEM FOR AN OCCUPANT SEAT MOUNTED IN A MOTOR VEHICLE

CROSS-REFERENCE TO RELATED APPLICATION

This is a continuation-in-part of U.S. patent application Ser. No. 17/176,236, filed Feb. 16, 2021, which is a continuation-in-part of International Patent Application No. PCT/US2020/014217, filed Jan. 17, 2020, and which also claims the benefit of, and priority to, U.S. Provisional Patent Application Ser. No. 62/977,641, filed Feb. 17, 2020, the disclosures of which are all expressly incorporated herein by reference in their entireties.

FIELD OF THE DISCLOSURE

This disclosure relates generally to restraint systems, and more specifically to such restraint systems for vehicle seats operatively mounted in motor vehicles.

BACKGROUND

Conventional motor vehicles may be equipped with one or more restraint devices for restraining occupants in vehicle seats mounted therein. Such restraint devices may include two or more points of connection to the motor vehicle seat and/or to the motor vehicle.

SUMMARY

The present disclosure may comprise one or more of the features recited in the attached claims, and/or one or more of the following features and combinations thereof. In one aspect, a multi-point restraint system for a seat mounted in a motor vehicle, wherein the seat has a seat bottom mounted to the motor vehicle and a seat back extending upwardly away from the seat back, may comprise a first shoulder web configured to extend through or over the seat back along one side of the seat, a second shoulder web configured to extend through or over the seat back along an opposite side of the seat, at least a first web retractor mounted to at least one of the motor vehicle, the seat bottom and the seat back, the at least a first web retractor configured to take up and pay out the first and second shoulder webs, a first lap web configured to extend at least partially across the seat bottom from the one side of the seat, a second lap web configured to extend at least partially across the seat bottom from the opposite side of the seat, a first thigh web configured to extend at least partially across the seat bottom from the one side of the seat, a second thigh web configured to extend at least partially across the seat bottom from the opposite side of the seat, at least a second web retractor mounted to at least one of the motor vehicle and the seat bottom, the at least a second web retractor configured to take up and pay out the first and second lap webs, at least a third web retractor mounted to at least one of the motor vehicle and the seat bottom, the at least a third web retractor configured to take up and pay out the first and second thigh webs, and first and second web engagement members configured to releasably connect to one another, the first shoulder, lap and thigh webs operatively coupled to the first web engagement member and the second shoulder, lap and thigh webs operatively coupled to the second web engagement member.

In another aspect, a motor vehicle and seat combination may comprise a motor vehicle, a seat mounted to the motor vehicle, the seat having a seat bottom and a seat back extending upwardly away from the seat bottom, a multi-point restraint system configured to selectively restrain an occupant supported on the seat, the multi-point restraint system, which may include a first shoulder web configured to extend through or over the seat back along one side of the seat, a second shoulder web configured to extend through or over the seat back along an opposite side of the seat, at least a first web retractor mounted to at least one of the motor vehicle, the seat bottom and the seat back, the at least a first web retractor configured to take up and pay out the first and second shoulder webs, a first lap web configured to extend at least partially across the seat bottom from the one side of the seat, a second web retractor mounted to at least one of the motor vehicle and the seat bottom along the one side of the seat, the second web retractor configured to take up and pay out the first lap web, a second lap web configured to extend at least partially across the seat bottom from the opposite side of the seat, a third web retractor mounted to at least one of the motor vehicle and the seat bottom along the opposite side of the seat, the third web retractor configured to take up and pay out the second lap web, a first thigh web configured to extend at least partially across the seat bottom from the one side of the seat, a fourth web retractor mounted to at least one of the motor vehicle and the seat bottom along the one side of the seat, the fourth web retractor configured to take up and pay out the first thigh web, a second thigh web configured to extend at least partially across the seat bottom from the opposite side of the seat, a fifth web retractor mounted to at least one of the motor vehicle and the seat bottom along the opposite side of the seat, the fifth web retractor configured to take up and pay out the second thigh web, and first and second web engagement members configured to releasably connect to one another, the first shoulder, lap and thigh webs operatively coupled to the first web engagement member and the second shoulder, lap and thigh webs operatively coupled to the second web engagement member, and a first web attenuator mounted to the seat back at or near a top end of the seat back along the one side of the seat, the first shoulder web extending through or over the seat back with a portion of the first shoulder web supported by the first web attenuator, the first web attenuator configured to dampen forces applied thereto by the first shoulder web, and a second web attenuator mounted to the seat back at or near the top end of the seat back along the opposite side of the seat, the second shoulder web extending through or over the seat back with a portion of the second shoulder web supported by the second web attenuator, the second web attenuator configured to dampen forces applied thereto by the second shoulder web.

In a further aspect, a motor vehicle and seat combination may comprise a motor vehicle, a seat mounted to the motor vehicle, the seat having a seat bottom and a seat back extending upwardly away from the seat bottom, the seat pivotable or slidable forwardly from an at rest position, means for selectively preventing pivoting or sliding of the seat forwardly from the at rest position of the seat, and a multi-point restraint system configured to selectively restrain an occupant supported on the seat, the multi-point restraint system which may include a first shoulder web configured to extend through or over the seat back along one side of the seat, a second shoulder web configured to extend through or over the seat back along an opposite side of the seat, at least a first web retractor mounted to at least one of the motor vehicle, the seat bottom and the seat back, the at least a first web retractor configured to take up and pay out the first and second shoulder webs, a first lap web configured to extend at least partially across the seat bottom from the one side of the seat, a second web retractor mounted to at least one of the motor vehicle and the seat bottom along the one side of the seat, the second web retractor configured to take up and pay out the first lap web, a second lap web configured to extend at least partially across the seat bottom from the opposite side of the seat, a third web retractor mounted to at least one of the motor vehicle and the seat bottom along the opposite side of the seat, the third web retractor configured to take up and pay out the second lap web, a first thigh web configured to extend at least partially across the seat bottom from the one side of the seat, a fourth web retractor mounted to at least one of the motor vehicle and the seat bottom along the one side of the seat, the fourth web retractor configured to take up and pay out the first thigh web, a second thigh web configured to extend at least partially across the seat bottom from the opposite side of the seat, a fifth web retractor mounted to at least one of the motor vehicle and the seat bottom along the opposite side of the seat, the fifth web retractor configured to take up and pay out the second thigh web, and first and second web engagement members configured to releasably connect to one another, the first shoulder, lap and thigh webs operatively coupled to the first web engagement member and the second shoulder, lap and thigh webs operatively coupled to the second web engagement member.

BRIEF DESCRIPTION OF THE DRAWINGS

This disclosure is illustrated by way of example and not by way of limitation in the accompanying Figures. Where considered appropriate, reference labels have been repeated among the Figures to indicate corresponding or analogous elements.

FIG. 7 is a magnified and front perspective view of the occupant support surface of the occupant support panel of the seat module illustrating example routing of the lap and thigh webs of the occupant restraint harness therethrough.

FIG. 14 is a perspective view of another embodiment of a seat restraint system, including an inertial locking structure, mounted to the motor vehicle and configured to automatically, releasably engage the engagement assembly of the vehicle seat illustrated in FIG. 13 to restrain forward sliding and/or forward folding or pivoting of the vehicle seat relative to the motor vehicle under operating conditions of motor vehicle which cause the inertial locking structure to lock.

FIG. 19A is a side perspective view of an embodiment of a vehicle seat is shown illustrating another embodiment of a multi-point occupant restraint system for restraining an occupant of the vehicle seat.

FIG. 19B is a side perspective similar to FIG. 19A but illustrating an opposite side of the vehicle seat.

DETAILED DESCRIPTION OF THE DRAWINGS

Figure 1A:
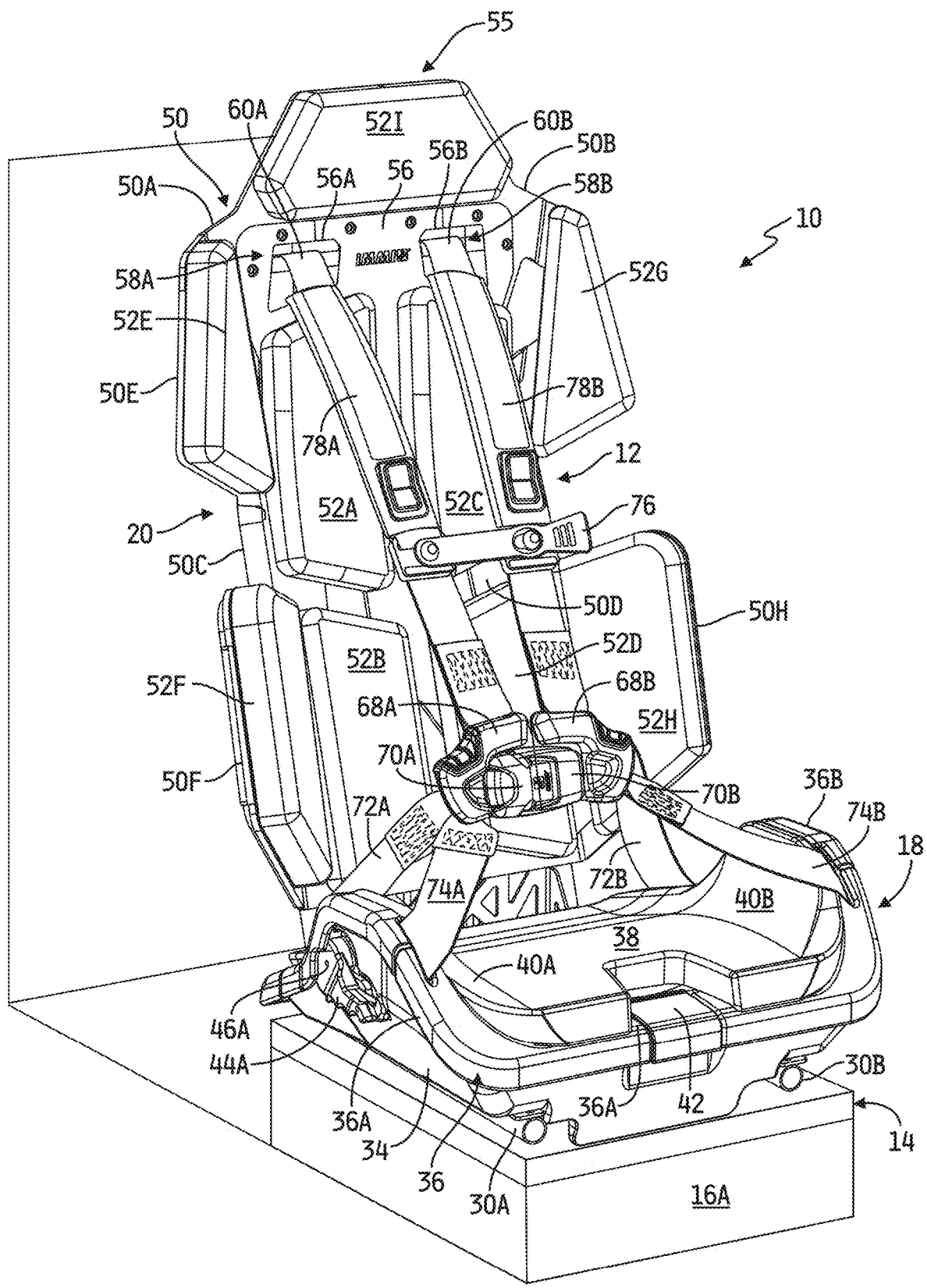
FIG. 1A is a front perspective view of an embodiment of a vehicle seat operatively mountable in a motor vehicle and an embodiment of a seat occupant restraint system therefor.

While the concepts of the present disclosure are susceptible to various modifications and alternative forms, specific exemplary embodiments thereof have been shown by way of example in the drawing and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

This disclosure relates to a restraint system for a vehicle seat operatively mounted in a motor vehicle. The subject restraint system illustratively includes a number of different restraint structures and components, some non-limiting examples of which will be described in detail below. In the attached figures, the motor vehicle in which the vehicle seat and one or more of the restraint system components are to be mounted is represented in the form of example motor vehicle frame components or structures to which one or more structures of the vehicle seat and/or restraint system(s) are to be mounted. In some embodiments, the motor vehicle in which the vehicle seat and associated restraint system components are to be mounted is illustratively, but not exclusively, an off-road motor vehicle such as an all-terrain vehicle (ATV) or the like. It will be understood that the vehicle seat and/or one or more restraint components may alternatively be mounted within other motor vehicles without limitation. It will be further understood that whereas the vehicle seat and associated restraint system is illustrated in the attached drawings and described below as including multiple different occupant and vehicle seat restraint components, the illustrated seat or other motor vehicle seat may alternatively be outfitted with only a single one or any combination of any of the multiple different occupant and/or vehicle seat restraint components described herein by example.

Figure 1B:
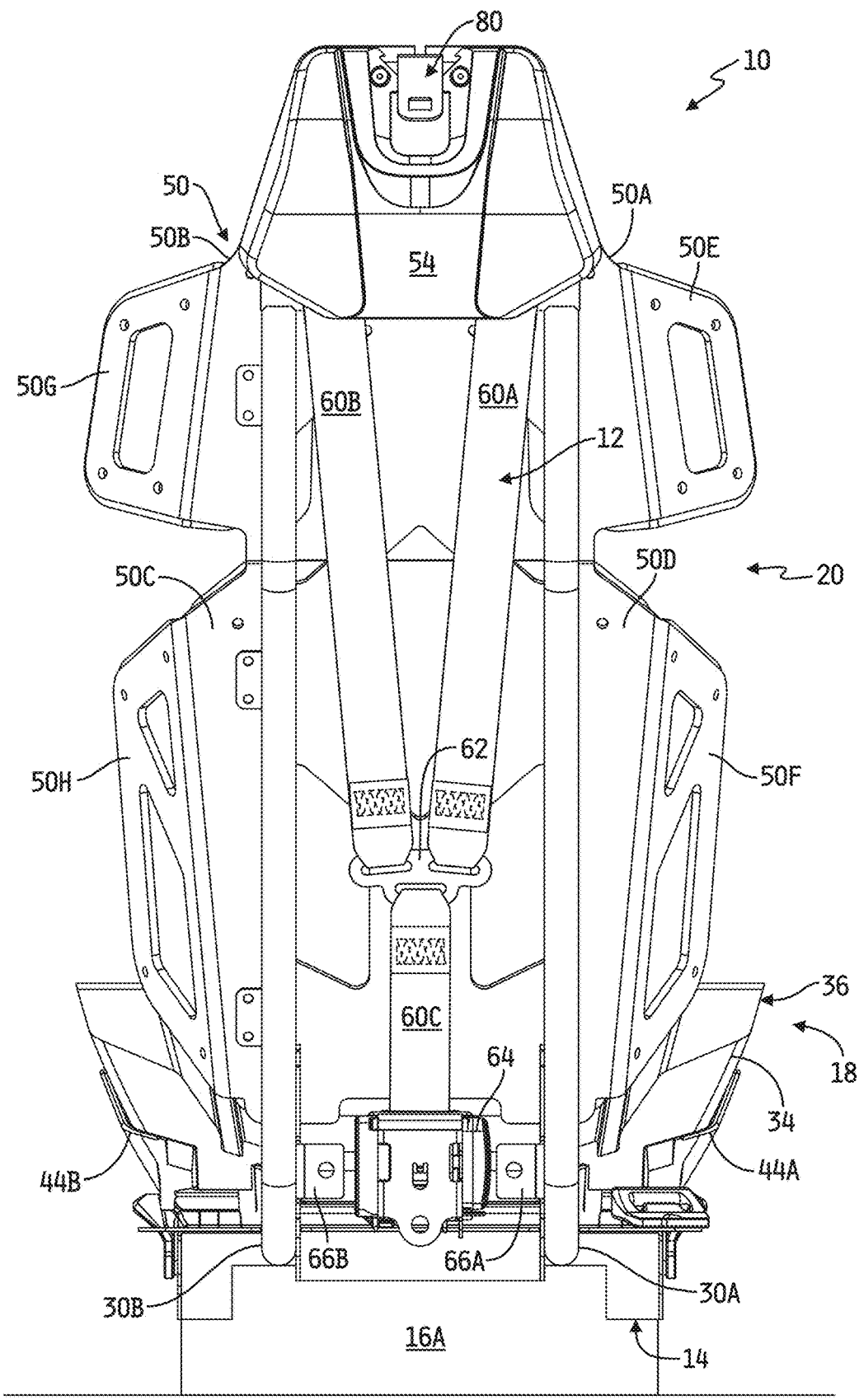
FIG. 1B is a rear elevational view of the vehicle seat and occupant restraint system of FIG. 1.
Figure 2:
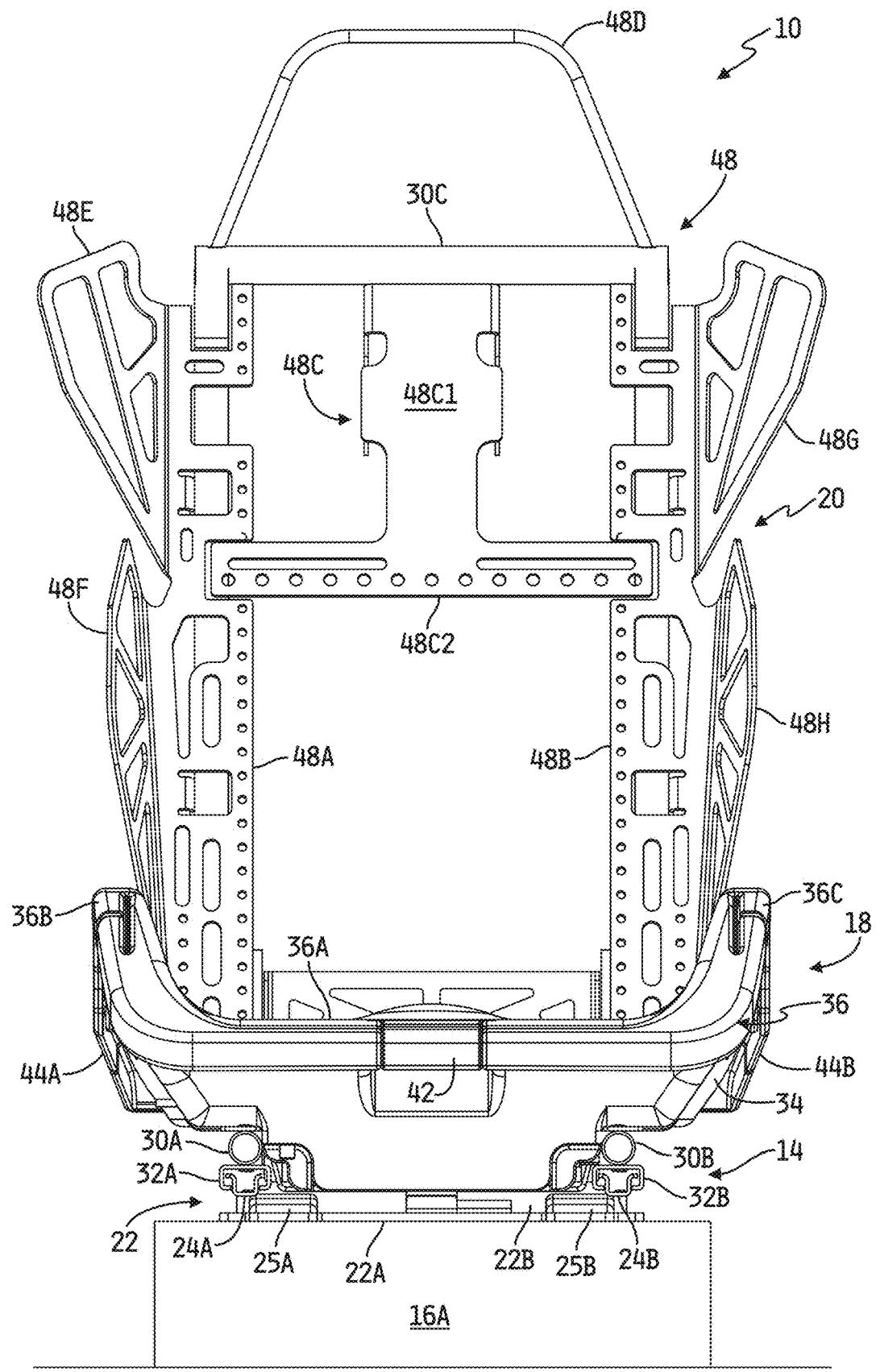
FIG. 2 is a front elevational view of the vehicle seat of FIGS. 1 and 2 with the occupant restraint system removed and with the various panels and cushion pads removed from the seat back to illustrate an embodiment of frame components making up a support frame of the seat back.
Figure 3:
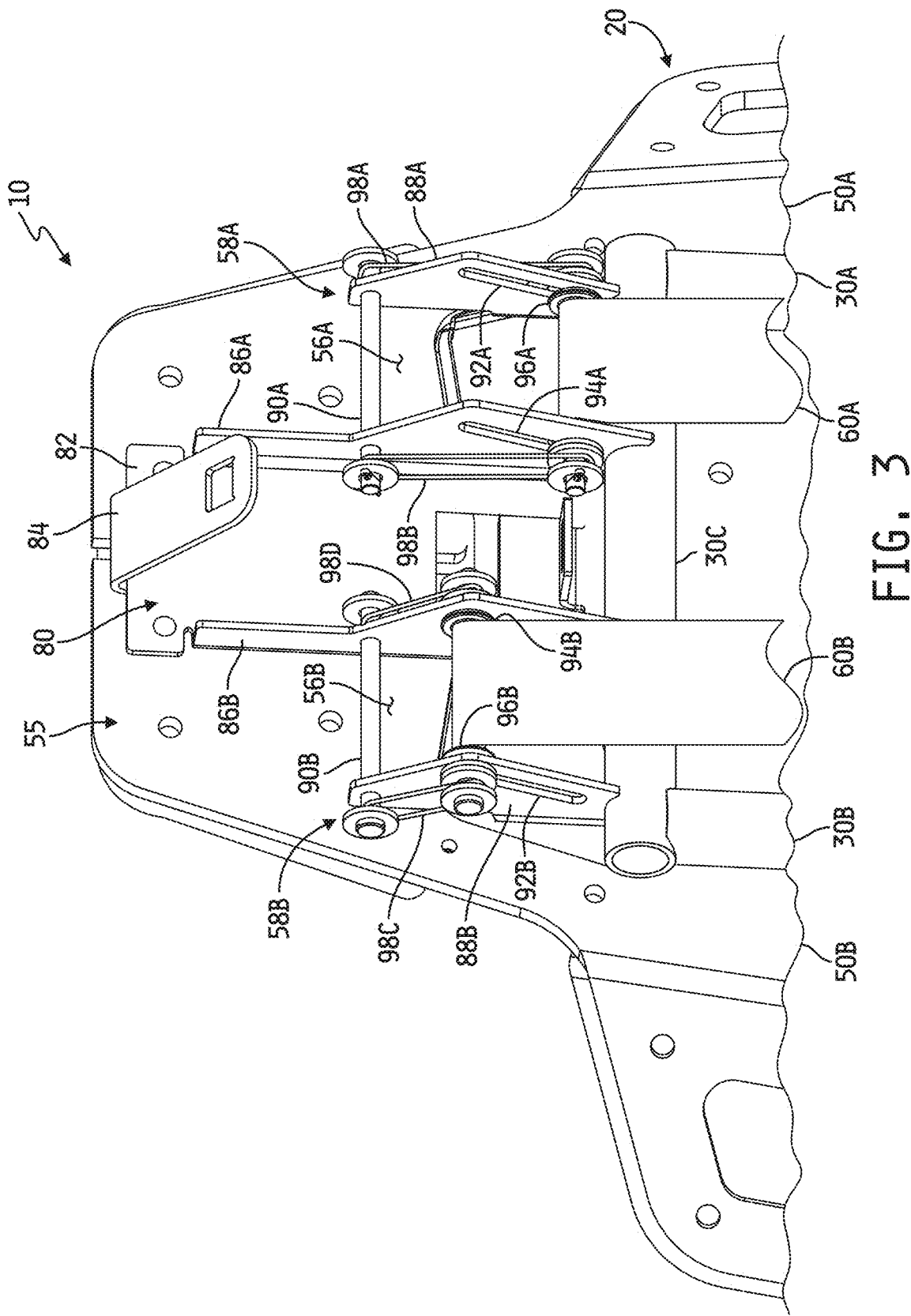
FIG. 3 is a magnified and rear perspective view of an upper portion of the seat back of the vehicle seat of FIGS. 1A-2 with various panels removed from the seat back to illustrate an embodiment of, and operation of, shoulder web attenuators mounted to the seat back and to illustrate an embodiment of an engagement assembly mounted to the seat back and configured to engage an embodiment of a seat restraint system.

Referring now to FIGS. 1-3, an embodiment of a vehicle seat 10 operatively mountable in a motor vehicle and an occupant restraint system 12 therefor is shown. In the illustrated embodiment, the vehicle seat 10 includes a seat base 14 mountable to a floor or floor frame of a motor vehicle. In the illustrated embodiment, the floor or floor frame of the motor vehicle is represented by a floor or floor frame component 16A, and a rear structure or frame of the motor vehicle rearwardly of the floor frame component 16A is represented be a rear frame component 16B. In any case, the seat base 14 is illustratively movably coupled to a seat bottom module 18 which is coupled to a seat back module 20 extending upwardly and away from the seat bottom module 18.

The seat base 14 is may be conventional and may include conventional structure(s) for pivoting, i.e., folding, the seat 10 forwardly, e.g., so as to allow for ingress to and exit from a portion of the motor vehicle rearwardly of the seat 10, and/or for sliding the vehicle seat 10 fore and/or aft to selectively position the vehicle seat 10 relative to the motor vehicle. In this regard, a non-limiting embodiment of a seat base 14 is illustrated by example in FIG. 2. Referring to FIG. 2, the example seat base 14 illustratively includes a pivoting mounting plate assembly 22 having face-to-face lower and upper plates 22A, 22B, wherein the lower plate 22A is affixed to the floor or floor frame component 16A, e.g., by conventional fixation elements. The upper plate 22B is illustratively affixed to elongated seat adjustment tracks 24A, 24B respectively disposed along opposite sides of the vehicle seat 10 and both extending at least partially between the front and rear of the vehicle seat 10. Complementary elongated seat adjustment tracks 32A, 22B are affixed to respective frame components 30A, 30B of the vehicle seat 10. The tracks 24A, 24B and the tracks 32A, 32B are configured to slidingly engage one another such that the track 32A is movable along the track 24A and the track 32B is movable along the track 24B. The tracks 24A, 24B and 32A, 32B illustratively include a conventional locking mechanism which is operatively coupled to a lever (not shown) for slidably positioning the tracks 24A, 24B, and thus selectively positioning the seat 10, fore and aft relative to the tracks 32A, 32B to any of a range of positions between a maximum forward position and a maximum rearward position.

The lower plate 22A and the upper plate 22B are hingedly and pivotably coupled to one another via a pair of hinges 25A, 25B positioned along the front of the seat bottom module 14. The lower plate 22A of the mounting plate assembly 22 is thus hingedly coupled to the upper plate 22B along the front of the seat bottom module 18. As illustrated by example in FIGS. 11B, 15A and 15B, the vehicle seat 10 is illustratively pivotable about the hinges 25A, 25B such that the vehicle seat 10 is pivotable forwardly from an occupant support position in which the plates 22A, 22B are face-to-face and, in some embodiments, in contact with one another along their opposing faces, to any of a range of forwardly tilted positions in which the opposed faces of the plates 22A, 22B are separated from one another and form an angle therebetween relative to the hinges 25A, 25B. In the forward tilted position of the vehicle seat 10, access may be had, for example, to a rear seat or rear compartment of the motor vehicle. The vehicle seat 10 is pivotable about the hinges 25A, 25B from any such position back to the occupant support position illustrated in FIGS. 1A-2, wherein the plate 22A remains affixed to the floor frame component 16A and the plate 22B travels with the seat 10.

It bears pointing out that the embodiment of the seat base 14 illustrated in FIG. 2 and described above is provided only by way of example, and is not intended to be limiting in any way. Those skilled in the art will recognize other configurations of the seat base 14 that may be used to mount the vehicle seat 10 to a motor vehicle, and it will be understood that any such other seat base configurations are intended to fall within the scope of this disclosure. Some such alternate embodiments may be configured to be slidably positionable fore and/or aft only (i.e., not pivotable), some may be configured to be pivotable only (i.e., not slidably positionable) and some may be configured to be both slidably positionable and pivotable as just described.

The seat bottom module 18 illustratively includes a seat module base 34 secured to the frame components 30A, 30B of the vehicle seat 10. An occupant support panel 36 is secured to the seat base 34 and illustratively defines a recessed center portion 36A flanked by upwardly extending side walls 36B, 36C at respective opposite sides of the vehicle seat 10. A seat cushion 38 is mounted or otherwise disposed in the center portion 36A, and side cushions 40A, 40B are illustratively disposed on either side of the seat cushion 36A. In some embodiments, the side cushions 40A, 40B are integral with the seat cushion 36A, i.e., such that the cushions 36A, 40A, 40B are together of unitary constructions, although in other embodiments one or both of the side cushions 40A, 40B is/are structurally separate from the seat cushion 36A.

Figure 8:
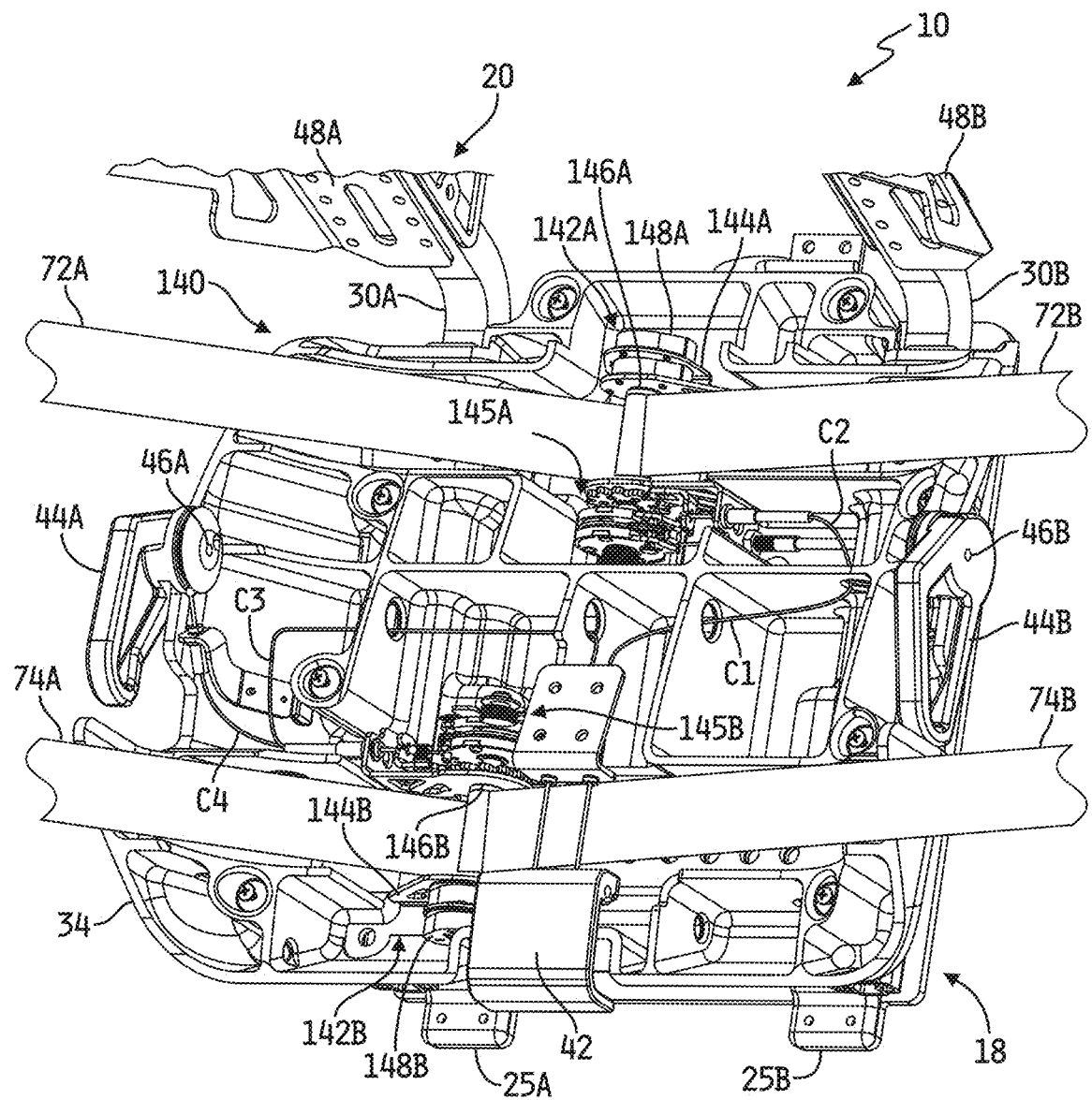
FIG. 8 is a magnified and front perspective view similar to FIG. 7 but with the occupant support panel removed to illustrate an embodiment of a ratcheting web adjustment apparatus for selectively adjusting the lengths of the lap and thigh webs each independently of the other.
Figure 9:
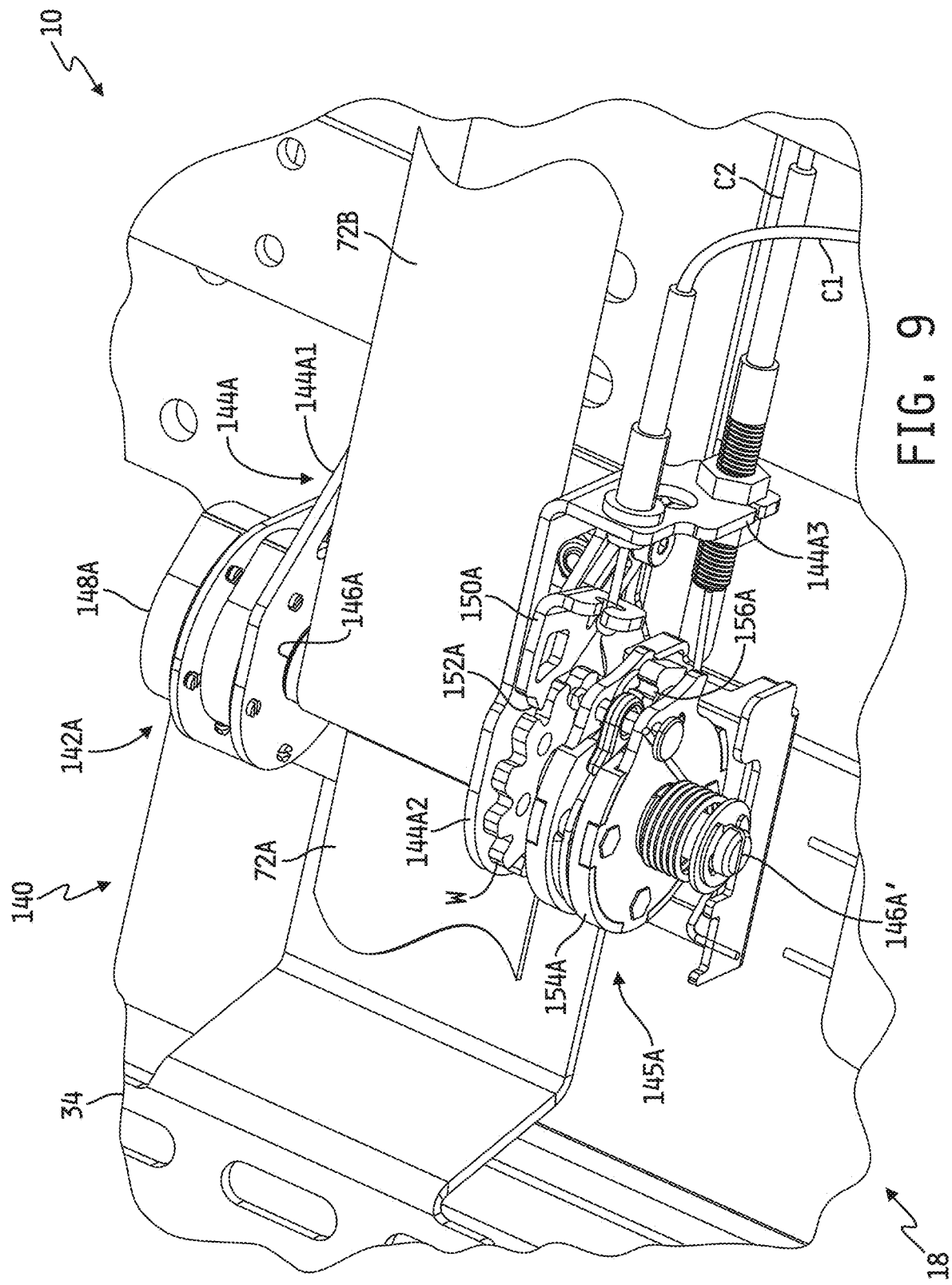
FIG. 9 is a magnified view of an embodiment of one of the ratcheting web retractors of the ratcheting web adjustment apparatus illustrated in FIG. 8.

A ratcheting web adjustment apparatus is illustratively mounted to and within the seat base 34, and a non-limiting example embodiment of such an apparatus 140 is illustrated in FIGS. 7-9, the details of which will be described below. Another non-limiting example of such a ratcheting web adjustment apparatus that may be used with the vehicle seat 10 is illustrated and described in U.S. Pat. No. 9,884,609, which is assigned to the assignee of this disclosure, and the contents of which are expressly incorporated herein by reference in its entirety.

Some of the actuator components of the ratcheting web adjustment apparatus 140 are accessible externally to the seat base 34, and are illustrated in FIGS. 1A-3. A manually actuatable release lever 42, for example, is illustratively mounted centrally along front, top rim of the occupant support panel 36, and manually actuatable ratcheting levers 44A, 44B are mounted on either side of the seat module base 34. The mechanical coupling of the release lever 42 and of the ratcheting levers 44A, 44B to other components of the ratcheting web adjustment apparatus 140, as well as the functionality thereof, will be described in detail below with respect to FIGS. 7-9.

The seat back module 20 illustratively includes a seat back frame 48, as best seen in FIG. 2, mounted, i.e., affixed or attached, to the vehicle seat frame members 30A, 30B, each of which extend upwardly from the seat base module 18 and along either side of the seat back module 20. The seat frame members 30A, 30B are illustratively joined together at their top ends along an upper portion of the rear surface of the seat back module 20 by a cross-frame member 30C. The seat back frame 48 illustratively includes a pair of spaced-apart side frame members 48A, 48B defining the opposite sides of the seat back module 20 and both extending upwardly away from the seat base module 18 to a headrest frame 48D coupled to the top ends thereof. A central seat back frame member 48C, illustratively in the shape of an inverted T, has a lateral frame portion 48C1 extending between and coupled to each of the side frame members 48A, 48B at approximately mid-points thereof, and a longitudinal frame portion 48C2 which extends upwardly toward the cross-frame member 30C from approximately the middle portion of the lateral frame portion 48C1. The top end of the longitudinal frame portion 48C2 is illustratively coupled to the cross-frame member 30C at approximately a mid-point thereof. Opposing upper wing frame members 48E, 48G extend laterally or transversely from opposite sides of the respective side frame members 48A, 48B, and opposing lower wing frame members 48F, 48H also extend laterally or transversely from opposite sides of the respective side frame members 48A, 48B below respective ones of the upper wing frame members 48E, 48G. In the illustrated embodiment, the lower wing frame members 48F, 48H are positioned just above the seat bottom module 18 and are vertically spaced apart from the upper wing frame members 48E, 48G positioned adjacent to the cross-frame member 30C.

Figure 4:
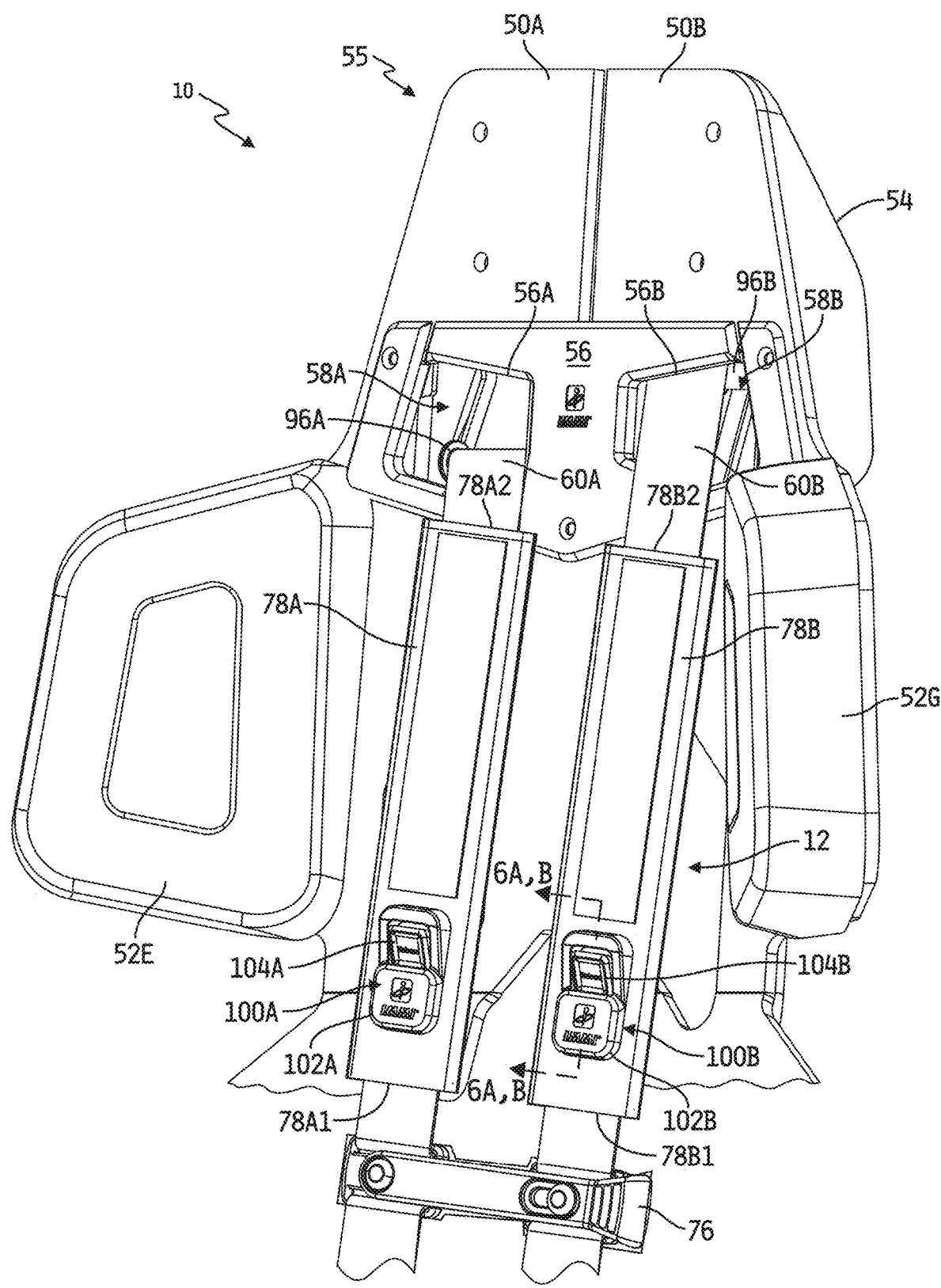
FIG. 4 is a magnified and front perspective view of an upper portion of the seat back of the vehicle seat of FIGS. 1A-3 further illustrating operation of the shoulder web attenuators illustrated in FIG. 3 and illustrating an embodiment of positional adjusters coupled to the shoulder web sleeves shown in FIG. 1A for selectively adjusting positions of the shoulder sleeves relative to the shoulder webs and relative to the vehicle seat back.
Figure 5:
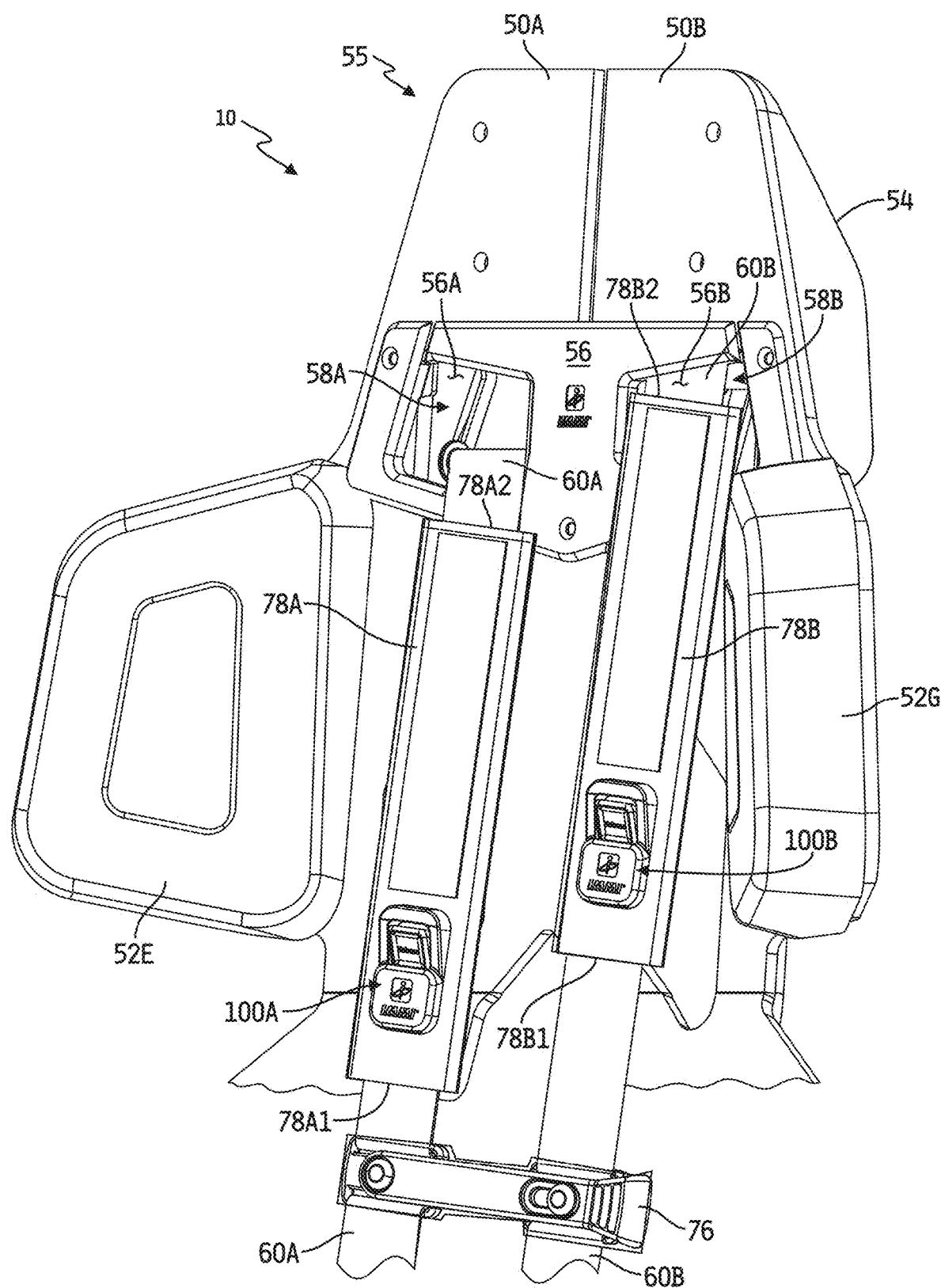
FIG. 5 is a magnified and front perspective view similar to FIG. 4 and illustrating repositioning of one of the shoulder web sleeves via actuation of a corresponding one of the positional adjusters.

Referring now specifically to FIGS. 1A and 1B, a seat back panel 50 is illustratively mounted, i.e., affixed or attached, to the seat back frame 48. The seat back panel 50 illustratively includes two upper side panel sections 50A, 50B each mounted to a respective one of the side frame members 48A, 48B, and two lower side panel sections 50C and 50D likewise mounted to respective ones of the side frame members 48B below the upper side frame members 50A, 50B. Upper portions of the upper side panel sections 50A, 50B together define a headrest panel section 55 mounted to the headrest frame 48D. Opposing upper wing panel members 52E, 52G are mounted to respective ones of the upper wing frame members 48E, 48G, and opposing lower wing panel members 52F, 52H are likewise mounted to respective ones of the lower wing frame members 48F, 48H. A rear headrest cover 54 is illustratively mounted over the rearwardly facing surface of the headrest panel 55 as best shown in FIG. 2. A shoulder web guide plate 56 is illustratively mounted over the forwardly facing surface of the headrest panel 55, and the guide plate 56 defines laterally spaced apart openings 56A, 56B through which respective shoulder webs of the occupant restraint system 12 pass between the front and rear of the seat back module 20. In one embodiment, shoulder web attenuators 58A, 58B are mounted to the seat back frame components 30C, 48D and illustratively to the portions of the seat back panel sections 50A, 50B that form the headrest panel 55. An example of one structural embodiment of the shoulder web attenuators 58A, 58B is illustrated in FIGS. 3-5, and the functionality and operation thereof will be described in detail below.

Upper seat back cushions or pads 52A, 52B are mounted, e.g., affixed or otherwise secured, to respective ones of the upper side panel sections 50A, 50B, and lower seat back cushions or pads 52C, 52D are likewise mounted, e.g., affixed or otherwise secured, to respective ones of the lower side panel sections 50C, 50D. In the illustrated embodiment, the upper seat back cushions 52A, 52B are non-detachably secured to the respective panel sections 50A, 50B, and the lower seat back cushions 52C, 52D are both detachably mounted to the respective panel sections 50C, 50D so as to be removable and/or repositionable. In some alternative embodiments, the upper cushions 52A, 52B may be detachable, and in other alternate embodiments none of the cushions 52A-52D are detachable or repositionable. Wing cushions 52E, 52G, 52F, 52H are affixed to respective ones of the wing panel members 50E, 50G, 50F, 50H, and a head rest cushion 52I is illustratively affixed to the head rest panel section 55. In the illustrated embodiment, the cushions 38, 40A, 40B and 52E-52I are all non-detachably affixed to their respective structures, although in alternate embodiments one or more such cushions may be detachable so as to be replaceable and/or repositionable. The seat back panel 50 is illustratively a rigid material, as is the seat module base 34 and the occupant seat panel 36, and in one embodiment such components are made of one or more conventional rigid plastic materials. In some embodiments, one or more of the seat back panel 50, the seat module base 34 and the occupant seat panel 36 may be structurally reinforced using one or more conventional reinforcing materials. In some embodiments, the upper wings 48E/50E, 48G/50G and/or the lower wings 48F/50F, 48H/50H may be adjustable, e.g., vertically, horizontally and/or semi-flexibly positionable.

The occupant restraint system 12 is a multi-point restraint system and in this regard the restraint system 12 may be configured to have two or more points of restraint. In the illustrated embodiment, the restraint system 12 is a 6-point restraint system, although in alternate embodiments the restraint system 12 may be configured to have more or fewer points of restraint. Referring to FIGS. 1A and 1B in particular, the illustrated occupant restraint system 12 includes two shoulder webs 60A, 60B each extending through a respective one of the openings 56A, 56B in the shoulder web guide plate 56. One end of each web 60A, 60B extends and downwardly along the rear surface of the seat back module 20 and is illustratively coupled to a Y-connector 62. One end of another web 60C is also coupled to the Y-connector 62 and an opposite end is operatively coupled to a conventional web retractor 64 mounted to the seat back frame 48 adjacent to the seat base 14. In alternate embodiments, the Y-connector 62 may be omitted and each of the shoulder webs 60A, 60B may be coupled to a respective one of two conventional web retractors mounted to the seat back frame 48. As depicted by example in FIG. 1B, mounting structures 66A, 66B are provided on the seat back frame 48 for this purpose. The web retractors 64 (or two web retractors in alternate embodiments) are illustratively conventional inertial locking retractors. In one embodiment, the web retractor 64 is provided in the form of conventional automatic locking retractor (ALR), although in alternate embodiments the web retractor 64 may be provided in the form of a conventional emergency locking retractor (ELR) or other suitable inertial locking retractor.

The opposite ends of the webs 60A, 60B are each coupled to a respective one of a pair of web attachments members 68A, 68B. Between the web attachment members 62A, 62B and the web retractor 64, the shoulder webs 60A, 60B each pass through the guide plate 56 as described above, and each is supported on and by a respective one of the shoulder web attenuators 58A, 58B. The shoulder web attenuators 58A, 58B are each illustratively configured to attenuate movement of the shoulder webs 60A, 60B during operation of the motor vehicle as will be described in detail below. The shoulder web 60A thus extends upwardly from the Y-connector 62 along the back side of the seat back module 20, through the web attenuator 58A, through the seat back panel 50 and then downwardly along the front side of the seat back module 20 and into engagement with the web attachment member 68A. The shoulder web 60B likewise extends upwardly from the Y-connector 62 along the back side of the seat back module 20, through the web attenuator 58B, through the seat back panel 50 and then downwardly along the front side of the seat back module 20 and into engagement with the web attachment member 68B. The shoulder webs 60A, 60B thus run substantially parallel with and spaced apart from one another so as to extend over respective shoulders and downwardly along a torso of an occupant seated in the vehicle seat 10.

Adjacent to the front portion of the seat back panel 50 through which the shoulder webs 60A, 60B pass, the shoulder web 60A passes through an elongated web sleeve or pad 78A and the shoulder web 60B likewise passes through another elongated web sleeve or pad 78B. A cross strap 76 is illustratively affixed to the shoulder web 60A between the sleeve or pad 78A and the web attachment member 68A, and the cross strap 92 is configured to be releasably secured to the shoulder web 60B as illustrated by example in FIG. 1A. The positions of the web sleeves 78A, 78B relative to the shoulder webs 60A, 60B are illustratively each independently adjustable along a respective one of the shoulder webs 60A, 60B as will be described in detail below with respect to FIGS. 4-6B.

The illustrated occupant restraint system 12 further includes two lap webs 72A, 72B each coupled at one end to a respective one of the web attachment members 68A, 68B. The lap webs 72A, 72B each extend through the occupant support panel 36 and into engagement with the ratcheting web adjustment apparatus 140 as will be described in detail below. In the illustrated embodiment, the lap webs 72A, 72B comprise a single length of web operatively coupled to apparatus 140, although in other embodiments the lap webs 72A, 72B may be separate from one another.

The illustrated occupant restraint system 12 further includes two thigh restraint webs 74A, 74B each coupled at one end to a respective one of the web attachment members 68A, 68B. The thigh webs 74A, 74B each extend through the occupant support panel 36 and into engagement with the ratcheting web adjustment apparatus 140 as will be described in detail below. In the illustrated embodiment, the thigh webs 74A, 74B comprise a single length of web operatively coupled to apparatus 140, although in other embodiments the thigh webs 74A, 74B may be separate from one another. Operation of the ratcheting web adjustment apparatus will be described in detail below with respect to FIGS. 7-9.

The restraint system 12 further includes engagement members 70A, 70B mounted to or integral with respective ones of the web attachment members 68A, 68B. In the illustrated embodiment, the engagement member 70A is or includes a conventional tongue and the engagement member 70B is or includes a conventional buckle, wherein the tongue of the tongue member 70A is releasably engageable with and to the buckle of the buckle member 70B. In some alternate embodiments, the engagement member 70A may be the buckle member and the engagement member 70B may be the tongue member. In any case, the engagement members 70A, 70B are releasably engageable with and to one another to releasably couple the web attachment members 68A, 68B together as illustrated in FIG. 1A.

Referring now to FIG. 3, an embodiment of the web attenuators 58A, 58B is illustrated by example, along with an engagement assembly 80 configured to releasably engage an embodiment of a seat restraint system for restraining movement, e.g., pivoting and forward sliding, of the vehicle seat 10. Embodiments of the seat restraint system will be described in detail below with respect to FIGS. 10-12. The engagement assembly 80 illustratively includes a bracket or plate 82 mounted flush to the rear surface of the headrest panel 55. Coupled to or integral with the bracket or plate 82 is a tongue member 84 which extends generally rearwardly away from the rear surface of the headrest 55. In the illustrated embodiment, the tongue member 84 extends from the top end of the bracket or plate 82 at a generally acute angle relative to vertical, although in alternate embodiments this angle may be non-acute. In any case, the tongue member 84 is conventional and is configured to releasably engage a conventional buckle member forming part of the seat restraint system as will be described below with respect to FIGS. 10-12. In alternate embodiments, the buckle member may be coupled to the bracket or plate 82 and the tongue member 84 may form part of the seat restraint system.

In the embodiment illustrated in FIG. 3, the web attenuators 58A, 58B each operatively mounted to the seat back module 20 and are each illustratively configured to independently attenuate downward movement of a respective one of the shoulder webs 60A, 60B, i.e., downward movement of the web(s) 60A and/or 60B toward the shoulders of the seat occupant, during operation of the motor vehicle in which the vehicle seat 10 is mounted. In the illustrated embodiment, and referring also to FIG. 4, the guide plate 56 defines laterally spaced apart openings 56A, 56B therethrough just below the head rest panel 55 through which the shoulder webs 60A, 60B extend as described above. The web attenuator 58A illustratively includes opposing brackets 86A and 88A mounted to the headrest 55 alongside respective opposing sides of the opening 56A defined through the guide plate 56. The web attenuator 58B likewise illustratively includes opposing brackets 86B and 88B mounted to the headrest 55 alongside respective opposing sides of the opening 56B defined through the guide plate 56. In the illustrated embodiment, the brackets 86A, 86B are integral with the bracket 82 such that the brackets 82, 86A and 86B are of uniform construction. In alternate embodiments, the bracket 86A and/or the bracket 86B may be separate from the bracket 82. In any case, the brackets 86A, 88A and 86B, 88B are illustratively parallel with one another and each extends rearwardly from the headrest panel 55 on opposite sides of the respective openings 56A, 56B. The brackets 86A, 88A each define respective opposed slots or channels 92A, 94A each illustratively extending at an acute angle relative to vertical from a lower portion of the respective bracket 86A, 88A upwardly to a mid-portion of the respective bracket 86A, 88A. The brackets 86B, 88B likewise each define respective opposed slots or channels 92B, 94B each illustratively extending at an acute angle relative to vertical from a lower portion of the respective bracket 86B, 88B upwardly to a mid-portion of the respective bracket 86B, 88B.

A rod or shaft 90A is mounted to and between the brackets 86A, 88A adjacent to or near a top of the opening 56A, and a rod or shaft 90B is likewise mounted to and between the brackets 86B, 88B adjacent to or near the opening 56B. Opposing ends of another rod or shaft 96A are received within respective slots 92A, 94A of the brackets 86A, 88A, and opposing ends of yet another rod or shaft 96B are received within respective slots 92B, 94B of the brackets 86B, 88B. The rod or shaft 96A thus extends transversely across the opening 56A between the two brackets 86A, 88A, and is movable along the slots 92A, 94A between the terminal ends of the slots 92A, 94A. The rod or shaft 96B likewise extends transversely across the opening 56B between the two brackets 86B, 88B, and is movable along the slots 92B, 94B between the terminal ends of the slots 92B, 94B. A resilient member 98A is coupled between the rod or shaft 90A and the rod or shaft 96A at or near respective ends thereof adjacent to an outer surface of the bracket 88A, and another resilient member 98B is coupled between the rod or shaft 90A and the rod or shaft 96A at or near respective opposite ends thereof adjacent to an outer surface of the bracket 86A, wherein the outer surfaces of the brackets 86A, 88A are those facing away from each other and away from the opening 56A. Another resilient member 98C is coupled between the rod or shaft 90B and the rod or shaft 96B at or near respective ends thereof adjacent to an outer surface of the bracket 88A, and still another resilient member 98D is coupled between the rod or shaft 90B and the rod or shaft 96B at or near respective opposite ends thereof adjacent to an outer surface of the bracket 86B, wherein the outer surfaces of the brackets 86B, 88B are likewise those facing away from each other and away from the opening 56B. Although the rod or shaft 90A acts to securely couple the brackets 86A, 88A to one another and the rod or shaft 90B likewise acts to securely couple the brackets 86B, 88B to one another, it is not essential to the functionality of the web attenuators 58A, 58B to extend the rods or shafts 90A, 90B transversely between the respective brackets. In some alternate embodiments, then, the rods or shafts 90A, 90B may be replaced with simple structures mounted to or integral with the outer surfaces of the brackets 86A, 86B, 88A, 88B suitable for securing a respective one of the resilient members 98A-98D thereto.

The resilient members 98A-98B illustratively operate to suspend the rods or shafts 96A, 96B from the ends of the respective rods or shafts 90A, 90B such that the rod or shaft 96A is moveable within the slots 92A, 94A under bias of the resilient members 98A, 98B and the rod or shaft 96B is moveable within the slots 92B, 94B under bias of the resilient members 98C, 98D. As illustrated in FIGS. 3 and 4, the shoulder web 60A extends through the opening 56A of the guide plate 56 and is supported by the rod or shaft 96A suspended from the ends of the rod or shaft 90A by the resilient members 98A, 98B, and the shoulder web 60B extends through the opening 56B of the guide plate 56 and is supported by the rod or shaft 96B suspended from the ends of the rod or shaft 90B by the resilient members 98C, 98D. The resilient members 98A, 98B and 98C, 98D operate to attenuate downward forces applied by the shoulder webs 60A, 60B to the respective rods or shafts 96A, 96B under dynamic operating conditions of the motor vehicle in which the vehicle seat 10 is mounted. Illustratively, the resilient force of the of the resilient members 98A-98D, i.e., the amount of downward force required to be applied by the respective webs 60A, 60B between the rods or shafts 90A, 90B and the rods or shafts 96A, 96B to move the rods or shafts 90A, 90B a unit distance from one another within the respective slots 92A, 94A and 92B, 94B, may be selected based on the application. In some embodiments, for example, resilient members 98A-98D of different resilient force may be readily available, and may be selected accordingly. Alternatively or additionally, multiple resilient members 98A-98D per bracket side may be used in either or both of the web attenuators 58A, 58B to achieve a desired resilient force.

In the illustrated embodiment, the resilient members 98A-98D are provided in the form of O-rings or rings of other shapes formed of one or more suitable resilient materials such as rubber, latex, or the like. In other embodiments, the resilient members 98A-98D may be provided in the form of linear, non-linear or piecewise liner shapes of one or more conventional resilient materials. In some such alternate embodiments, the one or more conventional biasing members may be or include one or more conventional springs, e.g., one or more linear or non-linear coil springs, flat springs and/or wire forms embodied as one or more compression springs, one or more extension springs, one or more torsion springs, one or more constant force springs or the like, or any combination thereof. Alternatively or additionally, the one or more biasing members may be or include one or more conventional shock absorbing or shock dampening devices, e.g., such as one or more conventional dashpots, of hydraulic, pneumatic and/or mechanical design. In any case, the one or more biasing members may be selected or designed to have any desired linear or non-linear, constant or non-constant, biasing force(s) to achieve any desired dampening or spring rate.

It will be noted that the acute angle defined by the opposed pairs of slots 92A, 94A and 92B, 94B is selected to at least approximately match an angle at which the shoulder webs 60A, 60B exit the openings 56A, 56B of the guide plate 56 due to the shoulder webs 60A, 60B, in operation, being forced horizontally away from the front surface of the seat back module 20 by a distance corresponding to the thickness of the torso of the seat occupant. In one embodiment, the acute angle is selected to match an approximate torso thickness of an average sized occupant. Other applications will require other considerations as to the angle relative to vertical, if any, of the slots 92A, 94A and 92B, 94B.

Referring now to both FIG. 3 and FIG. 4, the shoulder web 60B illustratively represents static operating conditions of the motor vehicle in which the vehicle seat 10 is mounted and of the occupant being restrained by the restraint system 12. Under such static operating conditions, the vehicle is not imparting any movement to the seat 10, the occupant or the shoulder web 60B, and the occupant is stationary and seated normally in the vehicle seat 10 so as to not impart any outward or other forces on the shoulder web 60B. Under such conditions, no downward force is being applied by the shoulder web 60B to the rod or shaft 96B and the resilient members 98C, 98D are therefore unstretched. In this example, the dimensions and resilient force of the resilient members 98C, 98D have been selected such that, under such static conditions, the rod or shaft 96B supporting the shoulder web 60B thereon is at or near the top of the opening 56B defined through the guide plate 56. In other embodiments, the resilient members 98C, 98D may be selected so as to place the rod or shaft 96B supporting the shoulder web 60B at any desired position within the opening and relative to the rod or shaft 90B.

The shoulder web 60A in FIGS. 3 and 4 illustratively represents a dynamic operating condition of the motor vehicle in which the vehicle seat 10 is mounted and/or of the occupant being restrained by the restraint system 12. Under such a dynamic operating condition, caused by the terrain being traversed by the motor vehicle, an impact of the motor vehicle with another object, or simply by erratic movement of the occupant of the vehicle seat 10, substantial downward force is being applied by the shoulder web 60A to the rod or shaft 96A which has caused the rod or shaft 96A to travel to the terminal ends of the slots 92A, 94A and stretch, i.e., elongate, the resilient members 98C, 98D in the process. Between the two extremes illustrated by example in FIGS. 3 and 4, some dynamic operating conditions may cause the webs 60A, 60B to exert various downward forces on the rods or shafts 96A, 96B which will temporarily cause the resilient members 98A, 98B and/or the resilient members 98C, 98D to temporarily stretch, i.e., elongate, but to then return to their static positions once the dynamic operating condition has passed.

In the illustrated embodiment, each rod or shaft 96A, 96B is movable therein between an upper and lower positions thereof as defined by the dimensions of the respective slots 92A, 94A and 92B, 94B and the resilient force and dimensions of the resilient members 98A-98D. In the illustrated embodiment, the slots 92A, 94A and 92B, 94B are linear and the rods or shafts 96A, 96B accordingly move linearly therein. In other embodiments, the slots 92A, 94A and/or 92B, 94B be non-linear or piece-wise linear, and movement the rods or shaft 96A, 96B in such embodiments will move non-linearly or piecewise linearly therein. In one embodiment, the rods or shafts 96A, 96B are each illustratively biased upwardly within the respective openings 56A, 56B, such that with no downward force applied either of the shoulder webs 60A, 60B the rods or shafts 96A, 96B are both in their upper positions as illustrated by the rod or shaft 96B in FIGS. 3 and 4. A downward force applied to either or both of the shoulder webs 60A, 60B in excess of the upwardly directed biasing force drives the respective rod or shaft 96A, 96B downwardly against the biasing force at least partially toward the lower position(s) of the rods or shafts 96A, 96B relative to the slots 92A, 94A and/or 92B, 94B. A downward force of sufficient magnitude applied to either or both of the shoulder webs 60A, 60B will drive the respective rod or shaft 96A, 96B downwardly against the biasing force to the lowest position(s) of the rod or shaft(s) 96A, 96B relative to the slots 92A, 94A and/or 92B, 94B. The upwardly directed biasing force applied by the resilient members 98A-98D to the rods or shafts 96A, 96B thus acts to attenuate forceful downward movement of the respective shoulder webs 60A, 60B, thereby absorbing at least some amount of the shock force applied to the shoulder webs 60A, 60B during various dynamic operating conditions of the motor vehicle in which the vehicle seat 10 is mounted. In some alternate embodiments, the rods or shafts 96A, 96B may be biased to a "center" position between their upper and lower positions. In such embodiments, pairs of the rods or shafts 96A, 96B may positioned in the slots 92A, 94A and 92B, 94B with the shoulder webs 60A, 60B passing between each respective set and with each pair biased both upwardly and downwardly against the brackets 86A, 88A and/or 86B, 88B such that a downward force of sufficient magnitude applied to either or both of the shoulder webs 60A, 60B will drive the respective rod or shaft 96A, 96B downwardly against the biasing force toward or to the lower position(s) thereof, and such that an upward force of sufficient magnitude applied to either or both of the shoulder webs 60A, 60B will drive the respective rod or shaft 96A, 96B upwardly against the biasing force toward or to the upper position(s) thereof.

It will be understood that in embodiments of the vehicle seat 10 in which the shoulder webs 60A, 60B do not pass through the seat back module 20 but instead pass over the top of the seat back module 20, e.g., on either side of the head rest 55, the shoulder web attenuators 58A, 58B may be mounted to the seat back module 20 in a manner that positons them above the top of the seat back panel 50 on either side of the head rest panel 55.

Referring now to FIGS. 4-6, the web sleeves 78A, 78B are each independently adjustable along a respective one of the shoulder webs 70A, 70B to selectively position a respective sleeve 78A, 78B relative to a shoulder of an occupant of the vehicle seat 10 and/or relative to the seat back 20. In the illustrated embodiment, the web sleeves 78A, 78B are elongated sleeves each having one respective end $78A_1$, $78B_1$ facing toward the cross strap 76 and an opposite respective end $78A_2$, $78B_2$ facing toward the web guide plate 56 (or other structure which defines the front surface of the seat back module 20 into which the shoulder webs 60A, 60B extend).

Each web sleeve 78A, 78B includes a respective sleeve position adjuster 100A, 100B operatively coupled thereto and illustratively positioned adjacent to a respective end $78A_1$, $78B_1$ thereof. In alternate embodiments, the sleeve position adjuster 100A and/or the sleeve position adjuster 100B may be positioned elsewhere along the respective web sleeve 78A, 78B. Each sleeve position adjuster 100A, 100B includes a housing 102A, 102B mounted, i.e., attached, affixed or otherwise secured to a respective one of the web sleeves 78A, 78B, and an actuator 104A, 104B, e.g., in the form of a button, lever or other conventional actuator, which is manually actuatable between a normal, unactuated position in which the actuator 104A, 104B engages a portion of a respective one of the shoulder webs 60A, 60B to secure, i.e., clamp, the portion of the shoulder web 60A, 60B and thus fix the position of the sleeve 78A, 78B relative to the shoulder web 60A, 60B, and an actuated position in which the actuator 104A, 104B disengages from the shoulder web 60A, 60B to thus allow the sleeve 78A, 78B to be moved along the respective shoulder web 60A, 60B. In the unactuated or clamped position of the actuator 104A, the position of the respective actuator 104A, 104B, and thus the position of the respective web sleeve 78A, 78B, relative to the respective shoulder web 60A, 60B, is fixed. In the actuated or unclamped position of the actuator 104A, 104B, the respective actuator 104A, 104B, and thus the respective web sleeve 78A, 78B is movable, e.g., slidable, along the respective shoulder web 60A, 60B so as to be adjustably positionable relative to the respective shoulder web 60A, 60B.

Figure 6A:
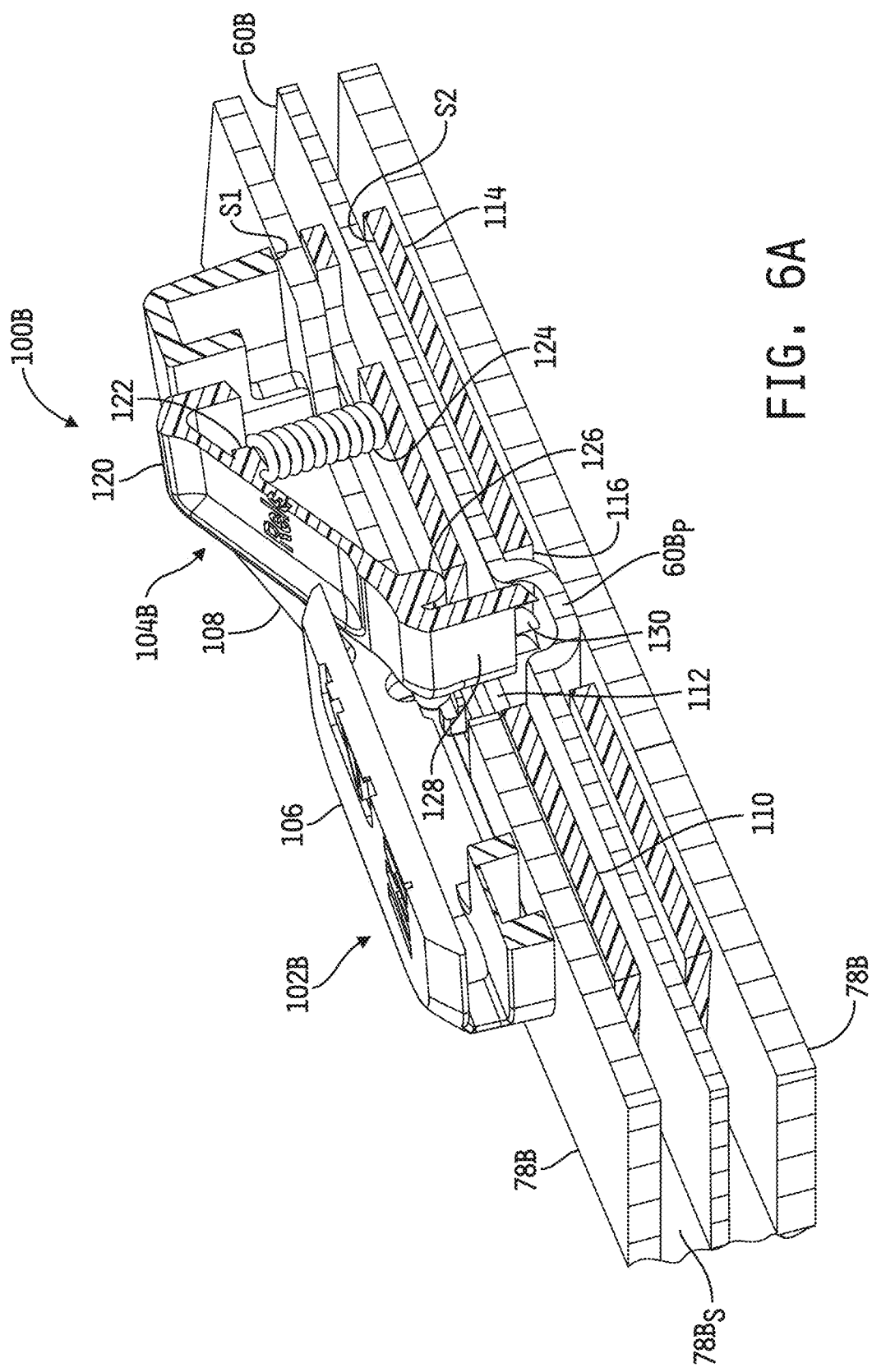
FIG. 6A is a cross-sectional view of one of the shoulder web sleeve positional adjusters illustrated in FIGS. 4 and 5 as viewed along section lines 6A,B-6A,B of FIG. 4 and illustrating an unactuated state of the positional adjuster in which the positional adjuster engages a portion of the shoulder web passing through the sleeve to thereby fix the position of the respective sleeve relative to the shoulder web.
Figure 6B:
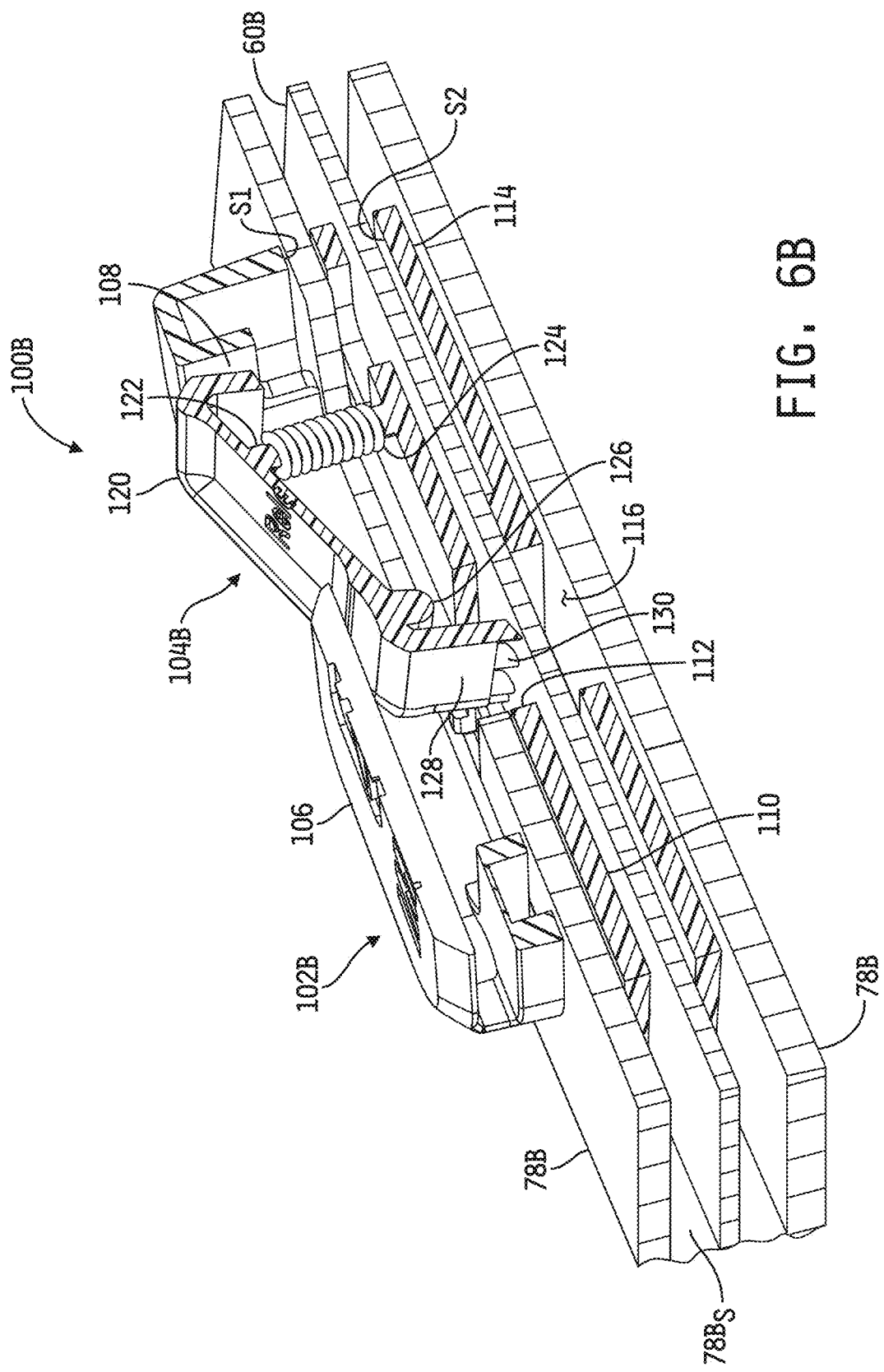
FIG. 6B is a cross-sectional view similar to FIG. 6A and illustrating an actuated state of the positional adjuster in which the positional adjuster does not engage the shoulder web passing through the sleeve so that the sleeve may be moved along the shoulder web and relative to the seat back.

Referring to FIGS. 6A and 6B, an embodiment of the sleeve position adjuster 100A, 100B (illustrated with respect to the adjuster 100B) is shown in cross section. FIG. 6A depicts the unactuated, or clamped, positon of the actuator 104A, and FIG. 6B depicts the actuated, or unclamped position of the actuator 104A. In the illustrated embodiment, the housing 102B of the sleeve positon adjuster 100B includes an upper housing member 106 which defines an opening 108 sized to receive the actuator 104B therein. An upper wall 110 runs substantially parallel with the housing member 106 and defines an opening 112 sized to receive a web clamping portion 128 of the actuator 104B therein. A space S1 is defined between the housing member 106 and the upper wall 110, and the width of the space S1 is selected so as to receive a wall of the sleeve 78B therein as shown. A lower wall 112 runs substantially parallel with the upper wall 110 and defines an opening 116 that aligns with the opening 112 in the upper wall. In one embodiment, the openings 112 and 116 are dimensionally the same and are juxtaposed relative to one another. In alternate embodiments, the openings 112 and 116 may have different dimensions and/or may be at least partially offset from one another. In any case, a space S2 is defined between the upper and lower walls 110, 114 having a width selected so as to receive the thickness of the shoulder web 60B therethrough as shown. The sum of the widths of the spaces S1 and S2, taking into account the thicknesses of the upper and lower walls 110, 112, to be received with the inner space $78B_S$ defined by the sleeve 78B. In the illustrated embodiment, the sleeves 78A, 78B are configured to be closed structures defining inner spaces that wrap completely around or about the shoulder webs 60A, 60B. In alternate embodiments, the sleeve 78A and/or the sleeve 78B may be configured to wrap only partially about the shoulder web(s) 60A and/or 60B.

The actuator 104B illustratively includes a lever portion 120 that is sized to be received within the opening 108. A post 122 extends downwardly from the lever 120 and receives a biasing member 124 positioned between the lever portion 120 and a top surface of the upper wall 110. The web clamping portion 128 of the actuator 104B extends downwardly from one end of the lever portion 120 and into the aligned openings 112, 116 as illustrate in FIG. 6A in the unactuated position of the actuator 104B. In some embodiments, teeth 130 are provided at the terminal end of the web clamping portion 128 to facilitate clamping engagement of the actuator 104B with the shoulder web 60B. In some embodiments, as illustrated by example in FIG. 6A, the actuator 104B includes a stop 126 sized to contact the top surface of the upper wall 110 in the clamped position of the actuator 104B to limit the depth of penetration of the web clamping portion into the aligned openings 112, 116. The actuator 104B is illustratively configured such that the exposed end of the lever portion 120 protrudes upwardly out of the opening 108 in the unactuated positon of the actuator 104B, although in other embodiments the lever portion 120 may be flush with or recessed within the opening 108.

In the unactuated or clamped position of the actuator 104B, the biasing member 124 exerts an upward biasing force to the underside of the lever portion 120 at or near the free end thereof which drives the clamping portion 128 of the actuator 104B into and through the aligned openings 112, 116 and into engagement with the shoulder web 60B as illustrated by example in FIG. 6A. The biasing force of the biasing member 124 is illustratively selected so as to cause the clamping portion 128 of the actuator 104B to drive a portion 60B$_P$ of the shoulder web 60B at least partially into the opening 116, thereby effectively trapping the portion 60B$_P$ of the shoulder web 60B in the opening 116 and fixing the position of the actuator 104B, and thus of the sleeve position adjuster 100B and the sleeve 78B, relative to the shoulder web 60B. In the actuated or clamped position of the actuator 104B, a downward force is applied to the free end of the lever portion 120 that is of sufficient magnitude to overcome the biasing force of the biasing member 124. This downward force moves the free end of the lever portion 120 into the opening 108, thereby driving the clamping portion 128 upwardly and away from the opening 116 as illustrated by example in FIG. 6B. In this position, the clamping portion 128 of the actuator 104B is disengaged from the shoulder web 60B, and the sleeve position adjuster 100B as well as the sleeve 78B may therefore be moved along the shoulder web 60B. In some embodiments, the clamping portion 128 may remain in contact with the shoulder web 60B in the actuated or unclamped position of the actuator 104B, but in such embodiments any force applied by the clamping portion to the shoulder web 60B is not sufficient to prevent movement of the sleeve position adjuster 100B, and thus the sleeve 78B, along the shoulder web 60. For purposes of this disclosure, then, the phrase "the clamping portion 128 of the actuator 104B is disengaged from the shoulder web 60B" when used in the context of the actuated or unclamped position of the actuator 104B will be understood to mean that the clamping portion 128 may not be in contact with the shoulder web or that the clamping portion 128 may be in contact with the shoulder web 60B but not with sufficient force to prevent movement of the actuator 104B and the sleeve 78B relative to the shoulder web 60B.

Referring again to FIGS. 4 and 5, the sleeve 78B is shown in a lower position relative to the shoulder web 60B in FIG. 4, i.e., with the end 78B1 adjacent to the cross strap 76. In FIG. 5, the actuator 104B of the sleeve position adjuster 100B has been manually moved from the normal unactuated, clamped position to the actuated, unclamped position and, with the actuator 104B maintained in the actuated position, the sleeve 78B has been moved upwardly along the shoulder web 60B to position the end 78B2 adjacent to the opening 56B in the guide plate 56. Thereafter, the actuator 104B was released, which caused the actuator 104B to automatically return to the unactuated, clamped position thereof to fix the position of the sleeve 78B relative to the shoulder web 60B.

It will be understood that whereas the web sleeves 78A, 78B are illustrated in the attached figures and described above as being received on the shoulder webs 60A, 60B of the restraint system 12, either or both of the web sleeves 78A, 78B may alternatively or additionally be provided on any of the webs or pairs of webs of the restraint system 12.

Referring now to FIGS. 7-9, operation of the ratcheting web adjustment apparatus 140 will be described. As briefly described above, the ratcheting web adjustment apparatus 140 is configured to selectively (and independently) tighten, i.e., by reducing the length of, the lap web(s) 72A, 72B and/or the thigh web(s) 74A, 74B. In this regard, the apparatus 140 illustratively includes at least two manually ratcheting web retractors operatively mounted therein. Each such manually ratcheting web retractor is illustratively conventional and includes a spool about which a web is wound, at least one toothed gear or wheel mounted to rotate with the spool and a conventional locking mechanism, e.g., a conventional locking pawl which, when engaged with the at least one toothed gear or wheel (i.e., in its locked position), prevents rotation of the spool in the web payout direction but allows manual ratcheting of the spool in the web take-up direction to incrementally take up web on the spool while also preventing payout of the web such that the web is tightened by reducing its length. Each such ratcheting web retractor is further rotationally biased in the web take-up direction such that, when the locking mechanism is disengaged from the at least one toothed gear or wheel (i.e., in its unlocked position), the spool rotates under the bias in the web take-up direction to automatically take up web on the spool. With the locking mechanism disengaged, i.e., unlocked, the spool can be made to rotate in the web payout direction by applying a force to the web in the web payout direction that is greater than the biasing force to thereby pay out web from the retractor.

In the illustrated embodiment, the ratcheting web adjustment apparatus 140 includes two ratcheting web retractors of the type just described. One is coupled via at least one web to the lap web(s) 72A, 72B, and the locking/release mechanism thereof is operatively coupled to the release lever 42. The at least one toothed gear or wheel of this ratcheting web retractor is operatively coupled to the manually actuatable lever 44A mounted on one side of the seat module base 34. In some alternate embodiments, the at least one toothed gear or wheel of this ratcheting web retractor may instead be operatively coupled to the manually actuatable lever 44B mounted on the opposite side of the seat module base 34. The lap web 72A illustratively enters and exits the seat module base 34 via a slot 3662 defined through a top edge 36B1 of the side wall 36B of the occupant seat panel 36, and the lap web 72B illustratively enters and exits the seat module base 34 via a slot 36C2 defined through a top edge 36C1 of the side wall 36C of the occupant seat panel 36, as illustrated by example in FIG. 7. The other ratcheting web retractor is coupled via at least one web to the thigh web(s) 74A, 74B, and the locking mechanism thereof is also operatively coupled to the release lever 42. The at least one toothed gear or wheel of this ratcheting web retractor is operatively coupled to the manually actuatable lever 44B mounted on one side of the seat module base 34, although in some alternate embodiments the at least one toothed gear or wheel of this ratcheting web retractor may instead be operatively coupled to the manually actuatable lever 44A mounted on the opposite side of the seat module base 34. The thigh web 74A illustratively enters and exits the seat module base 34 via a slot 36B3 defined through the top edge 36B1 of the side wall 36B of the occupant seat panel 36, and the thigh web 74B illustratively enters and exits the seat module base 34 via a slot 36C3 defined through the top edge 36C1 of the side wall 36C of the occupant seat panel 36, as illustrated by example in FIG. 7.

The release lever 42 is illustratively operable to simultaneously control the locking states of the locking mechanisms of each ratcheting web retractor of the apparatus 140. In the default position of the lever 42 illustrated in FIGS. 1 and 7, the locking mechanism are in their locked positions to thereby prevent rotation of the web spools in the web payout direction. The lever 42 may be manually actuated, e.g., by pulling upwardly on the lever 42, to cause both locking mechanisms to move to their unlocked positions, thereby allowing web payout from and web retraction within the respective retractors. Upon release of the lever 42, it illustratively returns to the position shown in FIGS. 1 and 7 which simultaneously causes both locking mechanisms to move back to their locked positions, thereby preventing web payout from the respective retractors. It will be understood that the lever 42 may take other conventional forms, and/or be located elsewhere on the vehicle seat 10. In some embodiments, the lever 42 may be provided in the form of two separate levers; one for controlling the locking state of one of the retractors and one for controlling the locking state of the other retractor.

The manually actuatable levers 44A, 44B are each configured to be manually actuated in a manner that causes incremental rotation of the toothed gear(s) of a respective one of the ratcheting web retractors of the apparatus 140 to thereby take up slack, i.e., reduce the length of, the respective web coupled to the respective lap web(s) 72A, 72B or thigh web(s) 74A, 74B, thereby reducing or displacing the length thereof in a manner which tightens the respective lap web(s) 72A, 72B or thigh web(s) 74A, 74B about the occupant. In one embodiment of the apparatus 140 in which the lap webs 72A, 72B are provided in the form of a single length of web and in which the thigh webs 74A, 74B are likewise provided in the form of a single length of web, ratcheting of one of the ratcheting web retractor mounted in the seat module base 34 reduces the length of a web coupled to the single lap web which, in turn, displaces a portion of the single lap web within the seat module base 34, thereby tightening the single lap web about the lap of the occupant of the vehicle seat 10. Likewise, ratcheting of the other ratcheting web retractor mounted in the seat module base 34 reduces the length of another web coupled to the single thigh web which, in turn, displaces a portion of the single thigh web within the base 34, thereby tightening the single thigh web about the thighs of the occupant of the vehicle seat 10. In some alternate embodiments, the apparatus 140 may be configured such that ratcheting of one or more web retractors causes shortening, and therefore tightening, of the one or more lap webs 72A, 72B and such that ratcheting of one or more other web retractors causes shortening, and therefore tightening, of the one or more thigh webs 74A, 74B.

In any case, each manually actuatable lever 44A, 44B is operatively coupled to the toothed gear(s) or wheel(s) of a respective ratcheting web retractor of the apparatus, and is configured to be manually actuated in a manner which causes incremental rotation of the respective toothed gear(s) or wheel(s) in the web take-up direction, thereby tightening a respective one of the lap web(s) 72A, 72B and the thigh web(s) 74A, 74B about the occupant. In the illustrated embodiment, each lever 44A, 44B is rotatable about a respective pivot point 46A, 46B between a lower position, and an upper position. In some embodiments, the lower position is the default position, and each lever 44A, 44B is illustratively biased to the lower position. Alternatively, the upper position may be the default position and each lever 44A, 44B may be biased to the upper position. In other alternate embodiments, only one or neither lever 44A, 44B is biased and therefore has no default position.

In the illustrated embodiment in which each lever 44A, 44B is biased to the lower, default position, each lever 44A, 44B is manually actuated upwardly from the lower position to incrementally rotate the toothed gear(s) or wheel(s) of a respective ratcheting web retractor in the web take-up direction and thereby incrementally tightening a respective one of the lap web(s) and thigh web(s) about the occupant 100. In the illustrated embodiment, each lever 44A, 44B returns under bias to its lower position, where the ratcheting process may be repeated. In embodiments in which the levers 44A, 44B are not biased to the lower position, each lever 44A, 44B must be manually returned to the lower position before repeating the ratcheting process.

Referring not to FIGS. 8 and 9, an example embodiment of the ratcheting web adjustment apparatus 140 is shown. In the illustrated embodiment, the lap webs 72A, 72B are provided in the form of a single length of web coupled to a dual-web retractor 142A mounted in the seat module base 34, and the thigh webs 74A, 74B are likewise provided in the form of a single length of web coupled to a dual-web retractor 142B mounted in the seat base. Examples of such dual-web retractors 142A, 142B are illustrated and described in U.S. Patent Application Ser. No. 62/855,048, filed May 31, 2019, as assigned to the assignee of this disclosure, and the disclosure of which has been expressly incorporated herein by reference in its entirety. The retractors 142A, 142B include frames 144A, 144B to which a spool 146A, 146B is operatively mounted and coupled to a conventional power spring or main spring 148A, 148B configured to bias the spool 146A, 146B in the web take up direction. Each retractor 142A, 142B also includes a ratcheting apparatus 145A, 145B coupled thereto for selectively locking/releasing the retractor 142A, 142B and for incrementally shortening the respective web by ratcheting as described above. The release lever 42 is operatively coupled to the ratcheting apparatus 145A via a conventional cable C1, and the ratcheting lever 44B is operatively coupled to the ratcheting apparatus 145A via another conventional cable C2. The release lever 42 is operatively coupled to the ratcheting apparatus 145B via another conventional cable C3, and the ratcheting lever 44A is operatively coupled to the ratcheting apparatus 145B via another conventional cable C4.

Referring now to FIG. 9, some of the details of one of the web retractor 142A are shown. In the illustrated embodiment, the spool 146A is positioned and mounted between opposing side walls 144A1 and 144A2 of the frame 144A, and the cables C2 and C3 are operatively coupled to another frame wall 144A3 coupled to the side wall 144A2. The ratcheting apparatus 145A illustratively includes a spool extension 146A' couple to and rotating with the spool 146A, and a toothed wheel W rotatably mounted to the spool extension 146A'. A release pawl 150A defines a tooth 152A which normally engages the toothed wheel W when the release lever 42 is in its default position so as to lock the spool 146A from rotating in the web pay out direction. When the release lever 42 is actuated, the cable C1 draws the tooth 152A of the pawl 150A away from the wheel W so as to allow the spool 146A to rotate in the web take up and pay out directions. A conventional ratcheting member 156A is operatively coupled to the spool extension 146A' and includes a conventional rotational component 156A that is rotationally actuatable via the cable C2 to incrementally ratchet the spool 146A in the web take up direction as described above.

Figure 10:
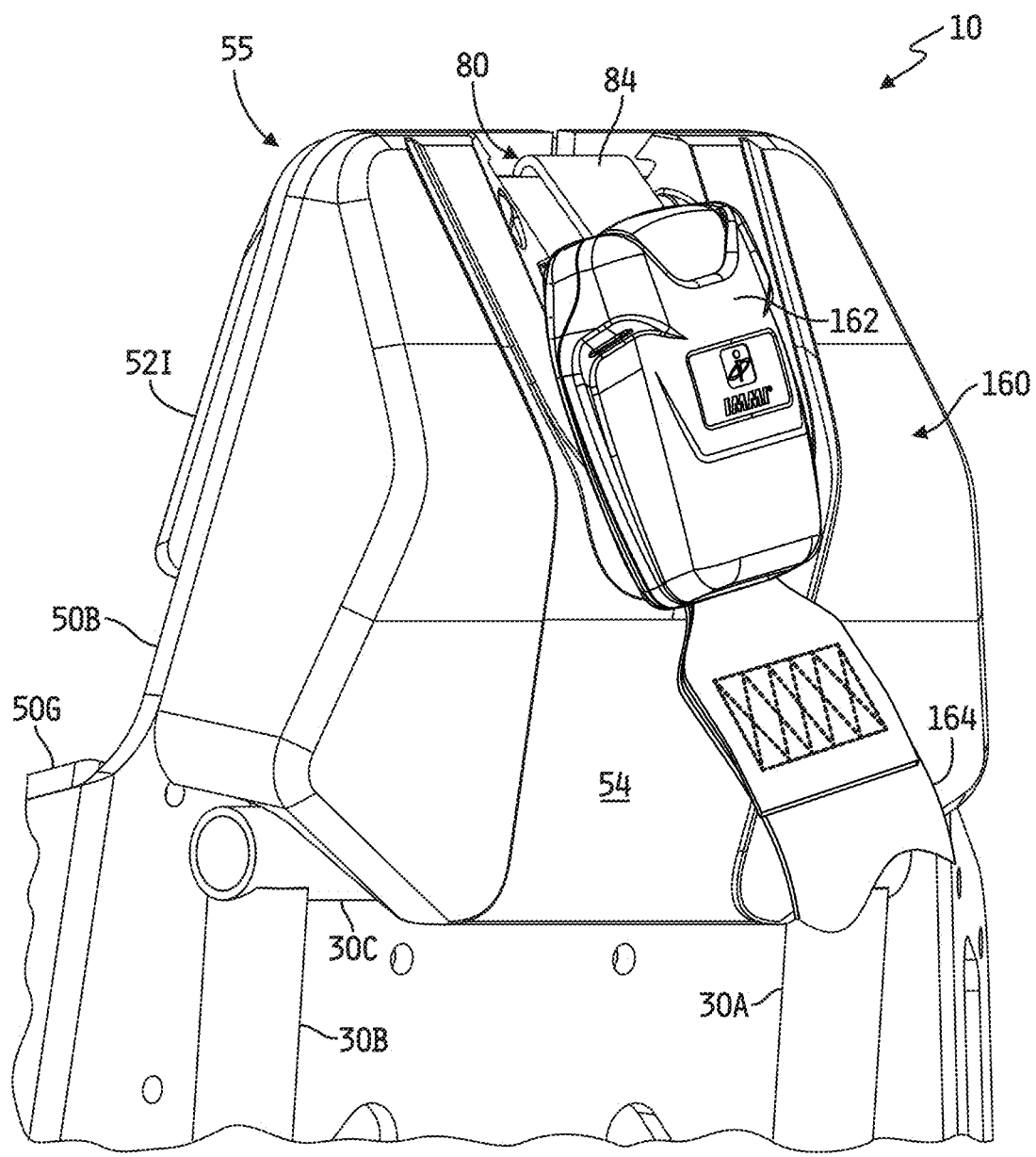
FIG. 10 is a magnified and rear perspective view similar to FIG. 3 and illustrating an embodiment of a portion of a seat restraint system releasably engaging the engagement assembly illustrated in FIG. 3 to restrain forward sliding and/or forward folding or pivoting of the vehicle seat relative to the motor vehicle.
Figure 11A:
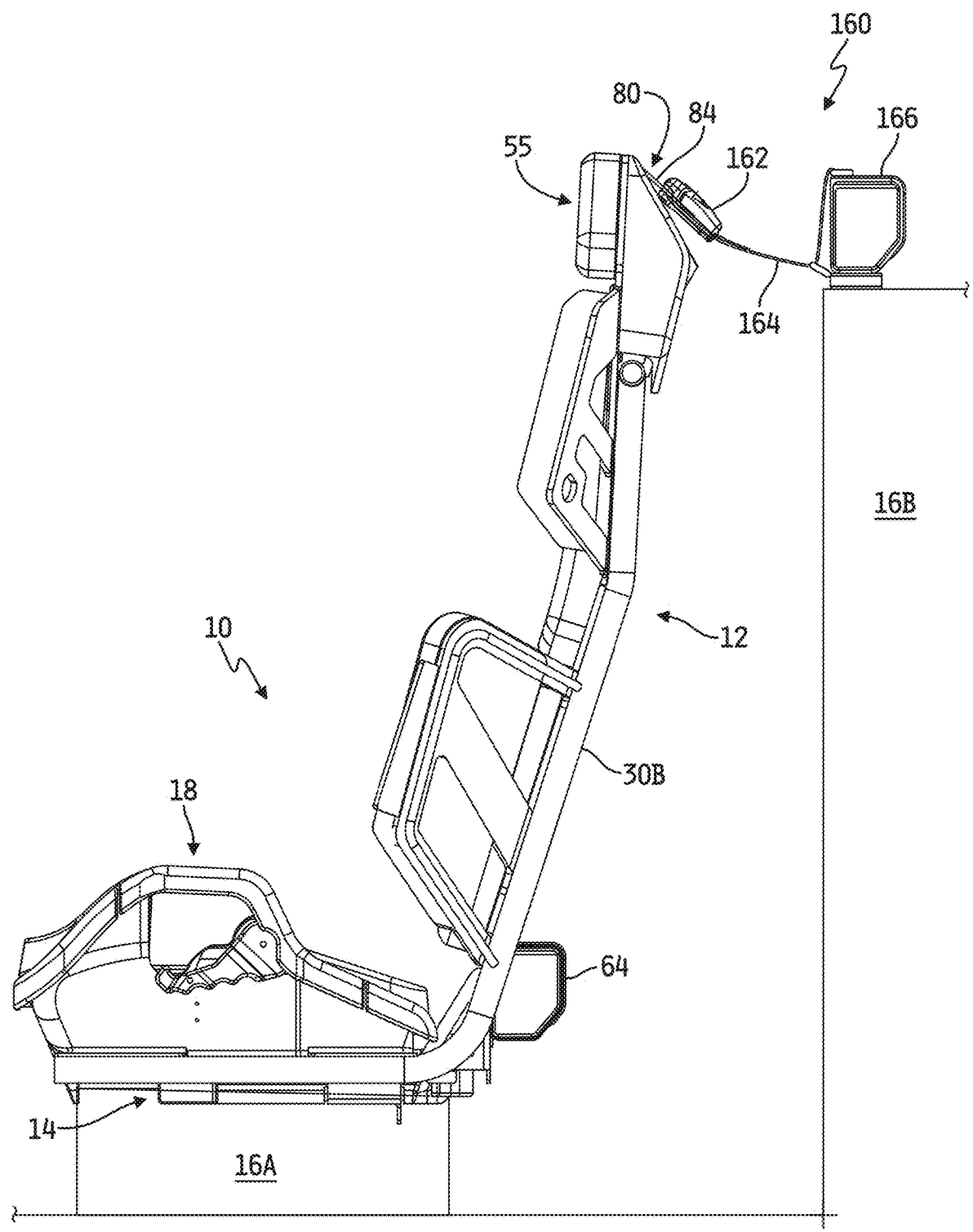
FIG. 11A is a side elevational view of the vehicle seat of FIGS. 1-10 and a portion of the motor vehicle in which the seat is mounted illustrating an embodiment of a seat restraint system, including an inertial locking structure, fixed to the motor vehicle and coupled to the engagement assembly of the vehicle seat for restraining forward sliding and/or forward folding or pivoting of the vehicle seat relative to the motor vehicle under operating conditions of motor vehicle which cause the inertial locking structure to lock.
Figure 11B:
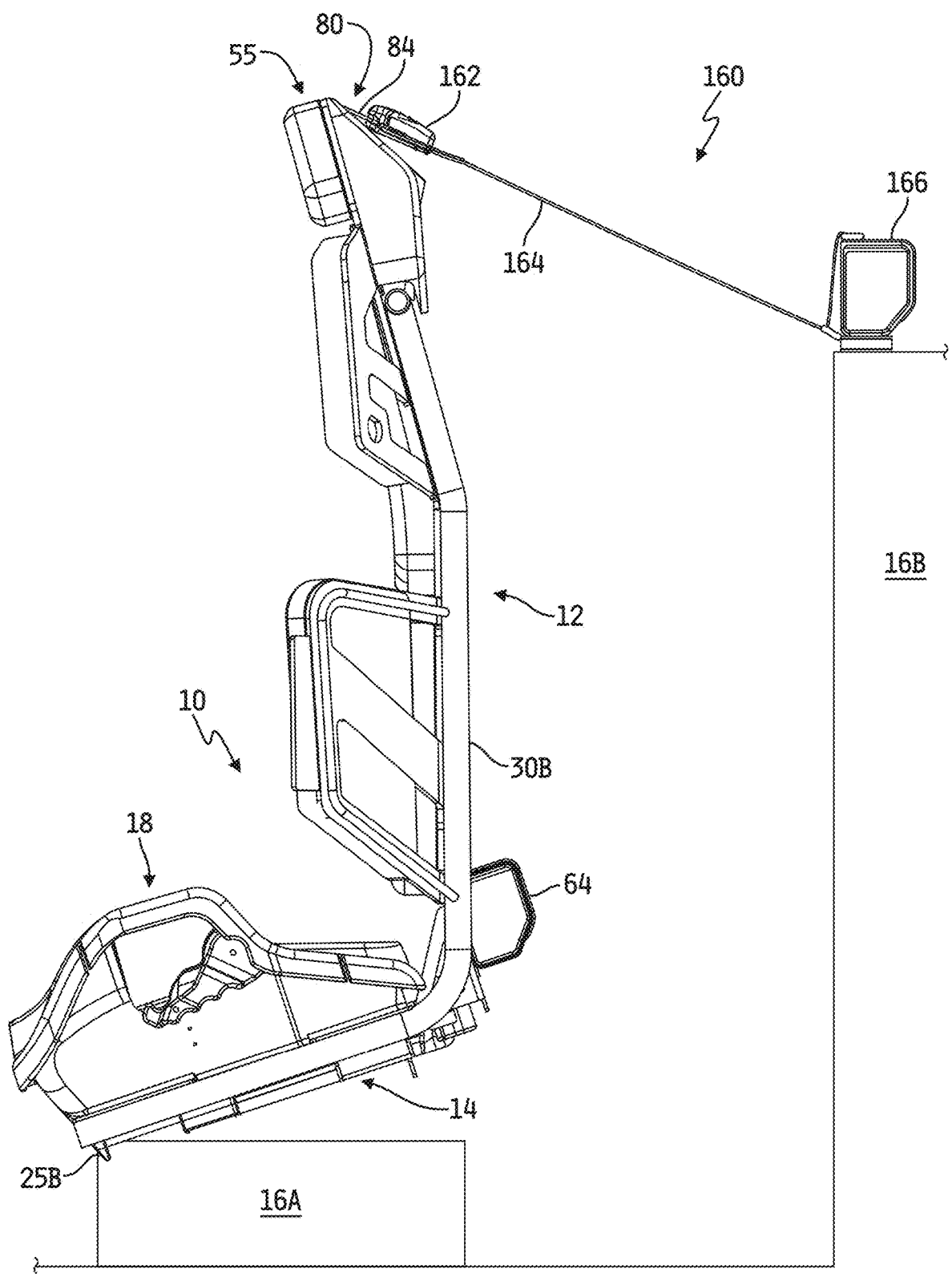
FIG. 11B is a side elevational view similar to FIG. 11A under operating conditions of the motor vehicle which do not cause the inertial locking structure to lock illustrating forward pivoting of the vehicle seat relative to the motor vehicle with the seat restraint system coupled to the engagement assembly of the vehicle seat.
Figure 11C:
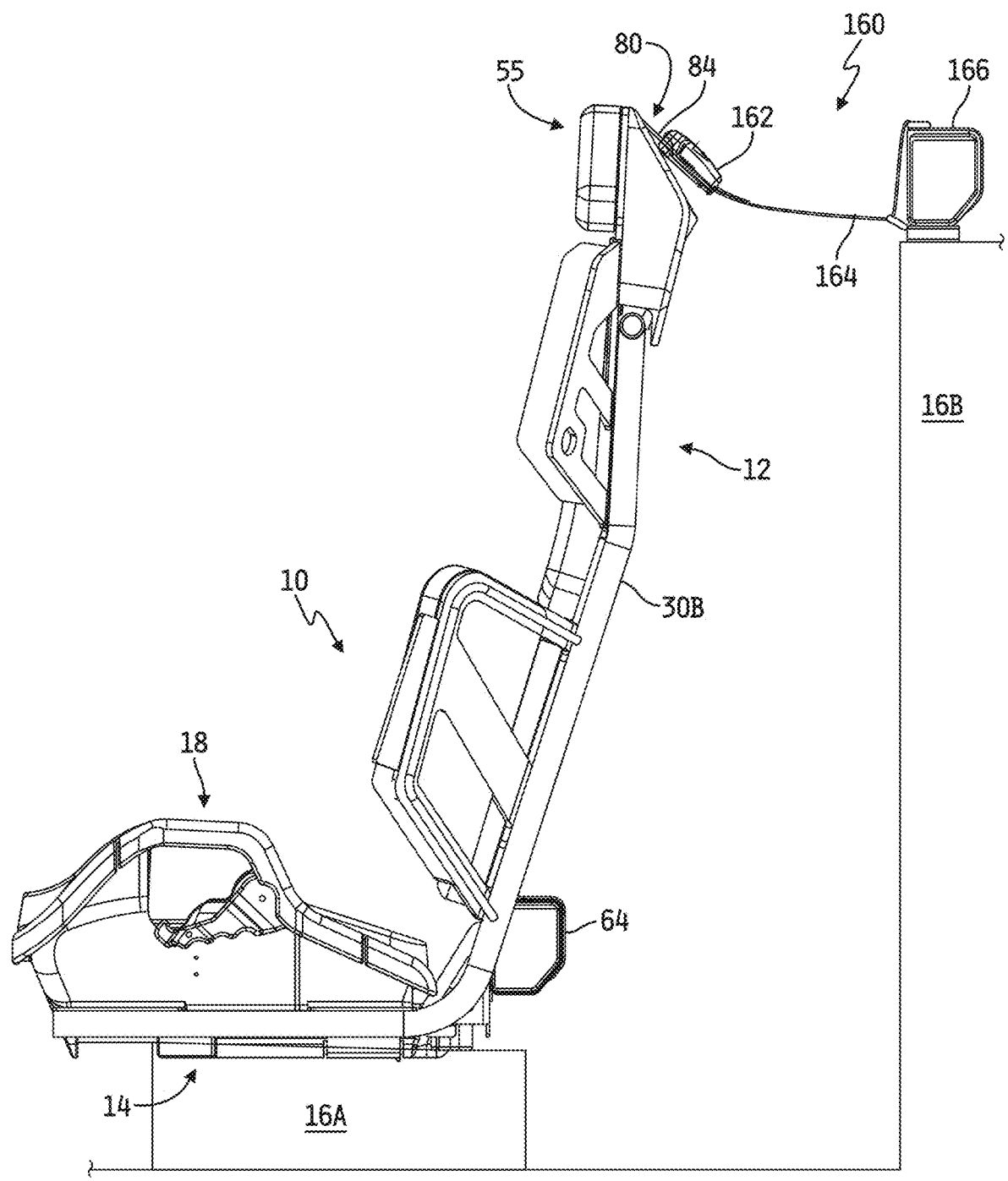
FIG. 11C is a side elevational view similar to FIGS. 11A and 11B under operating conditions of the motor vehicle which do not cause the inertial locking structure to lock illustrating forward sliding adjustment of the position of the vehicle seat relative to the motor vehicle with the seat restraint system coupled to the engagement assembly of the vehicle seat.

Referring now to FIGS. 10-11C, an embodiment of another restraint system 160 is shown for securing the vehicle seat 10 to a frame member 16B of the motor vehicle to prevent, at least under certain conditions, sliding or pivoting movement of the vehicle seat 10 but to allow such movement under static or normal operating conditions. Referring to FIG. 10, a portion of the restraint system 160 is shown which includes a conventional buckle member 162 releasably engaging the tongue member 84 mounted to the vehicle seat 10 as described above. Referring to FIG. 11A, the remainder of the restraint system 160 is shown which includes a conventional inertial locking retractor, e.g., a conventional ALR or ELR or other conventional inertial locking retractor 166, mounted, i.e., affixed, to the frame component 16B of the motor vehicle. One end of a web 164 is operatively attached to the retractor 166 and the other is attached to the buckle 162. Under dynamic operating conditions which results in locking of the inertial locking retractor 166, the vehicle seat 10 is prevented from pivoting forward or from sliding forward as described above. However, under static conditions or under other operating conditions in which the inertial locking retractor 166 is not locked, the vehicle seat 10 may be pivoted forwardly as illustrated by example in FIG. 11B or may be slidably adjusted to a more forward position as illustrated by example in FIG. 11C.

Figure 12:
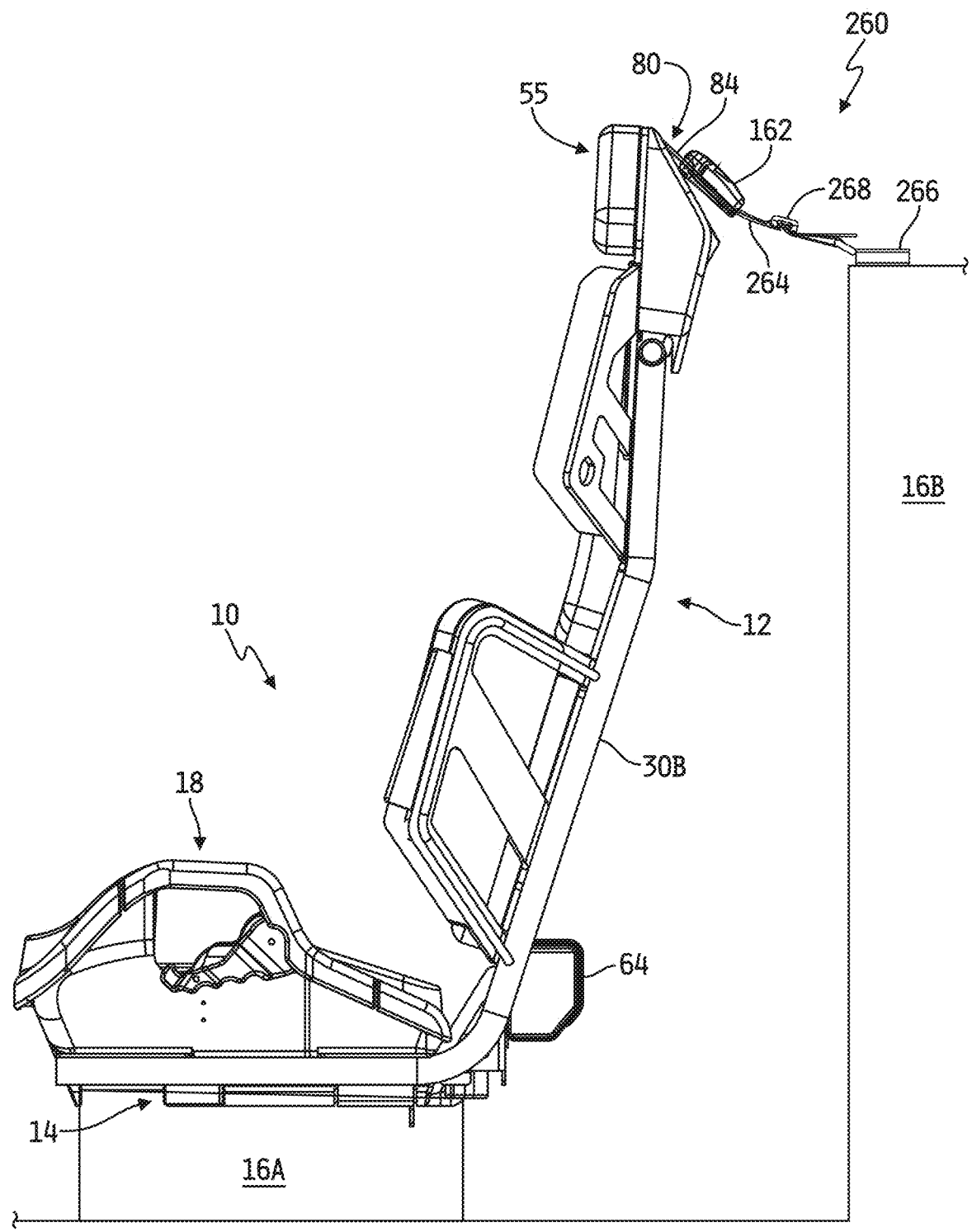
FIG. 12 is a side elevational view of the vehicle seat of FIGS. 1-10 and a portion of the motor vehicle in which the seat is mounted illustrating an embodiment of a manually adjustable seat restraint system fixed to the motor vehicle and coupled to the engagement assembly of the vehicle seat for restraining forward sliding and/or forward folding or pivoting of the vehicle seat relative to the motor vehicle when engaged with the engagement assembly.
Figure 13:
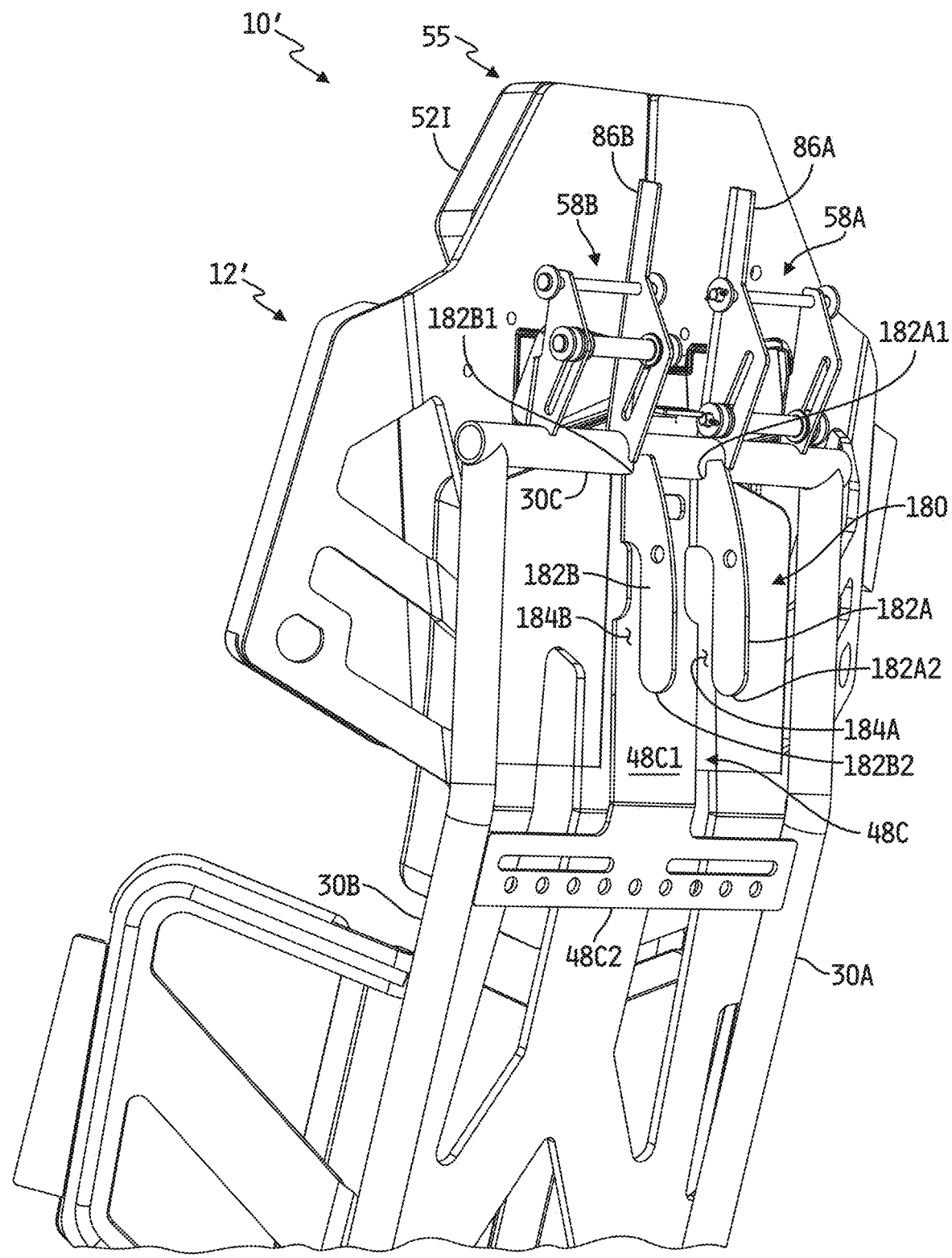
FIG. 13 is a magnified and rear perspective view of an upper portion of a seat back of another embodiment of a vehicle seat with various panels removed from the seat back to illustrate another embodiment of an engagement assembly mounted to the seat back and configured to engage another embodiment of a seat restraint system.

In FIG. 12, a variant 260 of the restraint system is shown in which one end of a web 264 is attached to the buckle 162 and the opposite end is secured to a stationary structure secured to the frame component 16B of the motor vehicle. In some embodiments, a manual web length adjuster 268 may be provided to allow for manual length adjustments of the web 264. In the embodiment illustrated in FIG. 12, the vehicle seat 10 is prevented from pivoting forward or from sliding forward under all conditions, and to pivot the seat 10 forward or slide the seat 10 forward the buckle member 162 must be disengaged from the tongue member 84.

Referring now to FIGS. 13-15D, an embodiment of another restraint system 360 for a variant 10' of vehicle seat 10 is shown which is configured and operable to selectively secure the seat back module 20 generally, and the interconnected frame components of the seat back module 20 in particular, to a frame $16B_1$, $16B_2$ or other structural component of the motor vehicle. In embodiments in which the vehicle seat 10' is configured to pivot forwardly from its occupant support position as described above, and/or in which the vehicle seat 10' is configured to be adjustably positionable fore and aft as also described above, the restraint system 360 selectively secures the vehicle seat 10', in particular the frame of the vehicle seat 10', to the frame component $16B_1$, $16B_2$ or other structural component of the motor vehicle, while also allowing for such pivoting and/or adjustable positioning of the vehicle seat 10'. By securing the interconnected frame components of the vehicle seat 10' to the frame $16B_1$, $16B_2$ or other structural component of the motor vehicle, the restraint system 360 advantageously allows for the mounting of the shoulder web retractor 64 to the interconnected frame components of the vehicle seat 10' which, through the restraint system 360, secures the web retractor 64 to the frame $16B_1$, $16B_2$ or other structure of the motor vehicle.

In the illustrated embodiment, the restraint system 360 includes a base bracket 362 mounted to the frame $16B_1$, $16B_2$ or other structure of the motor vehicle, an elongated bracket 364 having spaced apart side walls 364A, 364B of a lower end $364_1$ pivotally mounted to the bracket 362 between spaced apart sidewalls 362A, 362B thereof via a pivot connector 366, e.g., a bolt, pin or the like, and an upper end $364_2$ extending away from the lower end, and a biasing member 368 coupled to and between the brackets 362, 364. In the illustrated embodiment, the elongated bracket 364 is a planar bracket, although in alternate embodiments one or more portions of the bracket 364 may be non-linear or piecewise linear. A tab or plate section 362C of the bracket 362 illustratively extends perpendicularly away from the plane formed by the bracket with a terminal end of the tab section 362C facing the rear of the vehicle seat 10'.

An elongated coupling pin 370 is transversely mounted to the terminal end of the bracket 364 adjacent to the upper end thereof such that a longitudinal axis extending centrally through the coupling pin 370 is perpendicular to a longitudinal axis extending centrally through the bracket 364. In the illustrated embodiment, the coupling pin 370 illustratively includes an elongated pin with guide wheels 370A, 370B mounted at each end thereof. The restraint system 360 further includes a conventional web retractor 372 mounted to the bracket 362 and/or to the frame $16B_1$, $16B_2$ of the motor vehicle. A length of web 374 is operatively coupled at one end to a rotatable spool of the web retractor 372 and at the opposite end to the coupling pin 370, and the portion of the web 374 between the web retractor 372 and the coupling pin 370 rides on the upper surface of the tab section 362C of the bracket 362.

The biasing member 368, e.g., a torsion spring, illustratively biases the bracket 364 away from the frame $16B_1$, $16B_2$ such that the plane formed by and along the bracket 364 forms an angle about the pivot connector 366 with the plane formed by the bracket 362. Illustratively, the length of web 374 is selected to restrict pivoting of the bracket 364 about the pivot connector 366 to a maximum angle about the pivot connector 366, corresponding to a maximum linear distance of the coupling pin 370 from the plane formed by the bracket 362 as illustrated in FIG. 14. The bracket 364 is pivotable about the pivot connector 366 between a maximum angle a minimum angle in which the rearwardly facing surface of the bracket 364 is adjacent to or spaced apart by a predefined distance from the forwardly facing surface of the bracket 362.

The web retractor 372 illustratively includes a biasing member which biases the spool of the retractor 372 in the web take up direction. The biasing force of the biasing member 368 is illustratively greater than the biasing force of the biasing member of the web retractor 372 so that when the restraint system 360 is not being acted upon by the vehicle seat 10 the elongated bracket 364 pivots away from the bracket 362 and, in the process, draws the web 374 from the web retractor 372 until the maximum distance (or angle) allowed by the length of the web 374 is reached, at which point the restraint system 360 is in its fully extended position. If a force greater than, and generally opposite to, the biasing force of the biasing member 366 is applied to the bracket 364 and/or to the coupling pin 366, the bracket 364 pivots rearwardly about the pivot connector 366 as the biased spool of the web retractor 372 rotates in the web take-up direction and takes up the web 374 therein until the minimum distance (or angle) is reached, at which point the restraint system 360 is in its fully retracted position. In the illustrated embodiment, the web retractor 372 is an emergency locking retractor (ELR) configured in a conventional manner to lock the spool and prevent the spool from rotating in the web payout direction upon detection of a rapid rate of payout of the web therefrom and/or upon detection of vehicle deceleration exceeding a vehicle deceleration threshold.

In the illustrated embodiment, the vehicle seat 10 is provided with structural features 180 configured to selectively engage, or to be selectively engaged by, the restraint system 360 in a manner which secures the interconnected frame components of the seat back module 20 to the restraint system 360 and thus to the frame $16B_1$, $16B_2$ of the motor vehicle. A rigid frame plate 48C1, 48C2 is illustratively affixed, i.e., secured, e.g., by welding or using a plurality of conventional fixation members, to each of the frame components 30A, 30B, 30C. With respect to the seat back panel 60A, 50B, the frame plate 48C1, 48C2 illustratively extends upwardly from the space defined between the upper wings 50E, 50G and the lower wings 50F, 50H to the transverse frame component 30C positioned near the tops of the upper wings 50E, 50G. In any case, a pair of elongated, laterally or transversely spaced apart engagement plates 182A, 182B are each secured at one end thereof to the frame plate 48C1 and, in some embodiments, to the transverse frame member 30C. The engagement plates 182A, 182B each extend downwardly away from the frame member 30C to terminal ends thereof, and a pair of matching spaces are defined between the rearwardly facing surface of the frame plate 48C1 and each respective one of the engagement plates 182A, 182B. The matching spaces are illustratively sized to receive therein respective portions of the coupling pin 370 therein. In the illustrated embodiment, the engagement plates 182A, 182B are illustratively at least partially arcuate in shape as then extend downwardly to the terminal ends thereof so as to guide the coupling pin 370 therein and therefrom as the vehicle seat 10' is pivoted forwardly and rearwardly about the hinges 25A, 25B as described above. Illustratively, all frame components 30A-30C, the coupling pin 370 and the brackets are made of a rigid, high-strength material such as steel.

The restraint system 360 just described is illustratively configured to automatically, i.e., without user intervention or manual actuation of the system 360, adjust to accommodate any fore or aft position of the vehicle seat 10' relative to the bracket 362 (i.e., relative to the frame $16B_1$, $16B_2$ of the motor vehicle) while remaining coupled to the vehicle seat 10' at all times, and at any fore or aft position of the vehicle seat 10' to also disengage from the vehicle seat 10' when being pivoted forwardly from the occupant support position and reengage the vehicle seat 10' when being pivoted from any forwardly pivoted position back to the occupant support position.

Figure 15A:
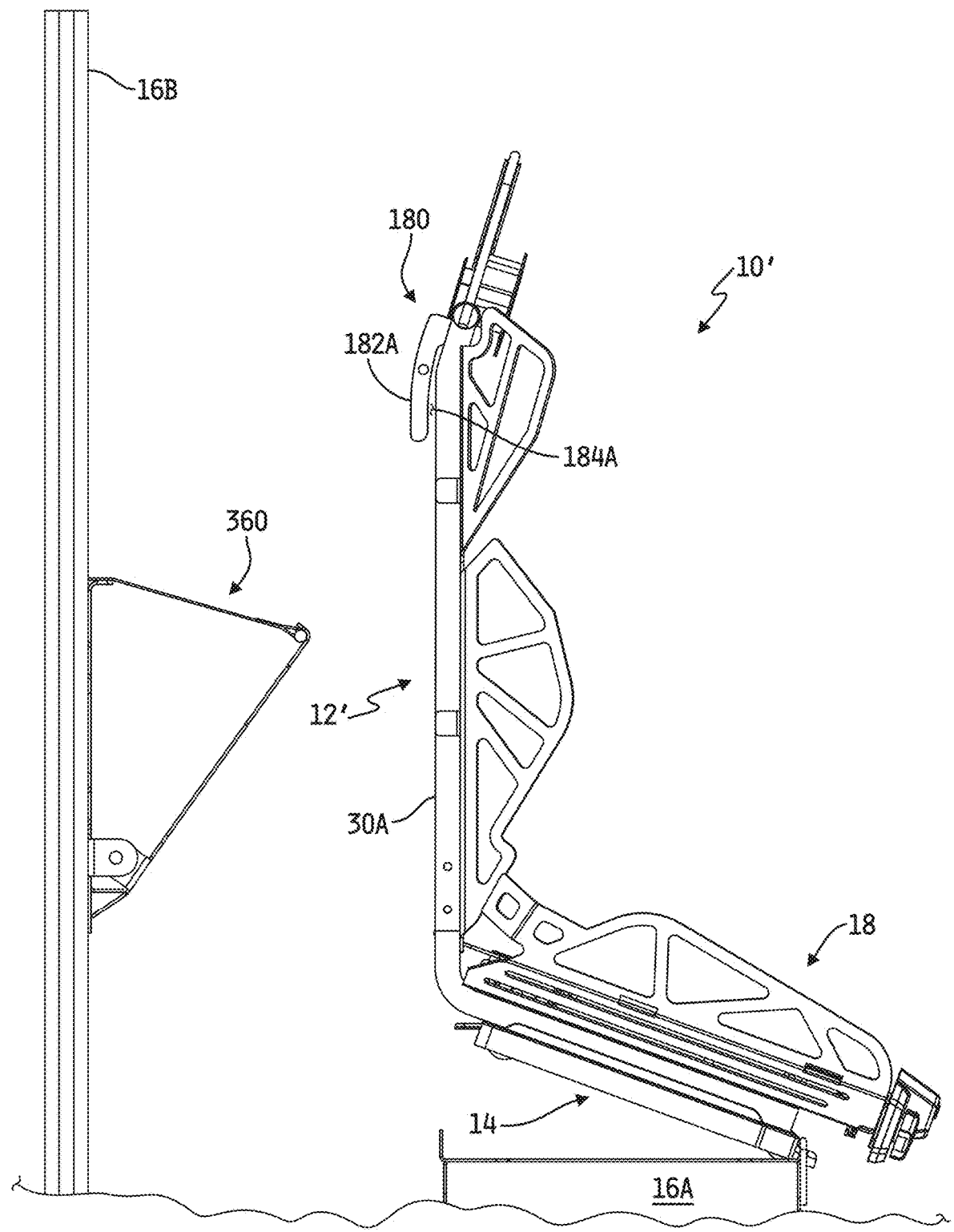
FIG. 15A is a side elevational view of the vehicle seat of FIG. 13 and a portion of the motor vehicle including the seat restraint system of FIG. 14 illustrating the vehicle seat pivoted to a forward position in which the seat restraint system is decoupled from the engagement assembly of the vehicle seat.
Figure 15B:
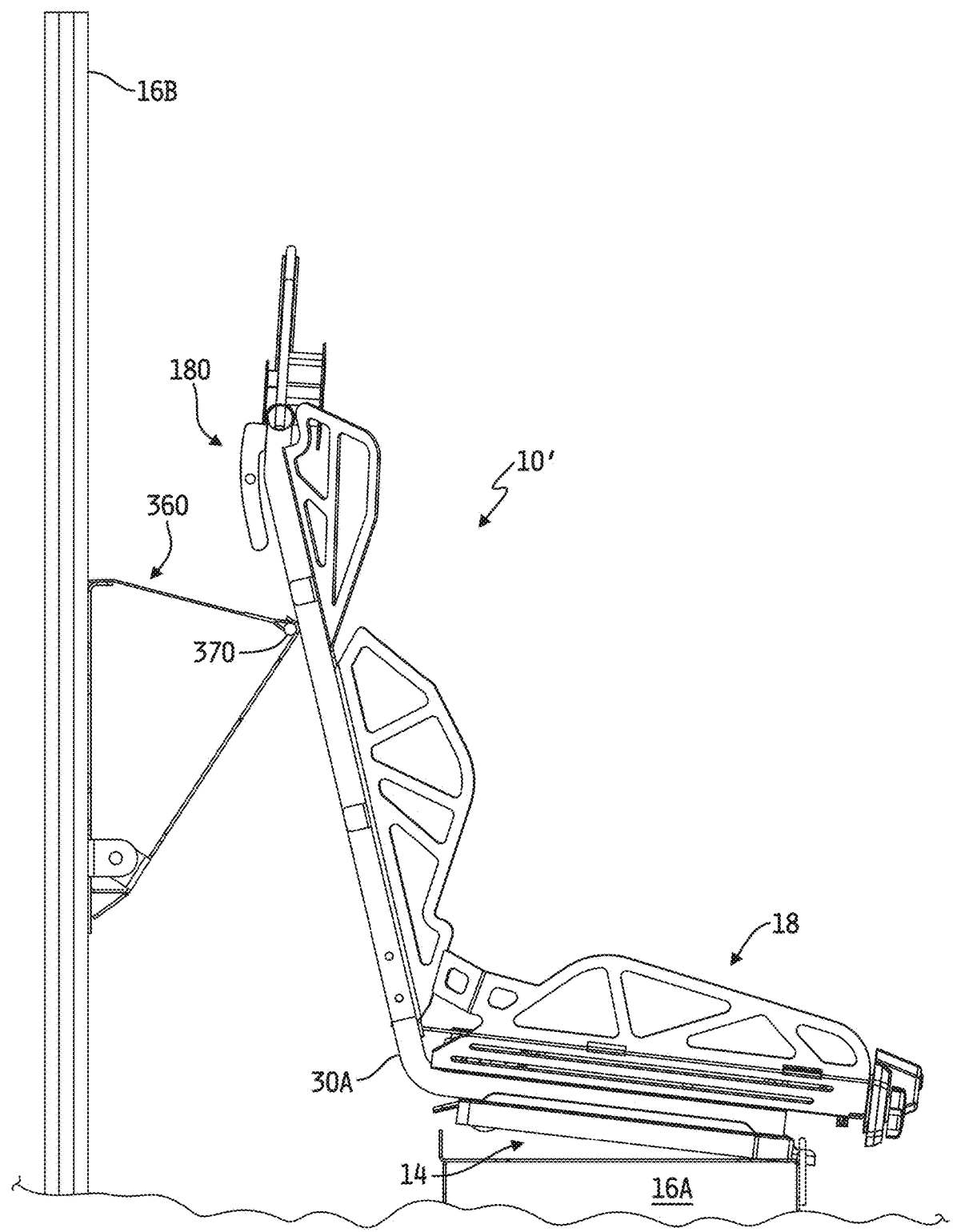
FIG. 15B is a side elevational view similar to FIG. 15A illustrating contact between the seat restraint system of FIG. 14 and the rear surface of the seat back as the vehicle seat is pivoted rearwardly from the forwardly pivoted position illustrated in FIG. 15A.
Figure 15C:
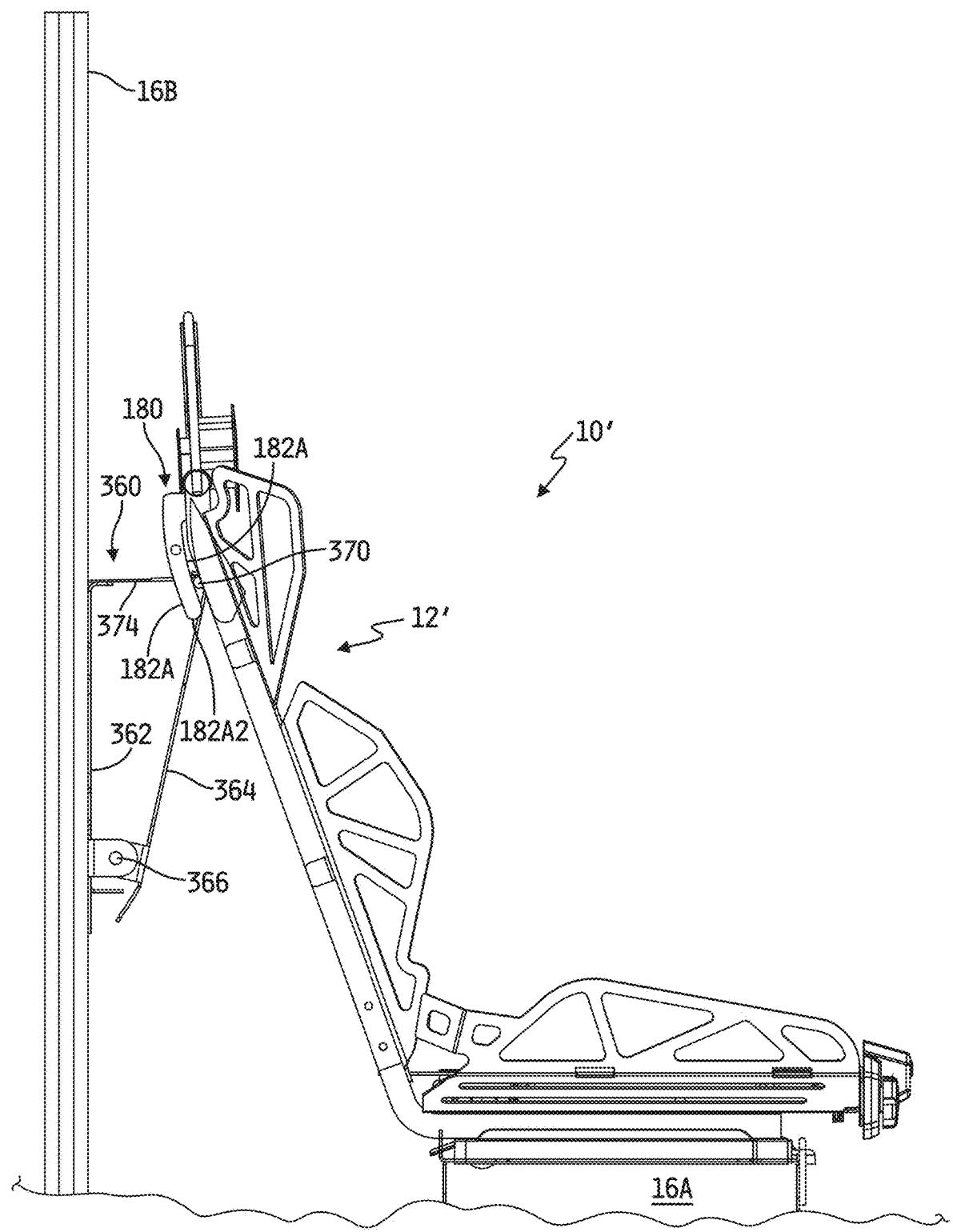
FIG. 15C is a side elevational view similar to FIGS. 15A and 15B engagement of the seat restraint system of FIG. 14 with the engagement assembly of the vehicle seat illustrated in FIG. 13 as the vehicle seat is fully pivoted rearwardly to an at-rest, occupant supporting position.

Starting with FIG. 15C, the vehicle seat 10' is shown in its occupant support position with the coupling pin 370 of the restraint system 360 received between the engagement plates 182A, 182B and the frame plate 48C1, 48C2 of the vehicle seat 10', thereby securing the vehicle seat 10' generally, and the frame components of the seat back module 20 in particular, to the frame $16B_1$, $16B_2$ of the motor vehicle via the restraint system 360. Moving to FIG. 15A, the vehicle seat 10' is pivoted forwardly from the occupant support position of FIG. 15C. The bracket 364 pivots toward the vehicle seat 10' about the pivot connector 366 in order to maintain contact between the coupling pin 370 and the frame plate 48C1, 48C2, e.g., between the coupling pin rollers 370A, 370B and the frame plate 48C1, to ensure that the engagement plates 182A, 182B clear the coupling pin 370 as the seat 10' pivots forwardly. In FIG. 15A, the vehicle seat 10' is shown pivoted to a forward position in which it is clear from the restraint system 360. In this position, the restraint system 360 is in its fully extended position.

Moving now to FIG. 15B, the vehicle seat 10' has been pivoted from a forward position clear of the restraint system 360 back toward the restraint system 360. In FIG. 15B, the coupling pin 370 has just made contact with the frame plate 48C1 below the terminal ends of the engagement plates 182A, 182B. The coupling pin guide wheels or rollers 370A, 370B ride along the frame plate 48C1 as pivoting of the vehicle seat 10' continues rearwardly, thereby guiding the elongated pin 2370 into the spaces defined between the engagement plates 182A, 182B and the frame plate 48C1 as the rearward force of the frame plate 48C1 acting on the coupling pin 370 forces the bracket 364 to pivot toward the bracket 362 as the web 374 retracts within the web retractor 372.

Moving again to FIG. 15C, the vehicle seat 10' has completed pivoting rearwardly and is in its occupant support position. In this position, the coupling pin 370 has traveled upwardly through the spaces between the engagement plates 182A, 182B and the frame plate 48C1 to secure the restraint system 360 to the vehicle seat 10', and the bracket 364 has further pivoted toward the bracket 362 and the web 374 has further retracted within the web retractor 372.

Operation of the restraint system 360 to automatically, i.e., without user intervention or manual actuation of the system 360, adjust to accommodate any fore or aft position of the vehicle seat 10' relative to the bracket 362 (i.e., relative to the frame $16B_1$, $16B_2$ of the motor vehicle) while remaining coupled to the vehicle seat 10' at all times is depicted in steps. Starting with FIG. 15C, the vehicle seat 10' is shown in its occupant support position with the coupling pin 370 of the restraint system 360 received between the engagement plates 182A, 182B and the frame plate 48C1 of the vehicle seat 10', thereby securing the vehicle seat 10' generally, and the frame components of the seat back module 20 in particular, to the frame $16B_1$, $16B_2$ of the motor vehicle via the restraint system 360. As illustrated in FIG. 15C, the vehicle seat 10' is in its maximum forward position.

Figure 15D:
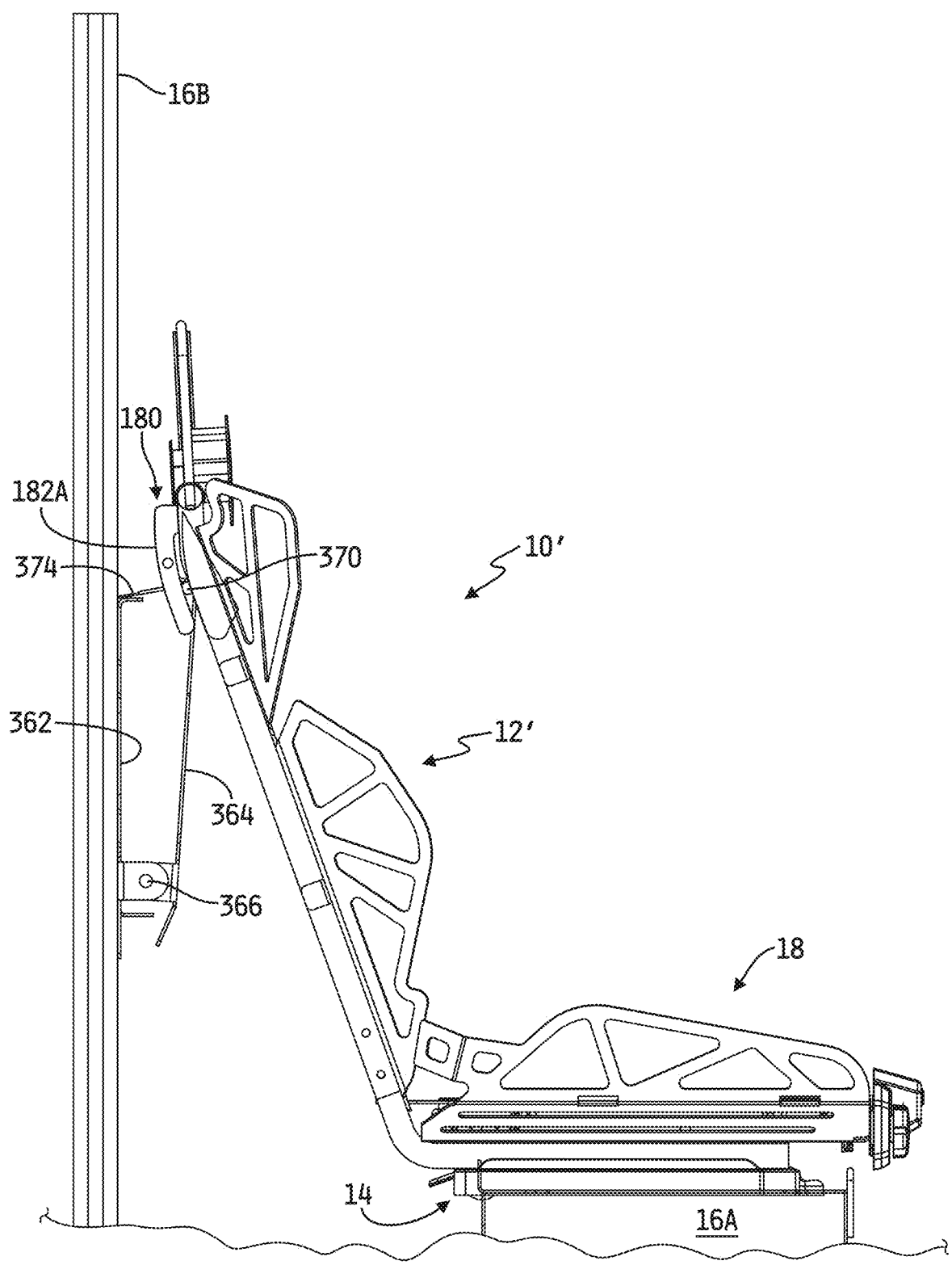
FIG. 15D is a side elevational view similar to FIGS. 15A-15C under operating conditions of the motor vehicle which do not cause the inertial locking structure to lock illustrating rearward sliding adjustment of the position of the vehicle seat relative to the motor vehicle with the seat restraint system coupled to the engagement assembly of the vehicle seat.

In FIG. 15D, the occupant has actuated the seat adjustment lever and has then applied a rearward force to the vehicle seat 10' to adjust the position of the vehicle seat 10' relative to the floor or floor frame members 16A, 16B. In FIG. 15D, the vehicle seat 10' has been moved to its maximum rearward position. It is evident that rearward movement of the vehicle seat 10 while in the occupant supporting position has forced the bracket 364 to pivot rearwardly so as to maintain the coupling pin 370 engaged between the engagement plates 182A, 182B as described above. As the vehicle seat 10' has moved rearwardly, the web 374 has retracted within the web retractor 372 as also described above. Illustratively, the restraint system 360 is configured such that in the maximum rearward position of the vehicle seat 10', the restraint system is at or near is fully retracted or compact configuration.

Figure 16A:
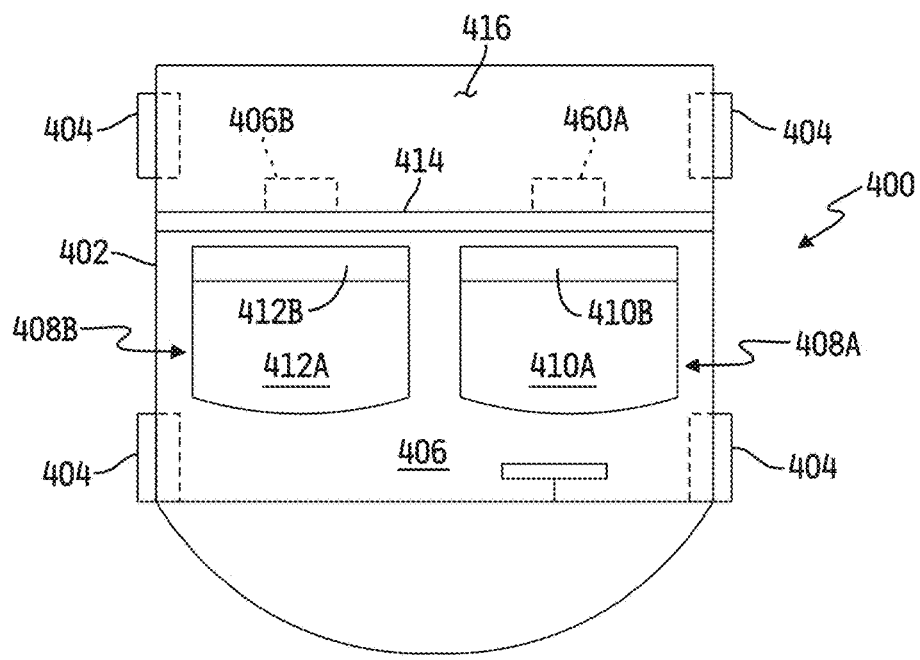
FIG. 16A is a top plan view of an embodiment of a motor vehicle in which two of the vehicle seats illustrated in FIGS. 1-15D, or variants thereof, are mounted.

Referring now to FIG. 16A, an example motor vehicle 400 is shown in which various embodiments of two of the vehicle seats illustrated in the attached figures and described hereinabove may be implemented. In the example illustrated in FIG. 16A, the motor vehicle 400 includes a frame 402 having a plurality of frame components connected together in a conventional manner to form the frame 402. The frame 402 is operatively coupled in a conventional manner to a number of ground-engaging wheels 404 of conventional construction such that the frame 402 is supported above the ground (or road) via the wheels 404. The frame 402 illustratively defines an occupant compartment 406 in which a pair of occupant seats 408A, 408B are mounted side-by-side each to one or more of the frame components. The occupant seat 408A has a seat bottom 410A including a seat base mounted to one or more frame components of the frame 402, and a seat back 4106 extending upwardly away from the seat bottom 410A. The occupant seat 408B likewise has a seat bottom 412A including a seat base mounted to one or more frame components of the frame 402, and a seat back 412B extending upwardly away from the seat bottom 410B.

The occupant seat 408A and the occupant seat 408B may each be configured to include one or any combination of the features of the vehicle seat 10, 10' illustrated in the attached figures and described in detail hereinabove. In some embodiments, the seats 408A, 408B are identically configured, i.e., identical to one another, although in alternate embodiments the seat 408A may include one or some combination of the features of the vehicle seat 10, 10' and the seat 408B may include a the same or a different one of such features or a different combination of such features. In some embodiments, for example, either or both of the vehicle seats 408A, 408B may be pivotably and/or movably mounted to the frame 402 of the motor vehicle 400 such that the such that the seat 408A and/or the vehicle seat 408B is pivotable between an at rest position to support an occupant and a forward tilted position to permit access to a portion 416 of the motor vehicle rearwardly of the seat(s) 408A, 408B. In such embodiments, the motor vehicle may include an apparatus 460A, mounted to a frame component 414 that is part of, or secured to, the frame 402 of the motor vehicle 400, for selectively preventing pivoting of the seat 408A forwardly from the at rest position thereof and/or for selectively preventing forward movement of the seat 408A, and/or may include an apparatus 460B, mounted to the frame component 414, for selectively preventing pivoting of the seat 408B forwardly from the at rest position thereof and/or for selectively preventing forward movement of the seat 408B. In embodiments which include it, the apparatus 460A may illustratively be implemented in the form of the restraint system 160, the restraint system 260 or the restraint system 360 described above, as a variant one the system 160, 260, 360 or similar structure. Likewise, in embodiments which include it, the apparatus 460B may illustratively be implemented in the form of the restraint system 160, the restraint system 260 or the restraint system 360 described above, as a variant one the system 160, 260, 360 or similar structure.

Although not specifically illustrated in FIG. 16A, either or both of the seats 408A, 408B may have an occupant restraint system mounted thereto and/or to one or more frame components of the motor vehicle 400. In some embodiments, such an occupant restraint system may be implemented in the form of the 6-point restraint system 12 illustrated in the attached figures and described above, although in alternate embodiments the occupant restraint system may include fewer points, e.g., 2, 3 or 4 points of restraint, or more points of restraint. In any case, in embodiments in which either or both of the seats 408A, 408B are outfitted with an occupant restraint system, examples of alternate or additional features with which the occupant seat 408A and/or the occupant seat 408B may be configured include, but are not limited to, one or any combination of at least one of the web attenuators 58A, 58B, at least one of the web sleeves 78A, 78B and corresponding web sleeve position adjusters 100A, 100B, at least one of the ratcheting web retractors 142A, 142B and corresponding actuator(s) 42, 44A, 44B, and the like.

Figure 16B:
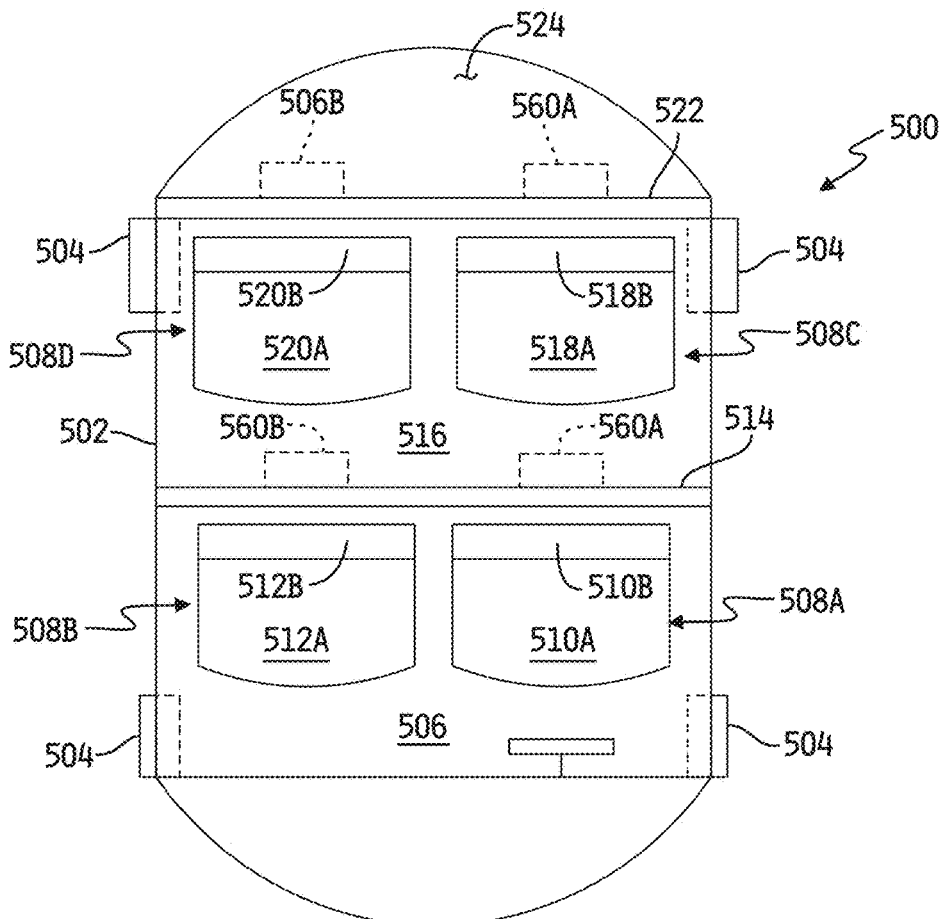
FIG. 16B is a top plan view of another embodiment of a motor vehicle in which four of the vehicle seats illustrated in FIGS. 1-15D, or variants thereof, are mounted.

Referring to FIG. 16B, another example motor vehicle 500 is shown in which various embodiments of two of the vehicle seats illustrated in the attached figures and described hereinabove may be implemented. The example motor vehicle 500 illustrated in FIG. 16B is identical in many respects to the motor vehicle 400 illustrated in FIG. 16A, and like components are numbered with like reference numbers each advanced by a factor of 100, e.g., the seat 508A, including a seat bottom 510A and a seat back 510B, is identical to the seat 408A, the seat 508B, including a seat bottom 512A and a seat back 512B, is identical to the seat 408B, both seats 508A and 508B are mounted to a frame 502 of the motor vehicle 500 in an occupant compartment 506 thereof, the motor vehicle frame 502 is operatively mounted to a plurality of ground-engaging wheels 504, etc. Like the occupant seats 408A, 408B, the occupant seat 508A and the occupant seat 508B may each be configured to include one or any combination of the features of the vehicle seat 10, 10' illustrated in the attached figures and described in detail hereinabove. In some embodiments, the seats 508A, 508B are identically configured, i.e., identical to one another, although in alternate embodiments the seat 508A may include one or some combination of the features of the vehicle seat 10, 10' and the seat 508B may include a the same or a different one of such features or a different combination of such features. In some embodiments, for example, either or both of the vehicle seats 508A, 508B may be pivotably and/or movably mounted to the frame 502 of the motor vehicle 500 such that the such that the seat 508A and/or the vehicle seat 508B is pivotable between an at rest position to support an occupant and a forward tilted position to permit access to a portion 516 of the motor vehicle 500 rearwardly of the seat(s) 508A, 508B. In such embodiments, the motor vehicle may include an apparatus 560A, mounted to a frame component 514 that is part of, or secured to, the frame 502 of the motor vehicle 500, for selectively preventing pivoting of the seat 508A forwardly from the at rest position thereof and/or for selectively preventing forward movement of the seat 508A, and/or may include an apparatus 560B, mounted to the frame component 514, for selectively preventing pivoting of the seat 508B forwardly from the at rest position thereof and/or for selectively preventing forward movement of the seat 508B. In embodiments which include it/them, the apparatus(es) 560A and/or 560B may illustratively be implemented in any of the forms described above with respect to the apparatus(es) 460A, 460B illustrated in FIG. 16A.

The motor vehicle 500 illustratively differs from the motor vehicle 400 illustrated in FIG. 16A in that the portion 516 of the motor vehicle rearwardly of the seats 508A, 508B represents a rear passenger area of the motor vehicle in which any number of additional occupant seats may be mounted. In the embodiment illustrated in FIG. 16B, two such occupant seats 508C, 508D are mounted side-by-side as described with respect to the seats 408A, 408B. The occupant seat 508C has a seat bottom 518A including a seat base mounted to one or more frame components of the frame 502, and a seat back 518B extending upwardly away from the seat bottom 518A. The occupant seat 508D likewise has a seat bottom 520A including a seat base mounted to one or more frame components of the frame 502, and a seat back 520B extending upwardly away from the seat bottom 520A.

Like the occupant seats 408A, 408B, 508A, 508B, the occupant seat 508C and the occupant seat 508D may each be configured to include one or any combination of the features of the vehicle seat 10, 10' illustrated in the attached figures and described in detail hereinabove. In some embodiments, the seats 508C, 508D are identically configured, i.e., identical to one another, although in alternate embodiments the seat 508C may include one or some combination of the features of the vehicle seat 10, 10' and the seat 508D may include a the same or a different one of such features or a different combination of such features. In some embodiments, for example, either or both of the vehicle seats 508C, 508D may be pivotably and/or movably mounted to the frame 502 of the motor vehicle 500 such that the such that the seat 508C and/or the vehicle seat 508D is pivotable between an at rest position to support an occupant and a forward tilted position to permit access to a portion 524 of the motor vehicle 500 rearwardly of the seat(s) 508C, 508D. In such embodiments, the motor vehicle may include an apparatus 560C, mounted to a frame component 522 that is part of, or secured to, the frame 502 of the motor vehicle 500, for selectively preventing pivoting of the seat 508C forwardly from the at rest position thereof and/or for selectively preventing forward movement of the seat 508C, and/or may include an apparatus 560D, mounted to the frame component 522, for selectively preventing pivoting of the seat 508D forwardly from the at rest position thereof and/or for selectively preventing forward movement of the seat 508D. In embodiments which include it/them, the apparatus(es) 560C and/or 560D may illustratively be implemented in any of the forms described above with respect to the apparatus(es) 460A, 460B illustrated in FIG. 16A.

Although not specifically illustrated in FIG. 16B, one or any combination of the seats 508A-508D may have an occupant restraint system mounted thereto and/or to one or more frame components of the motor vehicle 500. In some embodiments, such an occupant restraint system may be implemented in the form of the 6-point restraint system 12 illustrated in the attached figures and described above, although in alternate embodiments the occupant restraint system may include fewer points, e.g., 2, 3 or 4 points of restraint, or more points of restraint. In any case, in embodiments in which any of the seats 508A-508D are outfitted with an occupant restraint system, examples of alternate or additional features with which the occupant seat 508A and/or the occupant seat 508B and/or the occupant seat 508C and/or the occupant seat 508D may be configured include, but are not limited to, one or any combination of at least one of the web attenuators 58A, 58B, at least one of the web sleeves 78A, 78B and corresponding web sleeve position adjusters 100A, 100B, at least one of the ratcheting web retractors 142A, 142B and corresponding actuator(s) 42, 44A, 44B, and the like.

Figure 17:
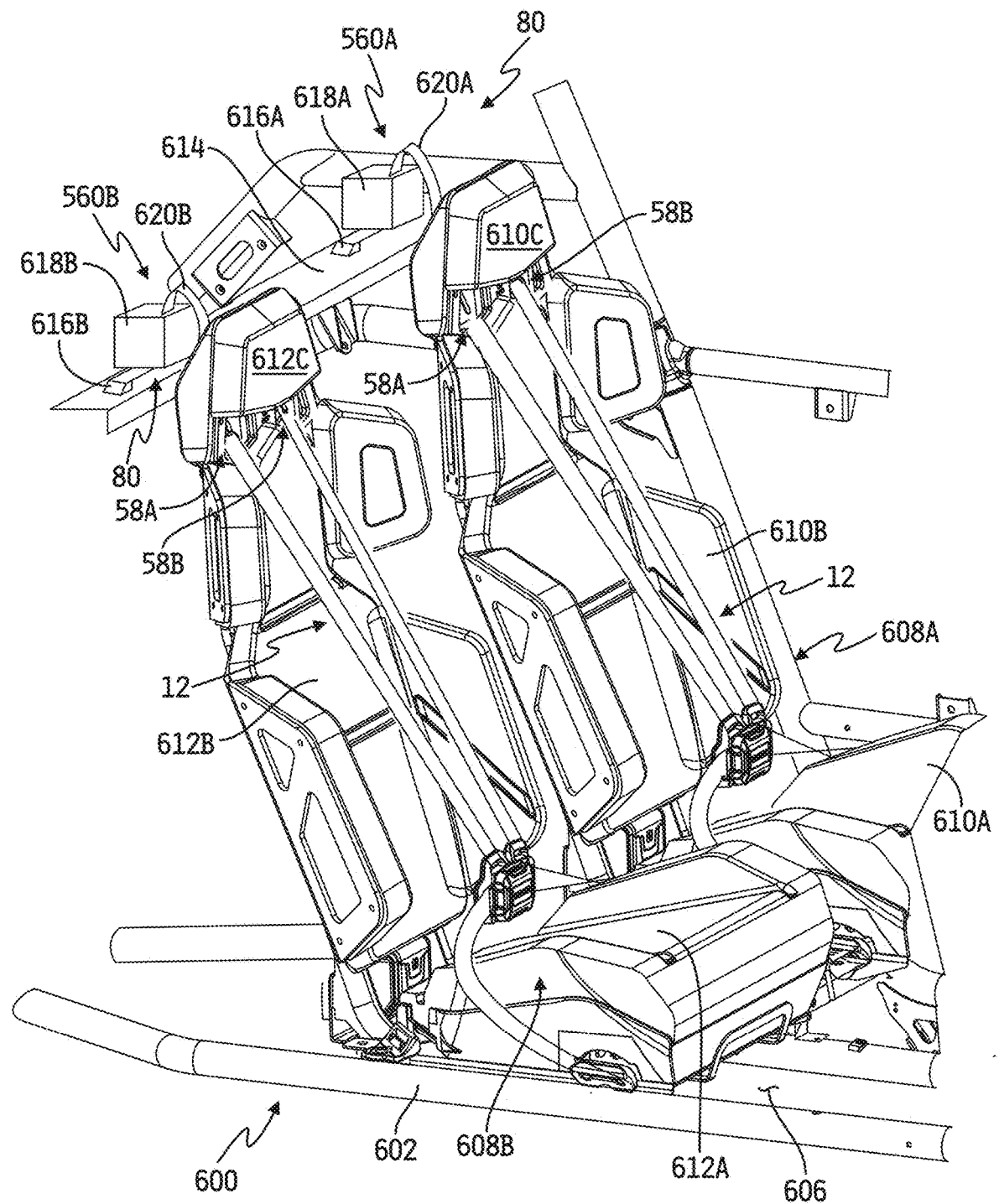
FIG. 17 is a side perspective view of yet another embodiment of a motor vehicle in which variants of two of the vehicle seats illustrated in FIGS. 1-15D are mounted.

Referring now to FIG. 17, another example motor vehicle 600 is shown in which example embodiments of two of the vehicle seats illustrated in the attached figures and described hereinabove may be implemented. The example motor vehicle 600 illustrated in FIG. 17 is identical in many respects to the motor vehicle 400 illustrated in FIG. 16A, and like components are numbered with like reference numbers each advanced by a factor of 200, e.g., the seat 608A, including a set bottom 610A and a seat back 610B, is identical to the seat 408A, the seat 608B, including a seat bottom 612A and a seat back 612B, is identical to the seat 408B, both seats 608A and 608B are mounted to a frame 602 of the motor vehicle 600 in an occupant compartment 606 thereof etc. In the embodiment illustrated in FIG. 17, apparatuses 560A and 560B, e.g., as illustrated in FIGS. 16A and 16B and described above, are mounted to the frame component 614 rearwardly of the respective seats 608A, 608B for selectively preventing pivoting of the respective seat 608A, 608B forwardly from the at rest position thereof and/or for selectively preventing forward movement of the respective seat 608A, 608B. In the illustrated embodiment, the apparatuses 560A, 560B are similar to the restraint system 160 illustrated in FIGS. 10-11C and described in detail above. For example, engagement assemblies 80 are mounted to rear portions of the seats 608A, 608B as illustrated in FIG. 10 and described above, and locking web retractors 618A and 618B are mounted to brackets 616A, 616B respectively which are themselves mounted to the frame component 614 that is part of, or secured to, the frame 602 of the motor vehicle 600. In the illustrated embodiment, the retractors 618A and 618B are located directly behind the headrests 610C, 612C of the respective seats 608A, 608B, although in other embodiments either or both of the retractors 618A, 618B may be located above or below the headrest 610C, 612C of the respective seat 608A, 608B. Restraint webs 620A, 620B are operatively coupled at one end to the respective retractor 618A, 618B, and buckle (or tongue) members (not shown) are attached to opposite ends of the webs 620A, 620B and configured for releasable engagement with the engagement assemblies 80 mounted to rear portions of the seats 608A, 608B.

In the embodiment illustrated in FIG. 17, the seats 608A, 608B each have the 6-point occupant restraint system 12 mounted thereto as described hereinabove, although in alternate embodiments more or fewer points of restraint may be included. Each seat 608A, 608B illustratively includes a particular subset of the features of the seat 10, 10' described herein. In addition to the restraint systems 660A, 660B just described, for example, each seat 608A, 608B further include the web attenuators 58A, 58B illustrated by example in FIGS. 3-5 and described above. The web sleeves 78A, 78B and associated web sleeve position adjusters 100A, 100B, as well as the ratcheting web retractors 142A, 142B and corresponding actuator(s) 42, 44A, 44B, are, in this non-limiting example, omitted. In alternate embodiments, the seats 608A and/or 608B may include any one or combination of the restraint system(s) 660A, 660B, the web attenuator(s) 58A, 58B, the web sleeve(s) 78A, 78B and associated web sleeve position adjuster(s) 100A, 100B and/or the ratcheting web retractor(s) 142A, 142B.

Figure 18A:
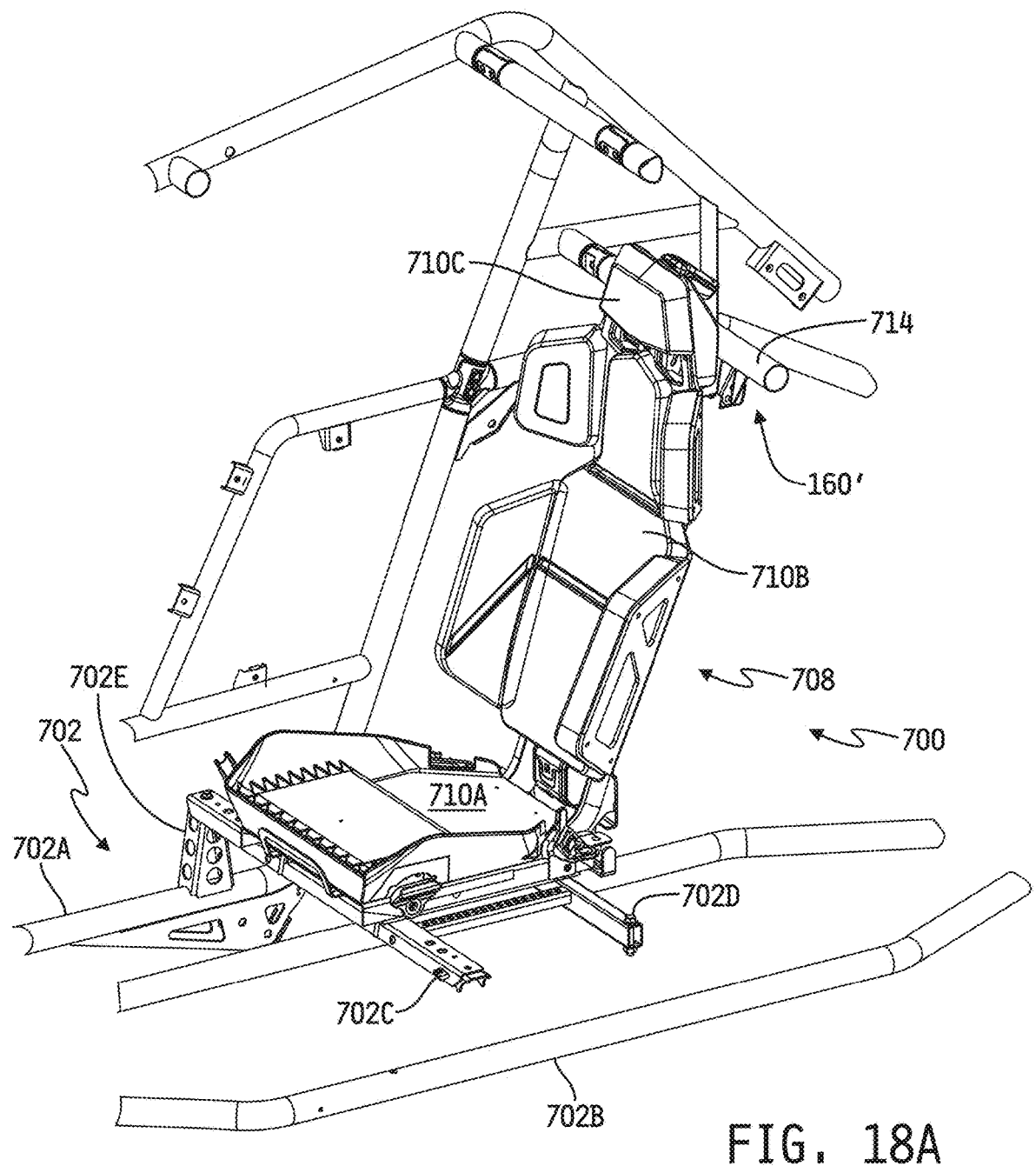
FIG. 18A is a front-side perspective view of a portion of still another embodiment of a motor vehicle in which the vehicle seat illustrated in FIGS. 1-15D, or variant thereof, is mounted.
Figure 18B:
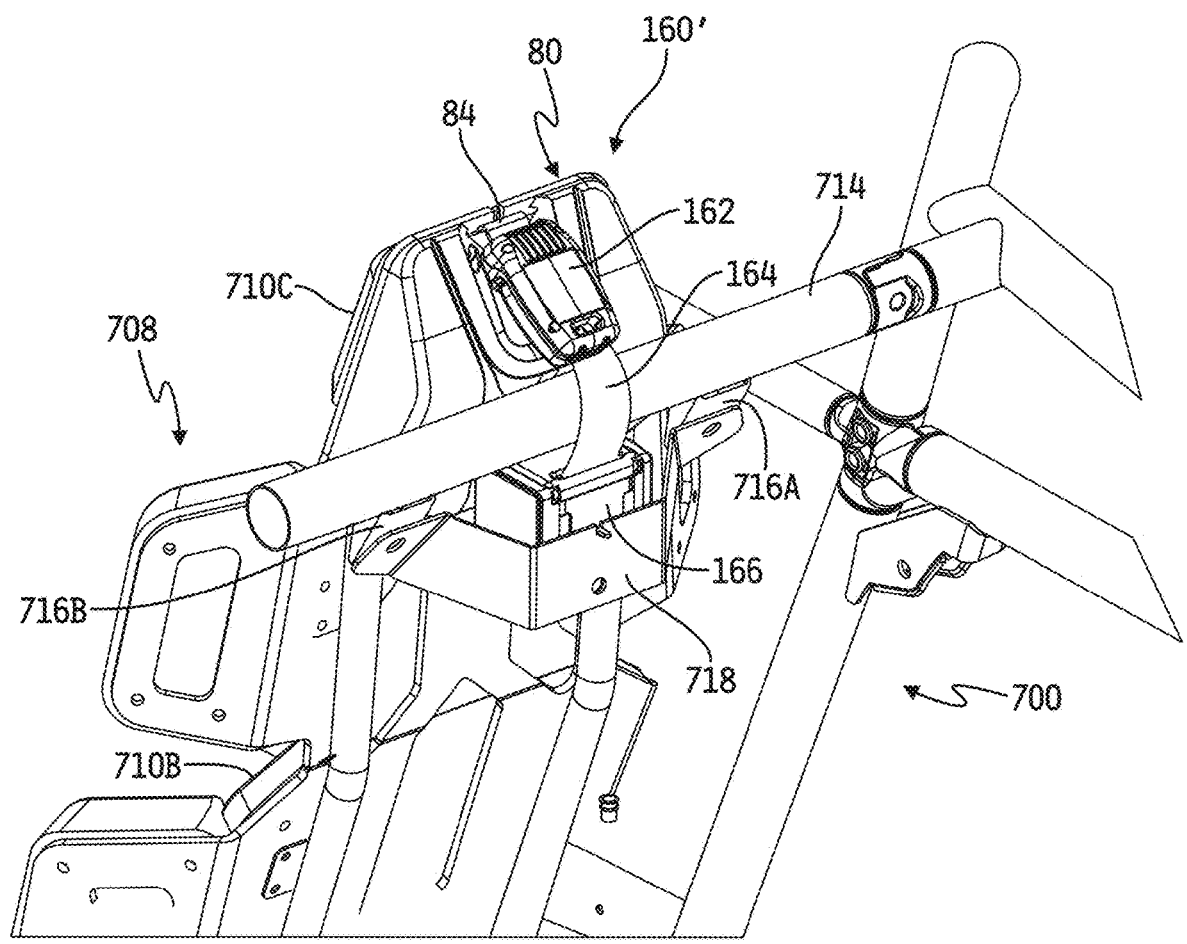
FIG. 18B is a rear-side perspective view of the motor vehicle of FIG. 18A illustrating an example embodiment of a restraint system for restraining the seat relative to a frame component of the vehicle.
Figure 18C:
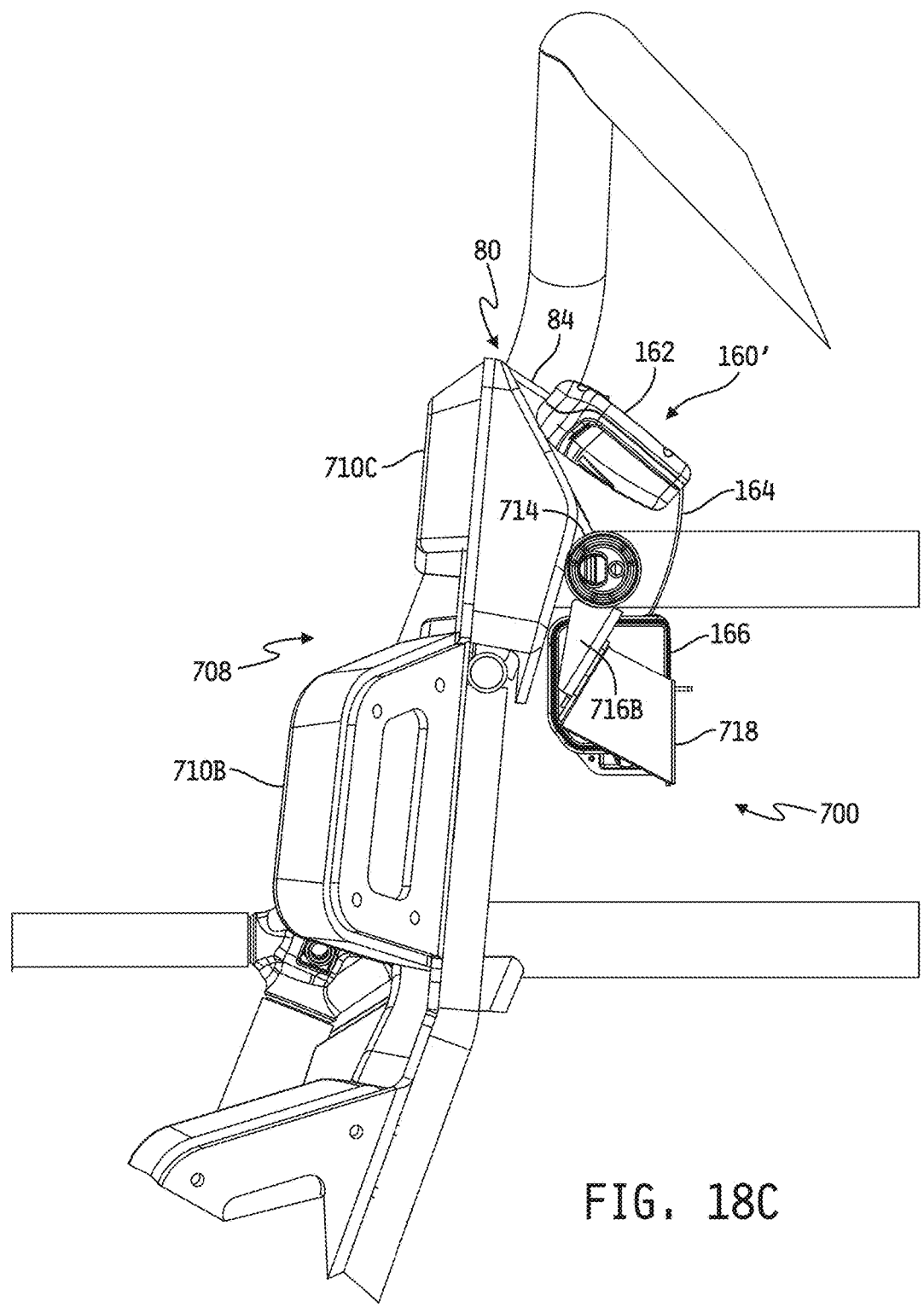
FIG. 18C is a side view of the restraint system illustrated in FIG. 18B.

Referring now to FIGS. 18A-18C, yet another example motor vehicle 700 is shown in which an example embodiment of a vehicle seat of the type illustrated in the attached figures and described hereinabove may be implemented. In the illustrated example, the motor vehicle 700 includes a frame 702 which is illustratively made up of a plurality of frame components attached together to form the skeletal frame 702. An occupant seat 708, similar in many respects to the occupant seat 10 illustrated in the attached figures and described herein, includes a seat bottom 710A mounted to the frame 702 and a seat back 710B extending upwardly away from the seat bottom 710A. In the illustrated embodiment, the seat bottom 710A is mounted to front and rear transverse frame members 702C, 702D, and the transverse frame members 702C, 702D are mounted at each end thereof to a respective frame component 702A, 702B of the motor vehicle frame 702 via a seat mounting bracket 702E (only one bracket 702E shown). The seat 708 is, as described above, slidable fore and aft relative to the vehicle frame 702 and, in some embodiments, is pivotably mounted to the frame member 702C such that the seat 708 is pivotable between an at rest position (as illustrated in FIG. 18A) to support an occupant and a forward tilted position (see, e.g., FIG. 11B) to permit access to a portion of the motor vehicle rearwardly of the seat 708.

In the embodiment illustrated in FIGS. 18A-18C, a restraint system 160', similar to the restraint system 160 illustrated in FIGS. 10-11C and described above, is mounted to the seat 708 and to a frame component 714 of motor vehicle 700 that is rearward of the seat 708. As best seen in FIGS. 18B and 18C, for example, an engagement assembly 80 is mounted to the seat 708 and, as described above with respect to FIG. 10, illustratively includes a tongue member 84 extending rearwardly away from the seat back 710B. Bracket tabs 716A, 716B are mounted to the frame member 714, and a retractor bracket 718 is mounted to the bracket tabs 716A, 716B. The locking retractor 166 is secured to the bracket 718 in a conventional manner, and in the illustrated embodiment is positioned below the headrest 710C and below the frame member 714 of the motor vehicle frame 702. A restraint web 164 is operatively coupled at one end to the retractor 164, and a buckle member 162 is attached to the opposite end of the webs 164. The buckle member 162 is configured for releasable engagement with the tongue 84 of the engagement assembly 80 mounted to the seat 708. Although not illustrated in FIGS. 18A-18C, a multi-point occupant restraint system may be coupled to the seat 708, and the seat 708 may include one or more of the features of the seat 10 illustrated in the attached figures and described herein.

Referring now to FIGS. 19A and 19B, an embodiment is shown of a vehicle seat 10''' illustrating another embodiment of a multi-point occupant restraint system 12' for restraining an occupant of the vehicle seat 10'''. The vehicle seat 10''' and the restraint system 12' are illustratively identical in many respects to the vehicle seat 10 or the vehicle seat 10'' and the restraint system 12 illustrated in the attached figures and described in detail above, and like components are therefore used to identify like components. In the illustrated embodiment, the vehicle seat 10''' includes a seat bottom module 18' including a seat module base 34' mounted to frame components 34A', 34B' on either side of the base 34', and an occupant supporting seat panel 36' mounted to and on top of the seat module base 34' The vehicle seat 10''' further includes a seat back 20' including a headrest panel 55' and openings 56A', 56B' defined through a frame 48 of the seat back 20' between a top portion of the seat back 20' and the headrest panel 55. It will be understood that whereas the foregoing components of the seat 10''' identified with a "'''" may differ in structural appearance from correspondingly numbered components of the vehicle seat 10 or the vehicle seat 10', such components are illustratively identical or similar in function to the correspondingly numbered components of the vehicle seat 10, 10'. In alternate embodiments, the restraint system 12' may be mounted to the vehicle seat 10 or to the vehicle seat 10' illustrated and described above.

As described above with respect to the vehicle seat 10, the frame components 30A', 30B' are operatively connected to the seat module base 34' and are also configured to be mounted to one or more frame components of the motor vehicle. The frame component labeled 16B, 414, 514, 522, 614, 714 illustratively represents a frame component of the motor vehicle as depicted by example in FIGS. 11A-12, 14-15D (frame component 16B), in FIG. 16A (frame component 514, in FIG. 16B (frame component 514 or 522), in FIG. 17 (frame component 614) and in FIGS. 18A-18B (frame component 714).

In the embodiment illustrated in FIGS. 19A, 19B, the restraint system 12' is provided in the form of a 6-point restraint system. The restraint system 12 illustrated in the attached figures and described herein is likewise provided, in some embodiments, in the form of a 6-point restraint system. In some such embodiments, the restraint system 12' may be substituted for the restraint system 12. As also described above, the seat(s) 408A, 408B illustrated by example in FIG. 16A, the seats 508A-508D illustrated by example in FIG. 16B, the seats 608A, 608B illustrated by example in FIG. 17 and the seat 708 illustrated by example in FIGS. 18A-18C may, in some embodiments, may include a 6-point restraint system, and in any such embodiment the restraint system 12' depicted in FIGS. 19A and 19B may alternatively be implemented.

In the embodiment illustrated in FIGS. 19A and 19B, the 6-point restraint system illustratively includes two shoulder webs 60A, 60B each having one end operatively coupled to at least one web retractor. In the embodiment illustrated in FIGS. 19A and 19B, the one end of the shoulder web 60A is operatively coupled to a web retractor 802A mounted, e.g., affixed or otherwise connected, to the vehicle frame component 16B, 414, 514, 522, 614, 714 rearwardly of, and adjacent to one side of the seat back 20', and the one end of the shoulder web 60B is likewise operatively coupled to another web retractor 802B mounted, e.g., affixed or otherwise connected, to the vehicle frame component 16B, 414, 514, 522, 614, 714 rearwardly of, and adjacent to an opposite side of, the seat back 20'. In some alternate embodiments, the retractors 802A, 802B may be mounted to one or more other frame components of the motor vehicle anywhere along or adjacent to the rear of the seat back 20', to one or more frame components making up a floor of the motor vehicle and/or to the vehicle seat 10''', e.g., to the seat bottom module 18', seat module base 34', the seat back frame 48 and/or to one or more seat frame components coupled to the seat frame component 16A' and/or 16B'. In other alternate embodiments, the respective ends of the shoulder webs 60A, 60B may be joined together by one end of a single web, and the opposite end of the single web may be operatively coupled to a single web retractor mounted to the seat 10''' and/or to one or more frame components of the motor vehicle as just described. In any case, the web retractors 802A, 802B (or, in some embodiments, a single web retractor) are conventional and are configured to take up and pay out the shoulder webs 60A, 60B in a conventional manner. In some embodiments, at least one of the web retractors 802A, 802B (or, in some embodiments, the single web retractor) is a conventional locking web retractor, examples of which may include, but are not limited to, a conventional automatic locking retractor (ALR), a conventional emergency locking retractor (ELR), or other conventional locking retractor.

In the illustrated embodiment, the shoulder webs 60A, 60B are depicted as extending from the retractors 802A, 802B and through respective ones of the openings 56A', 56B' defined through the seat back 20', as illustrated in FIGS. 1A and 3-5 and described above. In alternate embodiments, the shoulder webs 60A, 60B may instead extend over the seat back 20' along respective sides thereof. In any case, opposite ends of the shoulder webs 60A, 60B are coupled to a respective web attachment member 68A, 68B, wherein the web attachment member 68A is coupled to the engagement member 70A (e.g., a buckle or tongue member) and the web attachment member 68B is coupled to the engagement member 70B (e.g., tongue or buckle), all as described above. Hereinafter, the combination of the web attachment member 68A and the engagement member 70A may be referred to as a web engagement member 804A, and the combination of the web attachment member 68B and the engagement member 70B may be referred to as a web engagement member 804B, wherein it will be understood that the web engagement members 804A, 804B are configured to releasably engage with, or connect to, one another as described above.

The 6-point restraint system 12' illustrated in FIGS. 19A and 19B further includes two lap webs 72A, 72B each having one end operatively coupled to a respective web retractor 806A, 806B, and an opposite end coupled, e.g., attached or otherwise connected to, a respective one of the web attachment member 68A, 68B of a respective one of the web engagement members 804A, 804B. The web retractor 806A is illustratively mounted, e.g., affixed or otherwise connected, to the seat frame component 30A', along one side of the seat 10''', e.g., along the side of the seat base 34' corresponding to the side of the seat 10''' along which the shoulder web 60A extends, and the web retractor 806B is illustratively mounted, e.g., affixed or otherwise connected, to the seat frame component 30B', along the opposite side of the seat 10''', e.g., along the side of the seat base 34' corresponding to the side of the seat 10''' along which the shoulder web 60B extends. In some alternate embodiments, the retractor 806A may be mounted to one or more frame components of the motor vehicle and/or motor vehicle floor anywhere along or adjacent to the respective side of the seat base 34' or rearwardly of the seat 10''', and/or to the vehicle seat 10''', e.g., to the seat bottom module 18', seat base 34', the seat back frame 48 and/or to one or more seat frame components coupled to the seat frame component 16A'. Alternatively or additionally, the retractor 806B may, in alternate embodiments, be mounted to one or more frame components of the motor vehicle and/or motor vehicle floor anywhere along or adjacent to the respective side of the seat base 34' or rearwardly of the seat 10''', and/or to the vehicle seat 10''', e.g., to the seat bottom module 18', seat base 34', the seat back frame 48 and/or to one or more seat frame components coupled to the seat frame component 16B'. In any case, the web retractors 806A, 806B are conventional and are configured to take up and pay out the respective lap webs 72A, 72B in a conventional manner. In some embodiments, at least one of the web retractors 806A, 806B is a conventional locking web retractor, examples of which may include, but are not limited to, a conventional automatic locking retractor (ALR), a conventional emergency locking retractor (ELR), or other conventional locking retractor.

The 6-point restraint system 12' illustrated in FIGS. 19A and 19B further includes two thigh webs 74A, 74B each having one end operatively coupled to a respective web retractor 808A, 808B, and an opposite end coupled, e.g., attached or otherwise connected to, a respective one of the web attachment member 68A, 68B of a respective one of the web engagement members 804A, 804B. The web retractor 808A is illustratively mounted, e.g., affixed or otherwise connected, to the seat frame component 30A', along one side of the seat 10''', e.g., along the side of the seat base 34' corresponding to the side of the seat 10''' along which the retractor 806A is mounted (and forwardly of the retractor 806A), and the web retractor 808B is illustratively mounted, e.g., affixed or otherwise connected, to the seat frame component 30B', along the opposite side of the seat 10''', e.g., along the side of the seat base 34' corresponding to the side of the seat 10''' along which the retractor 806B is mounted (and forwardly of the retractor 806B). In some alternate embodiments, the retractor 808A may be mounted to one or more frame components of the motor vehicle and/or motor vehicle floor anywhere along or adjacent to the respective side of the seat base 34' or forwardly of the seat 10''', and/or to the vehicle seat 10''', e.g., to the seat bottom module 18', seat base 34' and/or to one or more seat frame components coupled to the seat frame component 16A'. Alternatively or additionally, the retractor 808B may, in alternate embodiments, be mounted to one or more frame components of the motor vehicle and/or motor vehicle floor anywhere along or adjacent to the respective side of the seat base 34' or forwardly of the seat 10''', and/or to the vehicle seat 10''', e.g., to the seat bottom module 18', seat base 34' and/or to one or more seat frame components coupled to the seat frame component 16B'. In any case, the web retractors 808A, 808B are conventional and are configured to take up and pay out the respective thigh webs 74A, 74B in a conventional manner. In some embodiments, at least one of the web retractors 808A, 808B is a conventional locking web retractor, examples of which may include, but are not limited to, a conventional automatic locking retractor (ALR), a conventional emergency locking retractor (ELR), or other conventional locking retractor.

In some embodiments, the web attachment member 68A of the web engagement member 804A may be modified such that the one or more of the webs 60A, 72A, 74A pass therethrough or therealong, i.e., such that the web engagement member 804A is movable along the one or more webs 60A, 72A, 74A, and/or the web attachment member 68B of the web engagement member 804B may be modified such that the one or more of the webs 60B, 72B, 74B pass therethrough or therealong, i.e., such that the web engagement member 804B is movable along the one or more webs 60B, 72B, 74B. In one illustrative example of such an embodiment, the shoulder web 60A and the lap web 72A or the thigh web 74A may be together provided in the form of one single length of web with one end operatively connected to the web retractor 802A and the opposite end of the single length of web operatively connected to the respective web retractor 806A or 808B, wherein the web attachment member 68A defines therethrough a web guide, e.g., a slot or opening, through which the one single length of web passes such that the web engagement member 804A is movable, e.g., slidable, along the one single length of web between the retractor 802A and the respective retractor 806A, 808A, and the shoulder web 60B and the lap web 72B or the thigh web 74B may likewise be together provided in the form of another single length of web with one end operatively connected to the web retractor 802B and the opposite end of the another single length of web operatively connected to the respective web retractor 806B or 808B, wherein the web attachment member 68B defines therethrough a web guide, e.g., a slot or opening, through which the another single length of web passes such that the web engagement member 804B is movable, e.g., slidable, along the another single length of web between the retractor 802B and the respective retractor 806B, 808B.

It will be understood that whereas the occupant restraint system 12' illustrated in FIGS. 19A and 19B is implemented in the form of a 6-point restraint system, alternate embodiments the occupant restraint system 12' are contemplated by this disclosure in which may include fewer points, e.g., 2, 3 or 4 points of restraint, or more points of restraint, with each such point of restraint being a respective (or shared) retractor. It will be further understood that whereas the occupant restraint system 12' and the motor vehicle seat 10''' are both illustrated in FIGS. 19A and 19B without any of the various restraint features, ride features and occupant features illustrated in the attached figures and described above, this has been done only so as not to obscure the details of the embodiments of the seat 10''' and the restraint system 12', and should not be considered limiting in any way. To the contrary, it will be understood that the motor vehicle seat 10''' illustrated in FIGS. 19A and 19B may illustratively include either or both of the web attenuators 58A, 58B illustrated in FIGS. 1A, 3-5, 13 and 17 and described in detail above. Alternatively or additionally, the motor vehicle seat 10''' may include any of the seat restraint engagement assemblies 80, 180 configured for releasable attachment to a respective one of the seat restraint systems 160, 260, 360, 460A, 460B, 560A, 560B, 160' mounted to the motor vehicle and configured to selectively prevent pivoting of the vehicle seat forwardly from an at rest position thereof (in embodiments in which the seat 10''' is pivotable forwardly) and/or for selectively preventing forward movement of the vehicle seat, as illustrated in FIGS. 1B, 3, and 10-18C and described in detail above. Alternatively or additionally still, the restraint system 12' may illustratively include either or both of the web sleeves 78A, 78B and corresponding web sleeve position adjusters 100A, 100B illustrated in FIGS. 1A and 4-6B and described in detail above.

In any case, it will be understood that any of the occupant seats 408A, 408B, 508A-508D, 608A, 608B and/or 708 illustrated in FIGS. 16A-18B may be provided in the respective motor vehicle in the form of the vehicle seat 10''', and that any one or more such implementations of the vehicle seat 10′′′ may include the restraint system 12′.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

What is claimed is:

1. A multi-point restraint system for a seat mounted in a motor vehicle, the seat having a seat bottom mounted to the motor vehicle and a seat back extending upwardly away from the seat back, the multi-point restraint system comprising:
   a first shoulder web configured to extend through or over the seat back along one side of the seat,
   a second shoulder web configured to extend through or over the seat back along an opposite side of the seat,
   at least a first shoulder web retractor mounted to at least one of the motor vehicle, the seat bottom and the seat back, the at least a first shoulder web retractor configured to take up and pay out the first and second shoulder webs,
   a first lap web configured to extend at least partially across the seat bottom from the one side of the seat,
   a second lap web configured to extend at least partially across the seat bottom from the opposite side of the seat,
   a first thigh web configured to extend at least partially across the seat bottom from the one side of the seat,
   a second thigh web configured to extend at least partially across the seat bottom from the opposite side of the seat,
   a first lap web retractor mounted to at least one of the motor vehicle and the seat bottom along the one side of the seat and configured to take up and pay out the first lap web,
   a second lap web retractor mounted to at least one of the motor vehicle and the seat bottom along the opposite side of the seat and configured to take up and pay out the second lap web,
   a first thigh web retractor mounted to at least one of the motor vehicle and the seat bottom along the one side of the seat and configured to take up and pay out the first thigh web,
   a second thigh web retractor mounted to at least one of the motor vehicle and the seat bottom along the opposite side of the seat and configured to take up and pay out the second thigh web, and
   first and second web engagement members configured to releasably connect to one another, the first shoulder, lap and thigh webs operatively coupled to the first web engagement member and the second shoulder, lap and thigh webs operatively coupled to the second web engagement member.

2. The multi-point restraint system of claim 1, wherein the at least a first shoulder web retractor comprises one of a single web retractor operatively coupled to each of the first and second shoulder webs and a pair of web retractors each operatively coupled a respective one of the first and second shoulder webs.

3. The multi-point restraint system of claim 1, wherein the multi-point restraint system further comprises:
   a first elongated sleeve received on and at least partially about the first shoulder web, and
   a first sleeve position adjuster coupled to the first sleeve and including a first actuator normally engaging a portion of the first shoulder web to fix a position of the first sleeve relative to the first shoulder web and responsive to actuation thereof to disengage from the first shoulder web to allow the first sleeve to be moved along the first shoulder web.

4. The multi-point restraint system of claim 3, further comprising:
   a second elongated sleeve received on and at least partially about the second shoulder web, and
   a second sleeve position adjuster coupled to the second sleeve and including a second actuator normally engaging a portion of the second shoulder web to fix a position of the second sleeve relative to the second shoulder web and responsive to actuation thereof to disengage from the second shoulder web to allow the second sleeve to be moved along the second shoulder web.

5. The multi-point restraint system of claim 4, wherein at least one of the first lap web retractor, the second lap web retractor, the first thigh web retractor and the second thigh web retractor is a locking retractor.

6. The multi-point restraint system of claim 5, wherein the at least a first shoulder web retractor comprises a single locking web retractor operatively coupled to each of the first and second shoulder webs or a pair of locking web retractors each operatively coupled a respective one of the first and second shoulder webs.

7. The multi-point restraint system of claim 6, wherein the single locking web retractor or at least one of the pair of locking web retractors is an automatic locking retractor or an emergency locking retractor.

8. The multi-point restraint system of claim 4, wherein at least one of the first lap web retractor, the second lap web retractor, the first thigh web retractor and the second thigh web retractor is an automatic locking retractor or an emergency locking retractor.

9. The multi-point restraint system of claim 8, wherein the at least a first shoulder web retractor comprises a single locking web retractor operatively coupled to each of the first and second shoulder webs or a pair of locking web retractors each operatively coupled a respective one of the first and second shoulder webs.

10. The multi-point restraint system of claim 9, wherein the single locking web retractor or at least one of the pair of locking web retractors is an automatic locking retractor or an emergency locking retractor.

11. The multi-point restraint system of claim 1, wherein the first shoulder web and the first lap web or the first thigh web together comprise a first single length of web,
   and wherein the second shoulder web and the second lap web or the second thigh web together comprise a second single length of web,
   and wherein at least one of the first and second single lengths of web is operatively coupled to the respective first and second web engagement member such that the respective first and second web engagement member is movable along, and relative to, the at least one of the first and second single lengths of web.

12. A motor vehicle and seat combination, comprising:
   a motor vehicle,
   a seat mounted to the motor vehicle, the seat having a seat bottom and a seat back extending upwardly away from the seat bottom, a multi-point restraint system configured to selectively restrain an occupant supported on the seat, the multi-point restraint system including:
   a first shoulder web configured to extend through or over the seat back along one side of the seat,
   a second shoulder web configured to extend through or over the seat back along an opposite side of the seat,
   at least a first web retractor mounted to at least one of the motor vehicle, the seat bottom and the seat back, the at least a first web retractor configured to take up and pay out the first and second shoulder webs,
   a first lap web configured to extend at least partially across the seat bottom from the one side of the seat,
   a second web retractor mounted to at least one of the motor vehicle and the seat bottom along the one side of the seat, the second web retractor configured to take up and pay out the first lap web,
   a second lap web configured to extend at least partially across the seat bottom from the opposite side of the seat,
   a third web retractor mounted to at least one of the motor vehicle and the seat bottom along the opposite side of the seat, the third web retractor configured to take up and pay out the second lap web,
   a first thigh web configured to extend at least partially across the seat bottom from the one side of the seat,
   a fourth web retractor mounted to at least one of the motor vehicle and the seat bottom along the one side of the seat, the fourth web retractor configured to take up and pay out the first thigh web,
   a second thigh web configured to extend at least partially across the seat bottom from the opposite side of the seat,
   a fifth web retractor mounted to at least one of the motor vehicle and the seat bottom along the opposite side of the seat, the fifth web retractor configured to take up and pay out the second thigh web, and
   first and second web engagement members configured to releasably connect to one another, the first shoulder, lap and thigh webs operatively coupled to the first web engagement member and the second shoulder, lap and thigh webs operatively coupled to the second web engagement member,
   a first web attenuator mounted to the seat back at or near a top end of the seat back along the one side of the seat, the first shoulder web extending through or over the seat back with a portion of the first shoulder web supported by the first web attenuator, the first web attenuator configured to dampen forces applied thereto by the first shoulder web, and
   a second web attenuator mounted to the seat back at or near the top end of the seat back along the opposite side of the seat, the second shoulder web extending through or over the seat back with a portion of the second shoulder web supported by the second web attenuator, the second web attenuator configured to dampen forces applied thereto by the second shoulder web.

13. The combination of claim 12, wherein the at least a first web retractor comprises a single web retractor operatively coupled to each of the first and second shoulder webs or a pair of web retractors each operatively coupled a respective one of the first and second shoulder webs.

14. The combination of claim 13, wherein at least one of the singe web retractor or the pair of web retractors and the second, third, fourth and fifth web retractors is a locking retractor.

15. The combination of claim 13, wherein at least one of the singe web retractor or the pair of web retractors and the second, third, fourth and fifth web retractors is one of an automatic locking retractor and an emergency locking retractor.

16. A motor vehicle and seat combination, comprising:
   a motor vehicle,
   a seat mounted to the motor vehicle, the seat having a seat bottom and a seat back extending upwardly away from the seat bottom, the seat pivotable or slidable forwardly from an at rest position,
   means for selectively preventing pivoting or sliding of the seat forwardly from the at rest position of the seat, and
   a multi-point restraint system configured to selectively restrain an occupant supported on the seat, the multi-point restraint system including:
      a first shoulder web configured to extend through or over the seat back along one side of the seat,
      a second shoulder web configured to extend through or over the seat back along an opposite side of the seat,
      at least a first web retractor mounted to at least one of the motor vehicle, the seat bottom and the seat back, the at least a first web retractor configured to take up and pay out the first and second shoulder webs,
      a first lap web configured to extend at least partially across the seat bottom from the one side of the seat,
      a second web retractor mounted to at least one of the motor vehicle and the seat bottom along the one side of the seat, the second web retractor configured to take up and pay out the first lap web,
      a second lap web configured to extend at least partially across the seat bottom from the opposite side of the seat,
      a third web retractor mounted to at least one of the motor vehicle and the seat bottom along the opposite side of the seat, the third web retractor configured to take up and pay out the second lap web,
      a first thigh web configured to extend at least partially across the seat bottom from the one side of the seat,
      a fourth web retractor mounted to at least one of the motor vehicle and the seat bottom along the one side of the seat, the fourth web retractor configured to take up and pay out the first thigh web,
      a second thigh web configured to extend at least partially across the seat bottom from the opposite side of the seat,
      a fifth web retractor mounted to at least one of the motor vehicle and the seat bottom along the opposite side of the seat, the fifth web retractor configured to take up and pay out the second thigh web, and
      first and second web engagement members configured to releasably connect to one another, the first shoulder, lap and thigh webs operatively coupled to the first web engagement member and the second shoulder, lap and thigh webs operatively coupled to the second web engagement member.

17. The combination of claim 16, wherein the at least a first web retractor comprises a single web retractor operatively coupled to each of the first and second shoulder webs or a pair of web retractors each operatively coupled a respective one of the first and second shoulder webs.

18. The combination of claim 17, wherein at least one of the singe web retractor or the pair of web retractors and the second, third, fourth and fifth web retractors is a locking retractor.

19. The combination of claim 17, wherein at least one of the singe web retractor or the pair of web retractors and the second, third, fourth and fifth web retractors is one of an automatic locking retractor and an emergency locking retractor.

\* \* \* \* \*